(12) United States Patent
Aoki et al.

(10) Patent No.: US 11,901,851 B2
(45) Date of Patent: Feb. 13, 2024

(54) MOTOR DRIVE CONTROL DEVICE, MOTOR UNIT, AND MOTOR DRIVE CONTROL METHOD

(71) Applicant: MINEBEA MITSUMI Inc., Nagano (JP)

(72) Inventors: Masato Aoki, Iwata (JP); Hiroyuki Kaidu, Kakegawa (JP); Wataru Nogamida, Kakegawa (JP); Syu Hayashi, Chitose (JP); Takahiro Asami, Atsugi (JP)

(73) Assignee: MINEBEA MITSUMI Inc., Nagano (JP)

( * ) Notice: Subject to any disclaimer, the term of this patent is extended or adjusted under 35 U.S.C. 154(b) by 148 days.

(21) Appl. No.: 17/660,041

(22) Filed: Apr. 21, 2022

(65) Prior Publication Data

US 2022/0345056 A1 Oct. 27, 2022

(30) Foreign Application Priority Data

Apr. 27, 2021 (JP) .................................. 2021-075259
Sep. 24, 2021 (JP) .................................. 2021-155860

(51) Int. Cl.
*H02P 6/08* (2016.01)
*H02P 6/15* (2016.01)

(52) U.S. Cl.
CPC .................................. *H02P 6/153* (2016.02)

(58) Field of Classification Search
CPC .................................. H02P 6/153; H02P 6/08

(Continued)

(56) References Cited

U.S. PATENT DOCUMENTS

2004/0263104 A1* 12/2004 Iwanaga ................. H02P 6/182
              318/400.35
2015/0256328 A1* 9/2015 Kamatani ............ G01D 5/2448
              375/226

(Continued)

FOREIGN PATENT DOCUMENTS

JP 2015-023734 A 2/2015
JP 2015-062329 A 4/2015

*Primary Examiner* — Kawing Chan
*Assistant Examiner* — Gabriel Agared
(74) *Attorney, Agent, or Firm* — Pearne & Gordon LLP

(57) ABSTRACT

A motor drive control device 1_2 includes a target point determination unit 12_2 determining a target point P of zero crossing of a coil current Iu of a U phase based on a position detection signal Shu, a current zero crossing point estimation unit 14_2 estimating a zero crossing point Q of the coil current Iu of the U phase by detecting a change in a current direction of the coil current Iu of the U phase at a predetermined timing in every cycle of a PWM signal, an adjustment instruction signal generation unit 19_2 generating at least one of a phase adjustment instruction signal Sp for instructing phase adjustment of the coil current Iu and a frequency adjustment instruction signal Sf for instructing frequency adjustment of the PWM signal according to a phase difference $\Delta\varphi$ between the target point P and the zero crossing point Q such that the phase difference is within a predetermined range, and a drive control signal generation unit 16_2 generating a drive control signal Sd based on at least one of the phase adjustment instruction signal Sp and the frequency adjustment instruction signal Sf.

18 Claims, 20 Drawing Sheets

(58) Field of Classification Search
USPC .................................................. 318/400.14
See application file for complete search history.

(56) References Cited

U.S. PATENT DOCUMENTS

| | | | |
|---|---|---|---|
| 2017/0093312 A1* | 3/2017 | Hano | ........................ H02P 6/18 |
| 2017/0155346 A1* | 6/2017 | Kaidu | ..................... H02P 6/182 |
| 2018/0183368 A1* | 6/2018 | Murakami | ............... H02P 6/185 |
| 2019/0190410 A1* | 6/2019 | Aoki | ........................ H02P 6/15 |
| 2019/0348935 A1* | 11/2019 | Kurosawa | ................ H02P 6/182 |
| 2020/0266732 A1* | 8/2020 | Kaidu | ..................... H02P 23/28 |
| 2021/0091688 A1* | 3/2021 | Chen | ....................... H02P 6/182 |

\* cited by examiner

MOTOR DRIVE CONTROL DEVICE, MOTOR UNIT, AND MOTOR DRIVE CONTROL METHOD

CROSS-REFERENCE TO RELATED APPLICATIONS

This application claims the benefit of priority to Japanese Application No. JP2021-075259, filed Apr. 27, 2021 and Japanese Application No. JP2021-155860 filed on Sep. 24, 2021, the entire disclosure of which are hereby incorporated herein by reference.

TECHNICAL FIELD

The present invention relates to a motor drive control device, a motor unit, and a motor drive control method.

BACKGROUND ART

In general, in a case of performing sine wave driving of a motor including a multi-phase coil, a technique of driving the motor with high efficiency by matching the phase of the induced voltage of the coil with the phase of the coil current (phase current) for each phase of the motor is known.

However, a shift occurs between the phase of the induced voltage and the phase of the coil current (phase current) due to the rotational speed of the motor, the load of the motor, and a change in the motor characteristics caused by temperature, and the drive efficiency of the motor may be reduced.

As a technique for solving such a problem, Patent Document 1 discloses a method of adjusting a phase of a drive voltage of a coil with respect to a phase of a coil current of a motor. Specifically, the motor drive control device disclosed in Patent Document 1 provides a detection interval for detecting an induced voltage generated in a coil of a predetermined phase of the motor before and after a point (voltage zero crossing point) where the induced voltage becomes zero by stopping the drive voltage of the coil. In addition, the motor drive control device detects the phase of the induced voltage of the coil by comparing the magnitude of the terminal voltage of the coil to the magnitude of the threshold voltage in the detection interval, and adjusts the phase of the drive voltage.

CITATION LIST

Patent Literature

Patent Document 1: JP 2015-23734 A
Patent Document 2: JP 2015-62329 A

SUMMARY OF INVENTION

Technical Problem

However, in the technique disclosed in Patent Document 1, driving of the coil needs to be stopped in the detection period. Therefore, if a length of the period (detection period) for stopping driving of the coil is not appropriately set, the drive waveform of the motor may be disturbed, and rotation of the motor may be unstable.

Therefore, the inventors of the present application believe that a new motor drive control technique for improving the drive efficiency of a motor is necessary.

The present invention is to solve the problems described above, and an object of the present invention is to improve the drive efficiency of a motor.

Solution to Problem

A motor drive control device according to an exemplary embodiment of the present invention includes a control circuit generating a drive control signal being a PWM signal for driving a motor including a coil of at least one phase and a drive circuit including a high side switch and a low side switch, the high side switch and the low side switch being connected in series to each other and provided to correspond to the coil of each phase of the motor, the drive circuit alternately turning on and off the high side switch and the low side switch according to the drive control signal to switch an energizing direction of the coil of the corresponding phase, the control circuit including a target point determination unit determining a target point of zero crossing of a coil current of a predetermined phase based on a position detection signal synchronized with an induced voltage of the coil of the predetermined phase of the motor and corresponding to a rotational position of a rotor of the motor, a current zero crossing point estimation unit estimating a zero crossing point of the coil current of the predetermined phase by detecting a change in a current direction of the coil current of the predetermined phase at a predetermined timing in every cycle of the PWM signal, an adjustment instruction signal generation unit generating at least one of a phase adjustment instruction signal for instructing phase adjustment of the coil current and a frequency adjustment instruction signal for instructing frequency adjustment of the PWM signal according to a phase difference between the target point determined by the target point determination unit and the zero crossing point estimated by the current zero crossing point estimation unit such that the phase difference is within a predetermined range, and a drive control signal generation unit generating the drive control signal based on at least one of the phase adjustment instruction signal and the frequency adjustment instruction signal generated by the adjustment instruction signal generation unit.

Advantageous Effects of Invention

According to an aspect of the present invention, it is possible to improve the drive efficiency of a motor.

DESCRIPTION OF EMBODIMENTS

1. Overview of Embodiments

Figure 1:
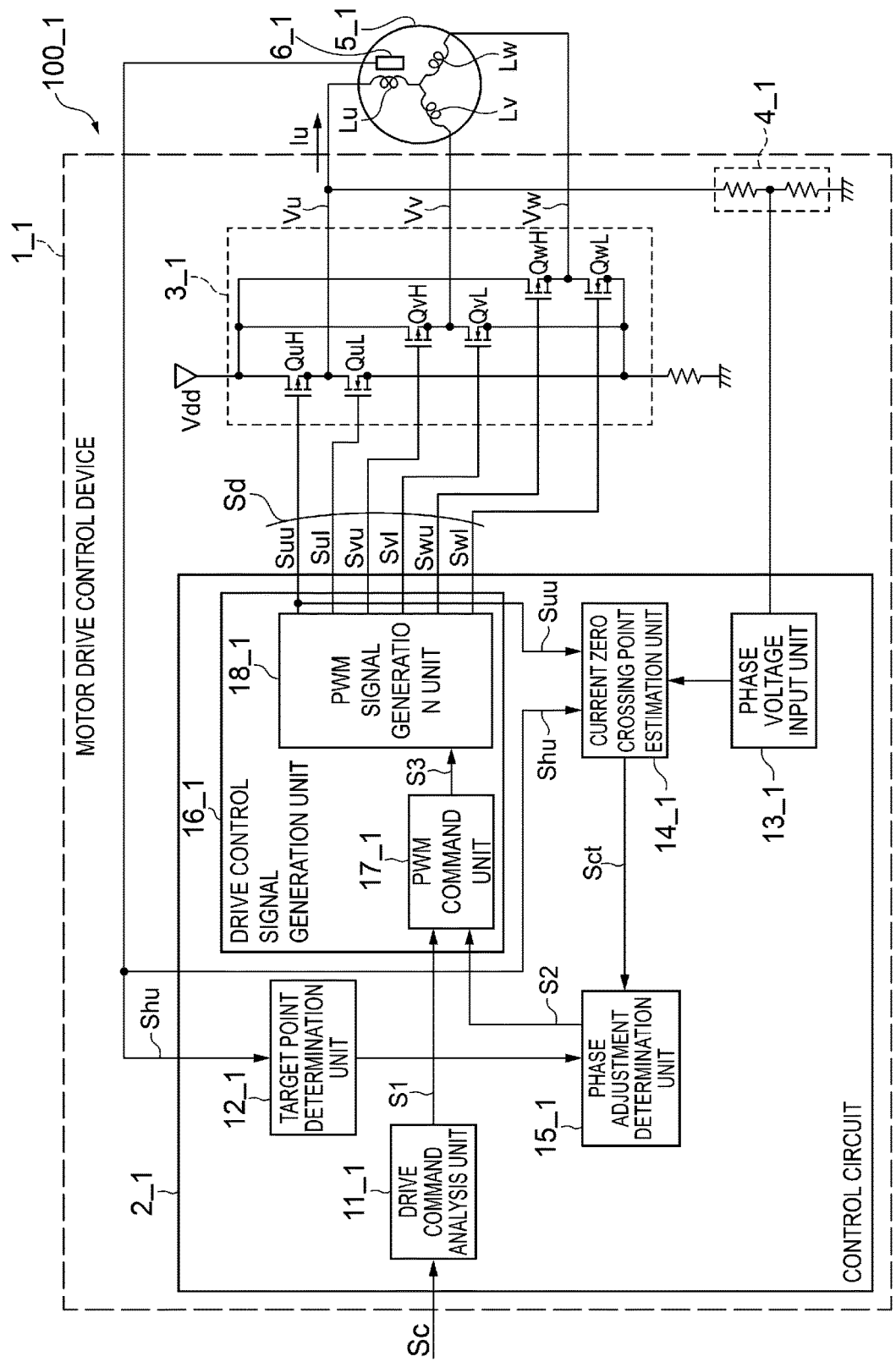
FIG. 1 is a diagram illustrating a configuration of a motor unit including a motor drive control device according to a first embodiment of the present invention.

First, an overview of typical embodiments of the invention disclosed in the present application will be described. In the following description, reference signs in the drawings corresponding to the components of the invention are illustrated in parentheses, as an example.

[1] A motor drive control device (1_1, 1_2) according to an exemplary embodiment of the present invention includes a control circuit (2_1, 2_2) generating a drive control signal (Sd, Suu, Sul, Svu, Svl, Swu, Swl) being a PWM signal for driving a motor (5_1, 5_2) including a coil of at least one phase, and a drive circuit (3_1, 3_2) including a high side switch (QuH, QvH, QwH) and a low side switch (QuL, QvL, QwL), the high side switch and the low side switch being connected in series to each other and provided to correspond to the coil (Lu, Lv, Lw) of each phase of the motor, the drive circuit alternately turning on and off the high side switch and the low side switch according to the drive control signal to switch an energizing direction of the coil of the corresponding phase, the control circuit including a target point determination unit (12_1, 12_2) determining a target point (P(tp)) of zero crossing of a coil current of a predetermined phase based on a position detection signal (Shu) synchronized with an induced voltage of the coil of the predetermined phase (e.g., a U phase) of the motor and corresponding to a rotational position of a rotor of the motor, a current zero crossing point estimation unit (14_1, 14_2) estimating a zero crossing point (Q(tq)) of the coil current of the predetermined phase by detecting a change in a current direction of the coil current of the predetermined phase at a predetermined timing in every cycle of the PWM signal, an adjustment instruction signal generation unit (15_1, 19_2) generating at least one of a phase adjustment instruction signal (Sp) for instructing phase adjustment of the coil current and a frequency adjustment instruction signal (SO for instructing frequency adjustment of the PWM signal according to a phase difference (Δφ=tp−tq) between the target point determined by the target point determination unit and the zero crossing point estimated by the current zero crossing point estimation unit such that the phase difference (Δφ) is within a predetermined range, and a drive control signal generation unit (16_1, 16_2) generating the drive control signal based on at least one of the phase adjustment instruction signal (Sp) and the frequency adjustment instruction signal (Sf) generated by the adjustment instruction signal generation unit (15_1, 19_2).

[2] In the motor drive control device described in [1] above, the current zero crossing point estimation unit may compare a drive voltage of the coil of the predetermined phase to at least one of an ON period and an OFF period of a signal for turning on or off the high side switch corresponding to the predetermined phase in every cycle of the PWM signal and estimate the zero crossing point of the coil current of the predetermined phase based on the comparison result, and the adjustment instruction signal generation unit may be configured of a phase adjustment determination unit determining whether the phase adjustment of the coil current is necessary based on the phase difference between the target point determined by the target point determination unit and the zero crossing point estimated by the current zero crossing point estimation unit.

[3] In the motor drive control device described in [2] above, the current zero crossing point estimation unit may determine whether an ON period of the drive voltage matches the ON period of the signal for turning on or off the high side switch, detect at least one of a timing for switching from a state of the ON period of the drive voltage matching the ON period of the signal for turning on or off the high side switch to a state of the ON period of the drive voltage not matching the ON period of the signal for turning on or off the high side switch and a timing for switching from the state of the ON period of the drive voltage not matching the ON period of the signal for turning on or off the high side switch to the state of the ON period of the drive voltage matching the ON period of the signal for turning on or off the high side switch, and estimate the detected timing as a zero crossing point of the coil current of the predetermined phase.

[4] In the motor drive control device described in [3] above, the current zero crossing point estimation unit may determine that the ON period of the drive voltage matches the ON period of the signal for turning on or off the high side switch when a difference ($|Th-Tv|$) between the ON period of the drive voltage and the ON period of the signal for turning on or off the high side switch is less than a threshold (Tth), and determine that the ON period of the drive voltage does not match the ON period of the signal for turning on or off the high side switch when the difference ($|Th-Tv|$) between the ON period of the drive voltage and the ON period of the signal for turning on or off the high side switch is equal to or greater than the threshold (Tth).

[5] In the motor drive control device described in [4] above, the drive control signal generation unit may generate the drive control signal such that a dead time period (Td) for simultaneously turning off the high side switch and the low side switch when the high side switch and the low side switch are switched between ON and OFF states is provided, and the threshold is a value (Td) based on the dead time period.

[6] In the motor drive control device described in [3] above, the current zero crossing point estimation unit may determine that the timing for switching the state of the ON period of the drive voltage matching the ON period of the signal for turning on or off the high side switch to the state of the ON period of the drive voltage not matching the ON period of the signal for turning on or off the high side switch is a zero crossing point of a polarity of the coil current switching from positive to negative, and determine that the timing for switching the state of the ON period of the drive voltage not matching the ON period of the signal for turning on or off the high side switch to the state of the ON period of the drive voltage matching the ON period of the signal for turning on or off the high side switch is a zero crossing point of the polarity of the coil current switching from negative to positive.

[7] In the motor drive control device described in [2] above, the phase adjustment determination unit may calculate the phase difference between the target point and the zero crossing point of the coil current, and instruct the drive control signal generation unit to shift an output timing of the drive control signal by a time corresponding to the phase difference.

[8] In the motor drive control device described in [1] above, the current zero crossing point estimation unit may compare a drive voltage of the coil of the predetermined phase to at least one of an ON period and an OFF period of a signal for turning on or off the high side switch corresponding to the predetermined phase, and detect a change in the current direction of the coil current of the predetermined phase based on the comparison result.

[9] In the motor drive control device described in [1] above, the control circuit may synchronize the PWM signal with the position detection signal at a timing before estimating the zero crossing point of the coil current of the predetermined phase.

[10] In the motor drive control device described in [1] above, the adjustment instruction signal generation unit may generate only the phase adjustment instruction signal until the phase difference is within a first range when the phase difference is outside the first range, and generate at least one of the frequency adjustment instruction signal and the phase adjustment instruction signal when the phase difference is within the first range.

[11] In the motor drive control device described in [10] above, the adjustment instruction signal generation unit may prohibit generation of the phase adjustment instruction signal and generate only the frequency adjustment instruction signal when the phase difference is within a second range inside the first range.

[12] In the motor drive control device described in [10] above, the adjustment instruction signal generation unit may give an instruction to adjust a frequency of the PWM signal in a minimum unit of the frequency using the frequency adjustment instruction signal, and generate the frequency adjustment instruction signal at predetermined time intervals.

[13] In the motor drive control device described in [12] above, the adjustment instruction signal generation unit may, using the frequency adjustment instruction signal, give an instruction to increase the frequency of the PWM signal until the frequency reaches a maximum frequency in a predetermined frequency range or give an instruction to decrease the frequency of the PWM signal until the frequency reaches a minimum frequency in the predetermined frequency range.

[14] In the motor drive control device described in [11] above, the adjustment instruction signal generation unit may end the generation of the frequency adjustment instruction signal when the phase difference is within a third range inside the second range.

[15] In the motor drive control device described in [1] above, the drive control signal generation unit may include a PWM command unit generating an operation amount of the drive control signal and a PWM signal generation unit generating the drive control signal based on the operation amount, the PWM command unit including a rotational speed setting unit determining a set value of a rotational speed based on a command value of the rotational speed and a current rotational speed, a phase setting unit determining a set value of a phase based on the phase adjustment instruction signal, a frequency setting unit determining a set value of a frequency based on the frequency adjustment instruction signal, and an operation amount determination unit determining the operation amount based on the determined set value of the rotational speed, set value of the phase, and set value of the frequency.

[16] A motor unit (100_1, 100_2) according to an exemplary embodiment of the present invention includes the motor drive control device (1_1, 1_2) according to any one of the above [1] to [15] described above and the motor (5_1, 5_2).

[17] A method according to an exemplary embodiment of the present invention is a motor control method performed by a motor drive control device (1_1, 1_2) including a control circuit (2_1, 2_2) generating a drive control signal being a PWM signal for driving a motor including a coil of at least one phase, and a drive circuit (3_1, 3_2) including a high side switch and a low side switch, the high side switch and the low side switch being connected in series to each other and provided to correspond to the coil of each phase of the motor, the drive circuit alternately turning on and off the high side switch and the low side switch according to the drive control signal to switch an energizing direction of the coil of the corresponding phase. The method includes a first step (S3) of determining, by the control circuit, a target point of zero crossing of a coil current of a predetermined phase based on a position detection signal synchronized with an induced voltage of the coil of the predetermined phase of the motor and corresponding to a rotational position of a rotor of the motor, a second step (S4) of estimating, by the control circuit, a zero crossing point of the coil current of the predetermined phase by detecting a change in a current direction of the coil current of the predetermined phase at a predetermined timing in every cycle of the PWM signal, a third step (S52, S53) of generating, by the control circuit, at least one of a phase adjustment instruction signal for instructing phase adjustment of the coil current and a frequency adjustment instruction signal for instructing frequency adjustment of the PWM signal according to a phase difference between the target point determined in the first step and the zero crossing point estimated in the second step such that the phase difference is within a predetermined range, and a fourth step (S54 to S56) of generating, by the control circuit, the drive control signal based on the determination result of the third step.

[18] In the motor drive control method described in [17] above, the second step may include comparing a drive voltage of the coil of the predetermined phase to at least one of an ON period and an OFF period of a signal for turning on or off the high side switch corresponding to the predetermined phase and estimating a zero crossing point of the coil current of the predetermined phase based on the comparison result, and the third step includes determining whether the phase adjustment of the coil current is necessary based on the phase difference between the target point determined in the first step and the zero crossing point estimated in the second step.

2. Specific Examples of Embodiments

Specific examples of the embodiments according to the present invention will be described below with reference to the drawings. In the following description, components common to the respective embodiments are denoted by the same reference signs, and repeated descriptions are omitted.

First Embodiment

FIG. 1 is a diagram illustrating a configuration of a motor unit including a motor drive control device according to a first embodiment of the present invention.

A motor unit 100_1 illustrated in FIG. 1 includes a motor 5_1, a position detector 6_1, and a motor drive control device 1_1.

The motor 5_1 is a motor including at least one coil. The motor 5_1 is, for example, a brushless DC motor including coils (windings) Lu, Lv, and Lw of three phases (a U phase, a V phase, and a W phase).

The position detector 6_1 is a device generating a position detection signal Shu according to the rotation of a rotor of the motor 5_1. The position detector 6_1 is, for example, a Hall element. The Hall element detects the magnetic pole of the rotor, and outputs a Hall signal having a voltage changing according to the rotation of the rotor. The Hall signal is, for example, a pulse signal and is input to the motor drive control device 1_1 as the position detection signal Shu.

In the motor unit 100_1, one Hall element as the position detector 6_1 is disposed at a position corresponding to any one of the coils Lu, Lv, and Lw of the U phase, the V phase, and the W phase of the motor 5_1. Thus, the Hall signal output from the position detector 6_1 is a signal synchronized with an induced voltage of any one of the coils Lu, Lv, and Lw of the U phase, the V phase, and the W phase of the motor 5_1.

In the present embodiment, one Hall element as the position detector 6_1 is disposed at a position corresponding to the coil of the U phase, for example. As a result, the position detection signal (Hall signal) Shu is a signal synchronized with the induced voltage of the coil Lu of the U phase of the motor 5_1, and corresponds to the rotational position of the rotor of the motor 5_1.

Note that, in the present embodiment, the position detector 6_1 is disposed at a position where the rising edge of the position detection signal (Hall signal) Shu output from the position detector 6_1 can be detected at a timing delayed by an electrical angle of 30 degrees from the zero crossing point of the induced voltage of the coil Lu of the U phase as a specific example. Details will be described below.

The motor drive control device 1_1 is a device controlling driving of the motor 5_1. The motor drive control device 1_1 performs sine wave driving of the motor 5_1 by, for example, one sensor drive scheme based on the position detection signal Shu from the one position detector 6_1 (Hall element) provided at the position corresponding to the coil Lu of the U phase.

Specifically, the motor drive control device 1_1 includes a control circuit 2_1, a drive circuit 3_1, and a phase voltage detection circuit 4_1. The motor drive control device 1_1 is supplied with a DC voltage Vdd from an external DC power source (not illustrated). For example, the DC voltage Vdd is supplied to a power line (not illustrated) inside the motor drive control device 1_1 via a protection circuit or the like and input as a power supply voltage to the control circuit 2_1 and the drive circuit 3_1 via the power line.

Note that the DC voltage Vdd may not be directly supplied to the control circuit 2_1, and for example, the voltage obtained by stepping down the DC voltage Vdd by a regulator circuit may be supplied as the power supply voltage to the control circuit 2_1.

The drive circuit 3_1 is a circuit driving the motor 5_1 based on a drive control signal Sd output from the control circuit 2_1 to be described below. The drive control signal Sd is a signal for controlling driving of the motor 5_1. For example, the drive control signal Sd is a PWM signal for performing sine wave driving of the motor 5_1.

The drive circuit 3_1 switches the direction of the motor current to rotate the motor 5_1 by switching the connection destination of the coil of the motor 5_1 between the DC voltage Vdd and a ground potential GND based on the drive control signal Sd. Specifically, the drive circuit 3_1 includes high side switches QuH, QvH, and QwH, and low side switches QuL, QvL, and QwL provided to correspond to the coils Lu, Lv, and Lw of the respective phases of the motor 5_1 and connected to each other in series. The drive circuit 3_1 turns on and off the high side switches QuH, QvH, and QwH, and the low side switches QuL, QvL, and QwL according to the PWM signals Suu, Sul, Svu, Svl, Swu, and Swl as the drive control signal Sd to switch the energizing directions of the coils Lu, Lv, and Lw.

The PWM signals Suu, Sul, Svu, Svl, Swu, and Swl are input correspondingly to the six switches of the high side switches QuH, QvH, and QwH and the low side switches QuL, QvL, and QwL to turn on and off the corresponding switches.

For example, the high side switches QuH, QvH, and QwH are P channel-type metal oxide semiconductor field effect transistors (MOSFETs), and the low side switches QuL, QvL, and QwL are N channel-type MOSFETs.

Note that the high side switches QuH, QvH, and QwH and the low side switches QuL, QvL, and QwL may be other types of power transistors, for example, insulated gate bipolar transistors (IGBTs).

The high side switch QuH and the low side switch QuL of the U phase are connected in series between the DC voltage Vdd and the ground potential GND and constitute one switching leg (or arm) as illustrated in FIG. 1. The connection point of the high side switch QuH and the low side switch QuL is connected to one end of the coil Lu. The high side switch QuH is switched between ON and OFF states according to the PWM signal Suu. The low side switch QuL is switched between ON and OFF states according to the PWM signal Sul.

The high side switch QvH and the low side switch QvL of the V phase are connected in series between the DC voltage Vdd and the ground potential GND and constitute one switching leg. The connection point of the high side switch QvH and the low side switch QvL is connected to one end of the coil Lv. The high side switch QvH is switched between ON and OFF states according to the PWM signal Svu. The low side switch QvL is switched between ON and OFF states according to the PWM signal Svl.

The high side switch QwH and the low side switch QwL of the W phase are connected in series between the DC voltage Vdd and the ground potential GND and constitute one switching leg. The connection point of the high side switch QwH and the low side switch QwL is connected to one end of the coil Lw. The high side switch QwH is switched between ON and OFF states according to the PWM signal Swu. The low side switch QwL is switched between ON and OFF states according to the PWM signal Swl.

Note that a parasitic diode is formed in each transistor of the high side switches QuH, QvH, and QwH and the low side switches QuL, QvL, and QwL, and these diodes function as reflux diodes for returning a coil current to the DC voltage Vdd or the ground potential GND.

Note that the drive circuit 3_1 may include a pre-drive circuit for driving the high side switch and the low side switch of each phase based on the drive control signal Sd. Additionally, a sense resistor for detecting a current of the motor 5_1 may be connected to the ground potential GND side of the drive circuit 3_1 as illustrated in FIG. 1.

The phase voltage detection circuit 4_1 is a circuit for detecting a drive voltage of a coil of a predetermined phase of the motor 5_1. In the present embodiment, the phase voltage detection circuit 4_1 detects the drive voltage Vu of the coil Lu of the U phase, for example, and inputs the drive voltage to the control circuit 2_1. The phase voltage detection circuit 4_1 is, for example, a resistive voltage divider circuit connected between one end of the coil Lu connected to the high side switch QuH and the low side switch QuL of the U phase and the ground potential GND.

Note that, although FIG. 1 illustrates, as an example, a configuration of the resistive voltage divider circuit as the phase voltage detection circuit 4_1 dividing the drive voltage Vu of the coil Lu and inputting the drive voltage to the control circuit 2_1, the drive voltage Vu of the coil Lu may be directly input to the control circuit 2_1 without providing the phase voltage detection circuit 4_1.

The control circuit 2_1 is a circuit for centrally controlling operations of the motor drive control device 1_1. In the present embodiment, the control circuit 2_1 is, for example, a program processing device configured such that a processor such as a CPU, various storage devices such as a RAM, a ROM, and a flash memory, and peripheral circuits such as a counter (timer), an A/D conversion circuit, a D/A conversion circuit, a clock generation circuit, and an input/output interface circuit are connected to each other via a bus or a dedicated line. For example, the control circuit 2_1 is a micro controller unit (MCU).

Note that, the control circuit 2_1 and the drive circuit 3_1 may be configured to be packaged as one semiconductor integrated circuit (IC), or may be configured to be packaged as individual integrated circuits, mounted at a circuit board, and electrically connected to each other at the circuit board.

The control circuit 2_1 has a basic function of controlling energization of the motor 5_1 by generating the drive control signal Sd and providing the drive control signal Sd to the drive circuit 3_1. Specifically, based on a drive command signal Sc for instructing a target value regarding driving of the motor 5_1 input from the outside (e.g., a host device) and the position detection signal Shu input from the position detector 6_1, the control circuit 2_1 generates the drive control signal Sd and provides the drive control signal Sd to the drive circuit 3_1 to bring the motor 5_1 into the drive state specified by the drive command signal Sc.

Additionally, in addition to the basic function described above, the control circuit 2_1 has a function of adjusting an energization timing of the motor 5_1 (referred to as a "phase adjustment function" below) so that the phase of the induced voltage of the coil of a predetermined phase of the motor 5_1 matches the phase of the coil current in order to improve the drive efficiency of the motor 5_1.

As illustrated in FIG. 1, the control circuit 2_1 includes, for example, a drive command analysis unit 11_1, a target point determination unit 12_1, a phase voltage input unit 13_1, a current zero crossing point estimation unit 14_1, a phase adjustment determination unit 15_1, and a drive control signal generation unit 16_1 as functional units for implementing the respective functions described above.

Each of the above-described functional units of the control circuit 2_1 is implemented, for example, by program processing by the MCU serving as the control circuit 2_1. Specifically, the processor constituting the MCU serving as the control circuit 2_1 performs various calculations according to the program stored in the memory to control the various peripheral circuits constituting the MCU, so that the aforementioned functional units are implemented.

The drive command analysis unit 11_1 receives, for example, a drive command signal Sc output from a host device (not illustrated). The drive command signal Sc is a signal for instructing a target value regarding driving of the motor 5_1, and is, for example, a speed command signal for instructing a target rotational speed of the motor 5_1.

The drive command analysis unit 11_1 analyzes the target rotational speed specified by the drive command signal Sc. For example, when the drive command signal Sc is a PWM signal having a duty ratio corresponding to the target rotational speed, the drive command analysis unit 11_1 analyzes the duty ratio of the drive command signal Sc and outputs information of the rotational speed corresponding to the duty ratio as a target rotational speed S1.

The drive control signal generation unit 16_1 calculates an operation amount S3 of the motor 5_1 so that the rotational speed of the motor 5_1 matches the target rotational speed S1, and generates the drive control signal Sd based on the calculated operation amount S3. Further, functions related to the phase adjustment among the functions of the drive control signal generation unit 16_1 will be described below.

The drive control signal generation unit 16_1 includes, for example, a PWM command unit 17_1 and a PWM signal generation unit 18_1. The PWM command unit 17_1 calculates the operation amount S3 of the motor 5_1 based on the target rotational speed S1 output from the drive command analysis unit 11_1 and a determination result S2 from the phase adjustment determination unit 15_1 to be described below.

The operation amount S3 includes information specifying the drive amount of the motor 5_1 necessary for rotating the motor 5_1 at the target rotational speed S1. For example, when the motor 5_1 is PWM-driven as in the present embodiment, the operation amount S3 includes a value specifying a cycle of a PWM signal (PWM cycle) as the drive control signal Sd, a value specifying an ON period of the PWM signal, and a value specifying the output timing of the PWM signal. Note that details of the value specifying the output timing of the PWM signal will be described below.

For example, the PWM command unit 17_1 calculates the value specifying the PWM cycle of the drive control signal Sd and the value specifying the ON period of the PWM signal based on the target rotational speed S1 output from the drive command analysis unit 11_1, and outputs the values as the operation amount S3.

Note that, when the motor drive control device 1_1 has a feedback control function, for example, the PWM command unit 17_1 may calculate an actual rotational speed of the motor 5_1 based on the position detection signal Shu, perform a proportional-integral-differential (PID) control arithmetic operation such that the calculated actual rotational speed matches the target rotational speed S 1, and calculate the operation amount S3 (PWM cycle and ON period) of the motor 5_1.

The PWM signal generation unit 18_1 generates the drive control signal Sd based on the operation amount S3 calculated by the PWM command unit 17_1. Specifically, the PWM signal generation unit 18_1 generates each of the six types of PWM signals Suu, Sul, Svu, Svl, Swu, and Swl having the PWM cycle and the ON period specified by the operation amount S3, and outputs the PWM signal as the drive control signal Sd. The PWM signal Suu is a signal for switching the high side switch QuH of the U phase between ON and OFF states. The PWM signal Sul is a signal for switching the low side switch QuL of the U phase between ON and OFF states. The PWM signal Svu is a signal for switching the high side switch QvH of the V phase between ON and OFF states. The PWM signal Svl is a signal for switching the low side switch QvL of the V phase between ON and OFF states. The PWM signal Swu is a signal for switching the high side switch QwH of the W phase between ON and OFF states. The PWM signal Swl is a signal for switching the low side switch QwL of the W phase between ON and OFF states.

In the present embodiment, a dead time period Td is provided in order not to turn on the high side switch and the low side switch constituting each of the switching legs of the U phase, the V phase, and the W phase at the same time. In other words, the PWM signal generation unit 18_1 generates the drive control signal Sd (the above six types of PWM signals) such that, when the high side switch and the low side switch constituting each of the switching legs of the U phase, the V phase, and the W phase are switched between ON and OFF states, the dead time period Td for turning off the high side switch and the low side switch at the same time is provided. Note that details of the dead time period Td will be described below.

The target point determination unit 12_1, the phase voltage input unit 13_1, the current zero crossing point estimation unit 14_1, and the phase adjustment determination unit 15_1 are functional units for implementing the phase adjustment function of the motor 5_1 described above. Prior to describing each of the functional units in detail, an overview of the phase adjustment function according to the present embodiment will be described.

Figure 2:
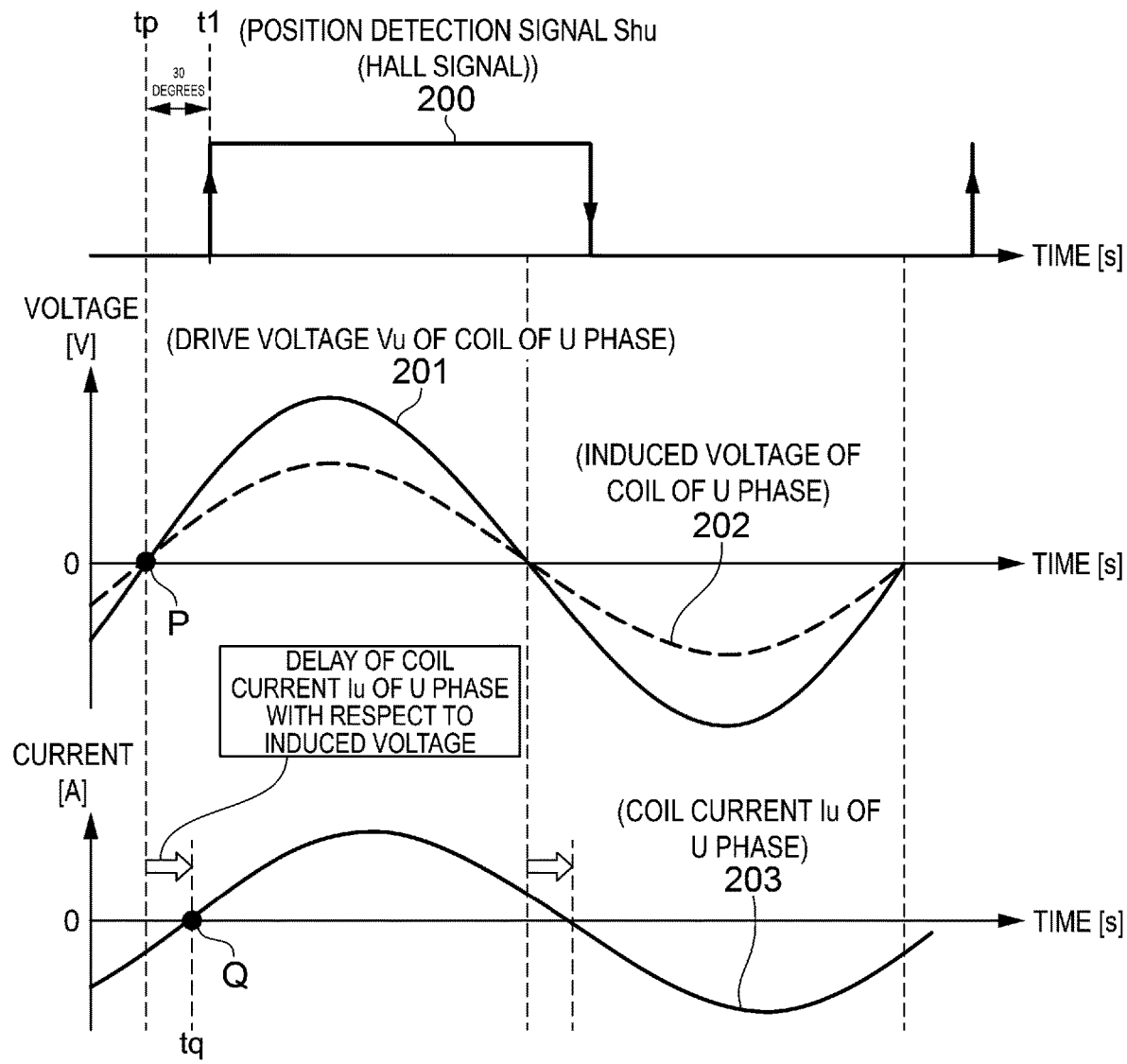
FIG. 2 is a diagram for describing a phase adjustment function of the motor drive control device according to the first embodiment, and is a diagram for describing phase adjustment of a coil current adjustment function by a motor drive control device according to a second embodiment.

FIG. 2 is a diagram for describing the phase adjustment function by the motor drive control device 1_1 according to the first embodiment.

A waveform 200 of the position detection signal (Hall signal) Shu output from the position detector 6_1 is shown in the upper part of FIG. 2, a waveform 201 of the drive voltage Vu of the coil Lu of the U phase and a waveform 202 of an induced voltage of the coil Lu of the U phase are shown in the middle part of FIG. 2, and a waveform 203 of the coil current Iu of the coil Lu of the U phase is shown in the lower part of FIG. 2.

As described above, a shift may occur between the phase of the induced voltage and the phase of the coil current of the motor in general due to the rotational speed of the motor, the load of the motor, and a change in motor characteristics caused by temperature. For example, FIG. 2 shows a case of the phase of the coil current Iu of the U phase being delayed with respect to the phase of the induced voltage of the coil Lu of the U phase.

When a phase shift occurs between the coil current Iu and the induced voltage as shown in FIG. 2, the drive efficiency of the motor 5_1 is reduced. Thus, the motor drive control device 1_1 according to the present embodiment detects the shift (phase difference) between the coil current Iu and the induced voltage, and adjusts the energization timing of the motor to reduce the phase difference.

Specifically, first, the motor drive control device 1_1 detects the zero crossing point of the induced voltage by using the fact that the position detection signal (Hall signal) Shu output from the position detector 6_1 (Hall element) provided to correspond to a predetermined phase is synchronized with the induced voltage of the coil of the predetermined phase, and sets the zero crossing point as a target point P of zero crossing of the coil current Iu.

In the present embodiment, for example, the position detector 6_1 is disposed in advance at a position where the rising edge of the position detection signal Shu of the position detector 6_1 can be detected at a timing delayed by an electrical angle of 30 degrees from the zero crossing point of the induced voltage of the coil Lu of the U phase as illustrated in FIG. 2. Thus, the motor drive control device 1_1 can detect (estimate) the zero crossing point of the induced voltage of the coil Lu by detecting the rising edge of the position detection signal Shu.

Further, the installation position of the position detector 6_1 is only required to be a position where the phase difference between the timing for detecting the rising edge of the position detection signal Shu and the zero crossing point of the induced voltage of the coil of the predetermined phase is known, and is not limited to the above example.

The motor drive control device 1_1 detects the rising edge or the falling edge of the position detection signal Shu, and estimates the zero crossing point of the induced voltage from at least one of the detected edges. The motor drive control device 1_1 determines that the estimated zero crossing point of the induced voltage is the target point P of zero crossing of the coil current Iu.

Next, the motor drive control device 1_1 compares the drive voltage (phase voltage) of the coil of a predetermined phase (the U phase in the present embodiment) to at least one of the ON period and the OFF period of a signal for turning on or off the high side switch corresponding to the predetermined phase and estimates a zero crossing point Q of the coil current of the predetermined phase of the motor based on the comparison result. Note that details of the method for estimating the zero crossing point of the coil current will be described below.

In addition, the motor drive control device 1_1 adjusts the phase of the coil current Iu so that the estimated zero crossing point Q of the coil current Iu matches the target point P of zero crossing of the coil current Iu (the zero crossing point of the induced voltage). For example, the phase of the coil current Iu is adjusted by adjusting the timing for applying the drive voltage Vu to the coil Lu of the U phase (performing advance angle control or delay angle control) so that the zero crossing point Q of the coil current Iu of the U phase matches the target point P as illustrated in FIG. 2. This adjustment allows the motor drive control device 1_1 to improve the drive efficiency of the motor 5_1.

Each functional unit for implementing the phase adjustment function described above will be described in detail below.

The target point determination unit 12_1 determines the target point of zero crossing of the coil current of the predetermined phase based on the position detection signal Shu synchronized with the induced voltage of the coil of the predetermined phase of the motor 5_1 and corresponding to the rotational position of the rotor of the motor 5_1.

In the present embodiment, the target point determination unit 12_1 detects the rising edge or the falling edge of the position detection signal Shu synchronized with the induced voltage of the coil Lu of the U phase, and determines a zero crossing point of the induced voltage of the coil Lu of the U phase, that is, the target point P of zero crossing of the coil current Iu of the U phase based on the detected edge. In FIG. 2, for example, when the target point determination unit 12_1 detects the rising edge of the position detection signal Shu at a time t1, the target point determination unit 12_1 determines that a time (timing) t0 being earlier than the time t1 by 30 degrees of electrical angle is the target point P. Note that the target point P is determined in the same method as well when the falling edge of the position detection signal Shu is detected.

The phase voltage input unit 13_1 acquires the value of the voltage of the predetermined phase of the motor 5_1. For example, the phase voltage input unit 13_1 acquires the drive voltage Vu of the coil Lu of the U phase detected by the phase voltage detection circuit 4_1, converts the drive voltage Vu into a digital value, and gives the digital value to the current zero crossing point estimation unit 14_1.

The current zero crossing point estimation unit 14_1 estimates the zero crossing point of the coil current of the predetermined phase by detecting a change in the current direction of the coil current of the predetermined phase at a predetermined timing in every cycle of the PWM signal. The current zero crossing point estimation unit 14_1 specifically is a functional unit of comparing the drive voltage (phase voltage) of the coil of the predetermined phase to at least one of the ON and OFF periods of the signal for turning on or off the high side switch corresponding to the predetermined phase in every cycle of the drive control signal Sd being a PWM signal and estimating the zero crossing point of the coil current of the predetermined phase based on the comparison result. The method for estimating the zero crossing point of the coil current by the current zero crossing point estimation unit 14_1 will be described below in detail with reference to the drawings.

Figure 3A:
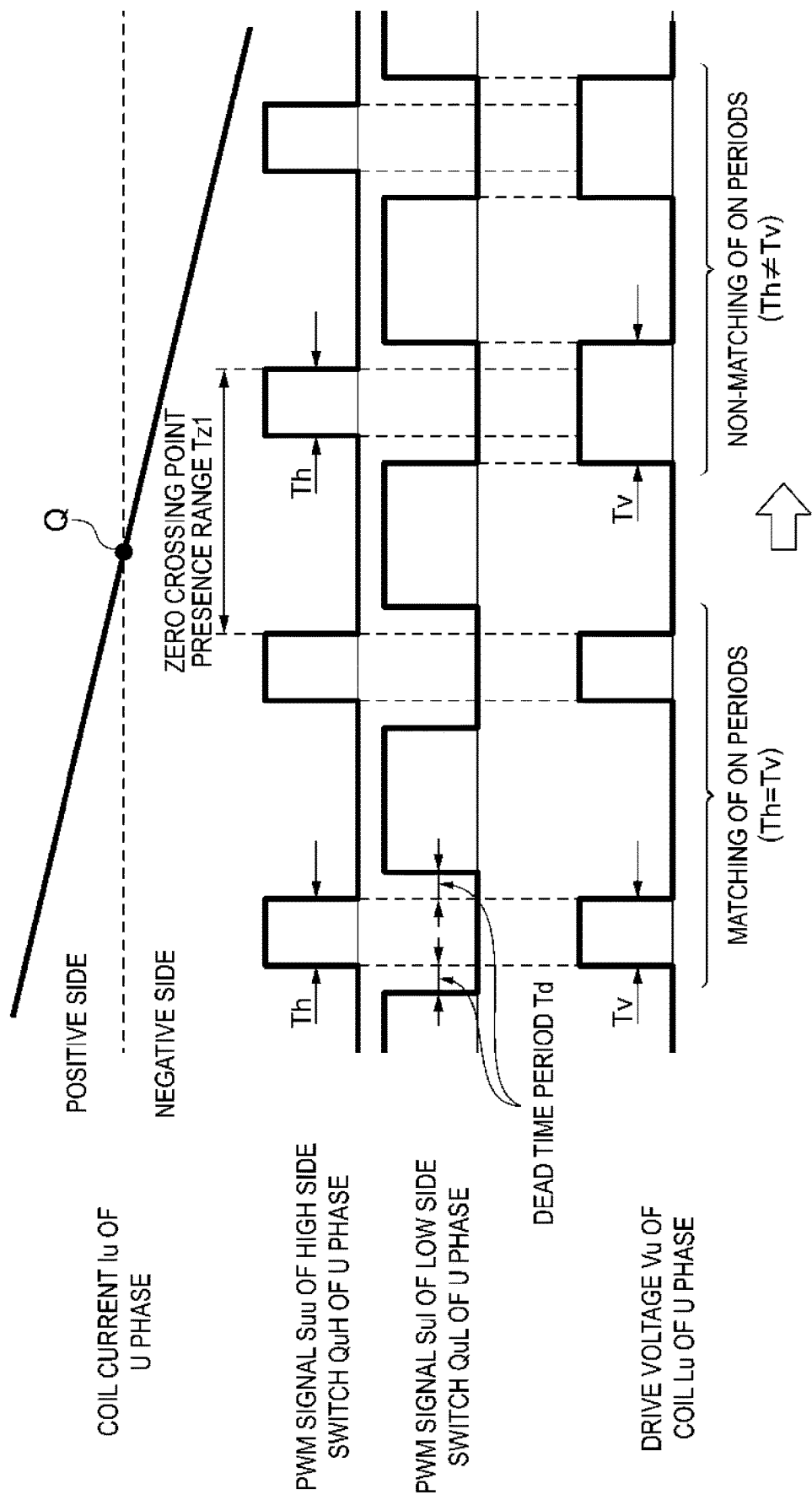
FIG. 3A is a timing chart showing changes in PWM signals Suu and Sul of a U phase and a drive voltage Vu of a coil Lu when a coil current Iu of the U phase is switched from a positive (+) polarity to a negative (−) polarity.

FIG. 3A is a timing chart showing changes in the PWM signals Suu and Sul of the U phase and the drive voltage Vu of the coil Lu when the coil current Iu of the U phase is switched from the positive (+) polarity to the negative (−) polarity.

Figure 3B:
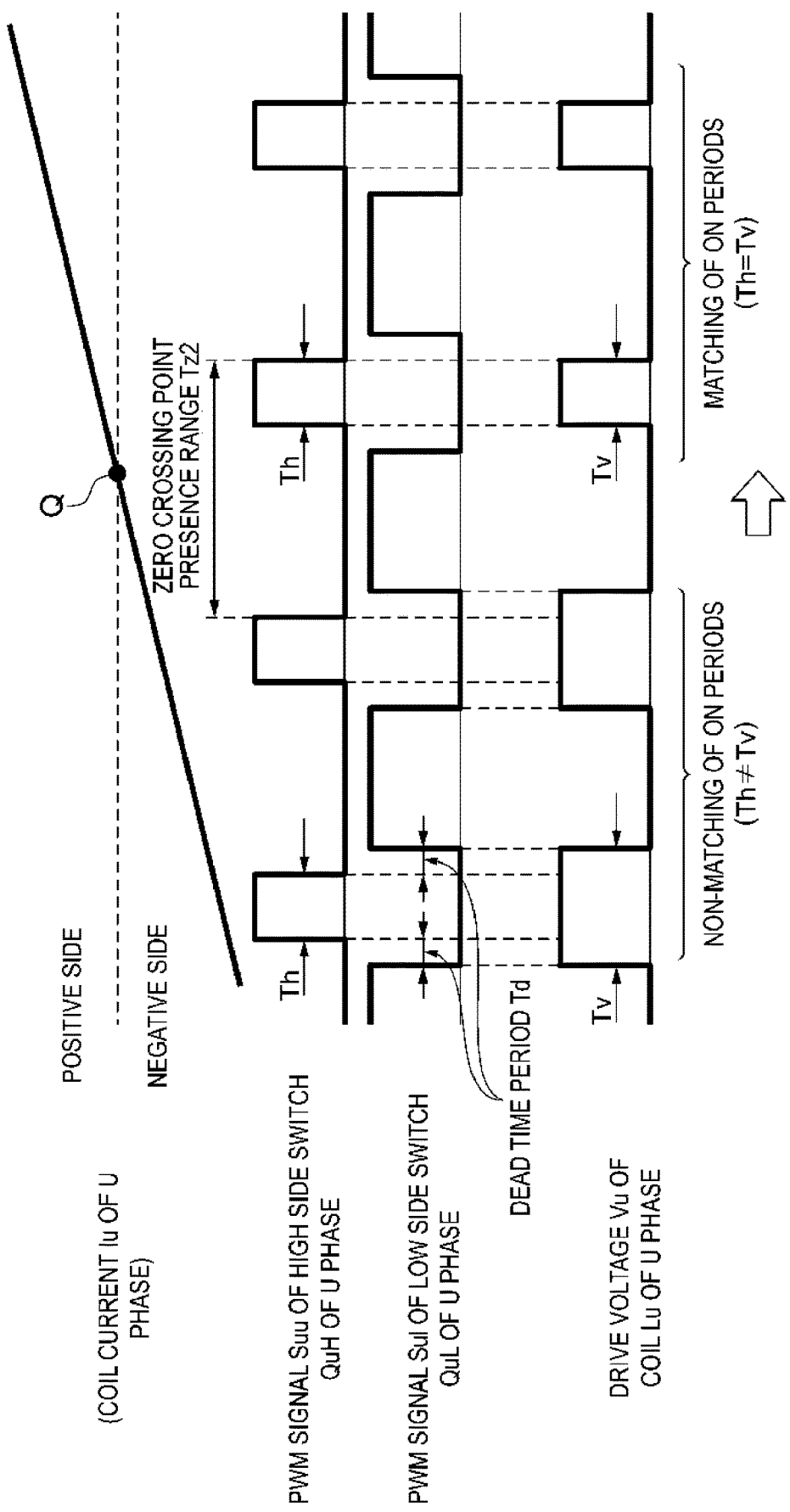
FIG. 3B is a timing chart showing changes in the PWM signals Suu and Sul of the U phase and the drive voltage Vu of the coil Lu when the coil current Iu of the U phase is switched from the negative (−) polarity to the positive (+) polarity.

FIG. 3B is a timing chart showing changes in the PWM signals Suu and Sul of the U phase and the drive voltage Vu of the coil Lu when the coil current Iu of the U phase is switched from the negative (−) polarity to the positive (+) polarity.

In FIGS. 3A and 3B, waveforms of the coil current Iu of the U phase, the PWM signal Suu for driving the high side switch QuH of the U phase, the PWM signal Sul for driving the low side switch QuL of the U phase, and the drive voltage Vu of the coil Lu of the U phase are shown in this order from the upper part to the lower part. Note that, in FIGS. 3A and 3B, the horizontal axis represents time, and the vertical axis represents current or voltage.

Figure 4A:
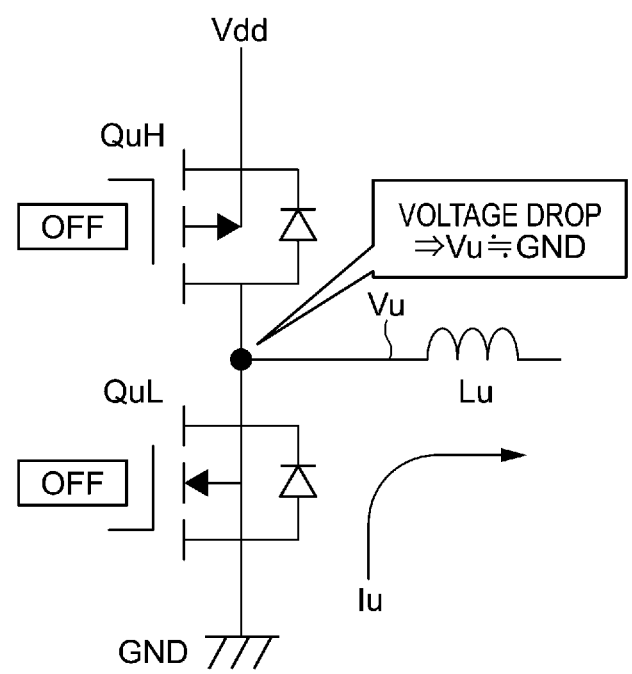
FIG. 4A is a diagram for describing a state when a high side switch QuH and a low side switch QuL of the U phase are turned off in a state of the positive polarity coil current Iu flowing in the coil Lu of the U phase.

FIG. 4A is a diagram for describing a state when the high side switch QuH and the low side switch QuL of the U phase are turned off in a state of the positive (+) polarity coil current Iu flowing in the coil Lu of the U phase.

Figure 4B:
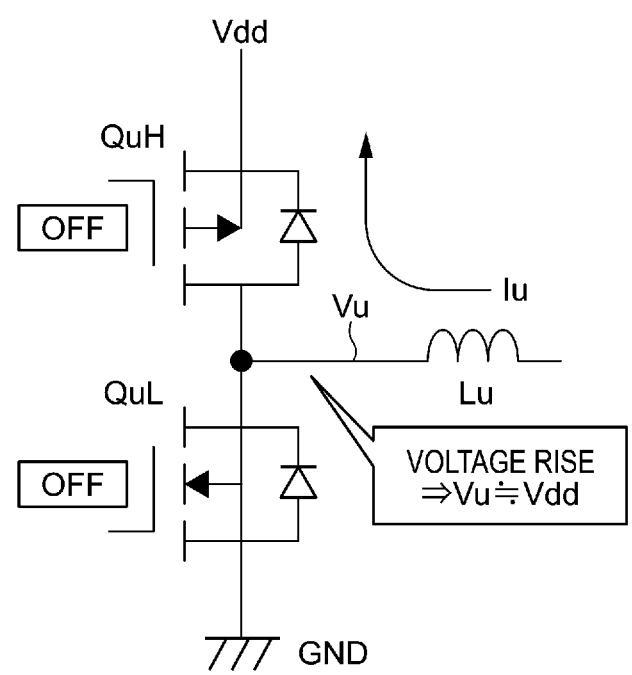
FIG. 4B is a diagram for describing a state when the high side switch QuH and the low side switch QuL of the U phase are turned off in a state of the negative polarity coil current Iu flowing in the coil Lu of the U phase.

FIG. 4B is a diagram for describing a state when the high side switch QuH and the low side switch QuL of the U phase are turned off in a state of the negative (−) polarity coil current Iu flowing in the coil Lu of the U phase.

For example, when the PWM signal Suu is at a high level and the PWM signal Sul is at a low level, the high side switch QuH of the U phase is turned on and the low side switch QuL of the U phase is turned off as illustrated in FIG. 3A. At this time, since a current flows from the DC voltage Vdd to the coil Lu of the U phase via the high side switch QuH of the U phase, the coil current Iu of the U phase has a positive (+) polarity.

In this state, that is, in the state of the positive (+) polarity coil current Iu flowing in the coil Lu of the U phase, when the high side switch QuH and the low side switch QuL of the U phase are turned off together, the coil Lu attempts to keep the current flowing. For this reason, the positive polarity coil current Iu flows via the parasitic diode of the low side switch QuL from the ground potential GND as illustrated in FIG. 4A. As a result, the drive voltage Vu of the coil Lu decreases to near the ground potential GND.

Thus, in the dead time period Td for tuning off the high side switch QuH and the low side switch QuL of the U phase together when the coil current Iu of the U phase has a positive (+) polarity, the drive voltage Vu of the U phase is at a low level as illustrated in FIG. 3A.

As a result, in the period of the coil current Iu of the U phase having a positive (+) polarity, a first period Tv of the drive voltage Vu of the coil Lu of the U phase being at a high level matches a second period Th of the PWM signal Suu for switching on and off the high side switch QuH of the U phase being at a high level in one cycle of the PWM signal Suu as illustrated in FIG. 3A.

On the other hand, when the PWM signal Suu is at a low level, and the PWM signal Sul is at a high level, the high side switch QuH of the U phase is turned off, and the low side switch QuL of the U phase is turned on as illustrated in FIG. 3B. At this time, since a current flows from the coil Lu of the U phase to the ground potential GND via the low side switch QuL of the U phase, the coil current Iu of the U phase has a negative (−) polarity.

In this state, that is, in the state of the negative (−) polarity coil current Iu flowing in the coil Lu of the U phase, when the high side switch QuH and the low side switch QuL of the U phase are turned off together, the coil Lu attempts to keep the current flowing. Thus, the negative polarity coil current Iu flows from the coil Lu of the U phase via the parasitic diode of the high side switch QuH to the DC voltage Vdd side as illustrated in FIG. 4B. As a result, the drive voltage Vu of the coil Lu rises to near the DC voltage Vdd.

Thus, in the dead time period Td for tuning off the high side switch QuH and the low side switch QuL of the U phase when the coil current Iu of the U phase has a negative (−) polarity, the drive voltage Vu of the U phase is at a high level as illustrated in FIG. 3B.

As a result, in the period of the coil current Iu of the U phase having a negative (−) polarity, the first period Tv of the drive voltage Vu of the coil Lu of the U phase being at a high level is longer than the second period Th of the PWM signal Suu for switching on and off the high side switch QuH of the U phase being at a high level in one cycle of the PWM signal Suu as illustrated in FIG. 3B, and thus the first period Tv does not match the second period Th.

When the motor is PWM-driven, in one cycle of the PWM signal Suu, the first period Tv matches the second period Th in the period of the coil current of the predetermined phase having a positive polarity, and the first period Tv does not match the second period Th in the period of the coil current having a negative polarity as described above.

Thus, when the timing of the transition from the state of the first period Tv matching the second period Th to the state of the first period Tv not matching the second period Th and the timing of transition from the state of the first period Tv not matching the second period Th to the state of the first period Tv matching the second period Th are detected as illustrated in FIGS. 3A and 3B, the zero crossing point of the coil current of the predetermined phase can be estimated.

Thus, the current zero crossing point estimation unit 14_1 monitors the drive voltage Vu of the coil Lu of the U phase acquired by the phase voltage input unit 13_1 and the PWM signal Suu of the high side switch QuH of the U phase, compares the first period Tv of the drive voltage Vu of the coil Lu of the U phase being at a high level to the second period Th of the PWM signal Suu of the high side switch QuH of the U phase being at a high level in every cycle of the PWM signal Suu, and determines whether the first period Tv matches the second period Th.

As described above, switching of the drive voltage Vu to a high level or a low level and switching of the PWM signal Suu to a high level or a low level correspond to switching of the high side switch QuH of the U phase between ON and OFF states. Thus, in the following description, the first period Tv of the drive voltage Vu being at a high level may be referred to as an "ON period Tv", and the second period Th of the PWM signal Suu being at a high level may be referred to as an "ON period Th".

Whether the ON period (first period) Tv matches the ON period (second period) Th is determined as follows.

For example, the current zero crossing point estimation unit 14_1 calculates the difference |Th−Tv| between the ON period Tv of the drive voltage Vu of the coil Lu of the U phase being at a high level and the ON period Th of the PWM signal Suu of the high side switch QuH of the U phase being at a high level, and determines whether the difference |Th−Tv| is equal to or greater than a threshold Tth.

When the difference |Th−Tv| is equal to or greater than the threshold Tth, the current zero crossing point estimation unit 14_1 determines that the ON period Tv does not match the ON period Th (non-matching) and determines that the coil current Iu of the U phase has a negative polarity. On the other hand, when the difference |Th−Tv| is less than the threshold Tth, the current zero crossing point estimation unit 14_1 determines that the ON period Tv matches the ON period Th and determines that the coil current Iu of the U phase has a positive polarity.

Here, the threshold Tth for determining whether or not the ON period Tv matches the ON period Th may be set based on the dead time period Td of the drive control signal Sd being a PWM signal. For example, Tth may be equal to Td.

The current zero crossing point estimation unit 14_1 detects at least one of a timing for switching from the state of the ON period Tv matching the ON period Th to the state of the ON period Tv not matching the ON period Th and a timing for switching from the state of the ON period Tv not matching the ON period Th to the state of the ON period Tv matching the ON period Th (referred to as "zero crossing detection" below), and estimates the detected timing as a zero crossing point Q of the coil current Iu of the U phase.

Specifically, the current zero crossing point estimation unit 14_1 determines that the timing for switching the state of the ON period of the drive voltage Vu of the coil Lu of the U phase (the first period Tv) matching the ON period of the PWM signal of the high side switch QuH of the U phase (the second period Th) to the state of the former ON period not matching the latter ON period is the zero crossing point Q of the polarity of the coil current Iu switching from positive to negative. Additionally, the current zero crossing point estimation unit 14_1 determines that the timing for switching the state of the ON period Tv not matching the ON period Th to the state of the ON period Tv matching the ON period Th is the zero crossing point Q of the polarity of the coil current Iu switching from negative to positive.

For example, the current zero crossing point estimation unit 14_1 outputs a zero crossing point detection signal Sct to the phase adjustment determination unit 15_1, the zero crossing point detection signal Sct being at a high level in the state of the ON period Tv matching the ON period Th (the coil current Iu has a positive polarity) and being at a low level in the state of the ON period Tv not matching the ON period Th (the coil current Iu has a negative polarity).

Accordingly, the phase adjustment determination unit 15_1 can know the zero crossing point Q of the coil current Iu by detecting the edge (the rising edge or the falling edge) of the zero crossing point detection signal Sct. For example, the timing for detecting the falling edge of the zero crossing point detection signal Sct switching from the high level to the low level is a zero crossing point Q of the coil current Iu switching from the positive polarity to the negative polarity, and the timing for detecting the rising edge of the zero crossing point detection signal Sct switching from the low level to the high level is a zero crossing point Q of the coil current Iu switching from the negative polarity to the positive polarity.

Note that, as described above, the case of the current zero crossing point estimation unit 14_1 comparing the ON period (first period) Tv of the drive voltage Vu of the coil Lu of the U phase being at a high level to the ON period (second period) Th of the PWM signal Suu of the high side switch QuH of the U phase being at a high level to determine the zero crossing point Q of the coil current Iu has been described as an example in the present embodiment, but the embodiment is not limited to this example. For example, the current zero crossing point estimation unit 14_1 may compare the OFF period of the drive voltage Vu of the coil Lu of the U phase being at a low level to the OFF period of the PWM signal Suu of the high side switch QuH of the U phase being at a low level in every cycle of the PWM signal Suu and determine whether the two OFF periods match to determine the zero crossing point Q of the coil current Iu.

The phase adjustment determination unit 15_1 determines whether phase adjustment of the coil current is necessary based on the phase difference $\Delta\varphi$ between the target point P of the zero crossing of the coil current Iu determined by the target point determination unit 12_1 and the zero crossing point Q of the coil current Iu estimated by the current zero crossing point estimation unit 14_1.

For example, the phase adjustment determination unit 15_1 calculates the phase difference $\Delta\varphi$ ($=tp-tq$) by subtracting the phase (a time tq) of the zero crossing point Q of the coil current Iu estimated by the current zero crossing point estimation unit 14_1 from the phase (a time tp) of the target point P (the zero crossing point of the induced voltage of the coil Lu of the U phase) determined by the target point determination unit 12_1 as illustrated in FIG. 2.

The phase adjustment determination unit 15_1 instructs the drive control signal generation unit 16_1 to shift the output timing of the drive control signal Sd by a time corresponding to the phase difference $\Delta\varphi$ (=tp−tq).

Specifically, when the phase difference $\Delta\varphi$ a positive (+) value, for example, when the phase difference $\Delta\varphi$ equal to or greater than +$\varphi$th, the phase adjustment determination unit 15_1 determines that the phase of the coil current Iu is ahead of the phase of the induced voltage of the coil Lu of the U phase, and instructs the drive control signal generation unit 16_1 to perform delay angle control of delaying the phase of the coil current Iu. For example, the phase adjustment determination unit 15_1 outputs the determination result S2 for giving an instruction to perform the delay angle control of delaying the phase of the coil current Iu by the phase difference $\Delta\varphi$.

When the phase difference $\Delta\varphi$ a negative (−) value, for example, when the phase difference $\Delta\varphi$ equal to or less than −$\varphi$th, the phase adjustment determination unit 15_1 determines that the phase of the coil current Iu is behind the phase of the induced voltage of the coil Lu of the U phase, and instructs the drive control signal generation unit 16_1 to perform advance angle control of advancing the phase of the coil current Iu. For example, the phase adjustment determination unit 15_1 outputs the determination result S2 for giving an instruction to perform the advance angle control of advancing the phase of the coil current Iu by the phase difference $\Delta\varphi$.

In addition, when the phase difference $\Delta\varphi$ greater than −$\varphi$th and smaller than the +$\varphi$th (−$\varphi$th<$\Delta\varphi$<+$\varphi$th), the phase adjustment determination unit 15_1 determines that the phase of the coil current Iu substantially matches the phase of the induced voltage of the coil Lu of the U phase, and outputs the determination result S2 for giving an instruction to perform neither the advance angle control nor the delay angle control.

The drive control signal generation unit 16_1 generates the drive control signal Sd so as to reduce the difference between the zero crossing point Q of the coil current Iu and the target point P of the zero crossing based on the determination result S2 of the phase adjustment determination unit 15_1. Specifically, the PWM command unit 17_1 generates a value specifying the output timing of the PWM signal based on the determination result S2 of the phase adjustment determination unit 15_1, and outputs, as the operation amount S3, the value specifying the output timing of the PWM signal together with the values of the PWM cycle and the ON period of the PWM signal.

Here, the value specifying the output timing of the PWM signal is a value specifying a temporal shift width (offset time) with respect to the reference time for outputting the PWM signal as the drive control signal Sd.

For example, when the phase adjustment determination unit 15_1 outputs the determination result S2 for giving an instruction to perform the advance angle control of advancing the phase by the phase difference $\Delta\varphi$, the PWM command unit 17_1 calculates a value "−$\Delta t\varphi$" for instructing output of the PWM signal earlier than the reference time by the time $\Delta t\varphi$ corresponding to the phase difference $\Delta\varphi$ and sets the value as the value specifying the output timing of the PWM signal.

In addition, for example, when the phase adjustment determination unit 15_1 outputs the determination result S2 for giving an instruction to perform the delay angle control of delaying the phase by the phase difference $\Delta\varphi$, the PWM command unit 17_1 calculates a value "+$\Delta t\varphi$" for instructing output of the PWM signal later than the reference time by the time $\Delta t\varphi$ corresponding to the phase difference $\Delta\varphi$ and sets the value as the value specifying the output timing of the PWM signal.

Further, for example, when the determination result S2 for giving an instruction to perform neither the advance angle control nor the delay angle control is output due to the determination result S2 from the phase adjustment determination unit 15_1, the PWM command unit 17_1 sets the value specifying the output timing of the PWM signal to "0 (zero)".

When outputting the drive control signal Sd, the PWM signal generation unit 18_1 changes the timing for outputting the drive control signal Sd based on the value specifying the output timing of the PWM signal included in the operation amount S3. For example, a reference time for outputting the drive control signal Sd may be set in advance, and the PWM signal generation unit 18_1 may output the drive control signal Sd at the timing shifted from the reference time by a time specified by the value specifying the output timing of the PWM signal.

For example, when the value specifying the output timing of the PWM signal is "+$\Delta t\varphi$", the PWM signal generation unit 18_1 outputs the drive control signal Sd generated based on the information of the PWM cycle and the ON period included in the operation amount S3 later than the reference time by $\Delta t\varphi$.

For example, when the value specifying the output timing of the PWM signal is "−$\Delta t\varphi$", the PWM signal generation unit 18_1 outputs the drive control signal Sd generated based on the information of the PWM cycle and the ON period included in the operation amount S3 earlier than the reference time by $\Delta t\varphi$.

In addition, for example, when the value specifying the output timing of the PWM signal is "0 (zero)", the PWM signal generation unit 18_1 outputs the drive control signal Sd generated based on the information of the PWM cycle and the ON period included in the operation amount S3 at the reference time without shifting the output timing. Note that, not shifting the output timing means maintaining the phase adjustment when the phase adjustment (advance angle or delay angle control) has been performed at that point of time.

Next, a sequence of drive control of the motor 5_1 by the motor drive control device 1_1 according to the present embodiment will be described.

Figure 5:
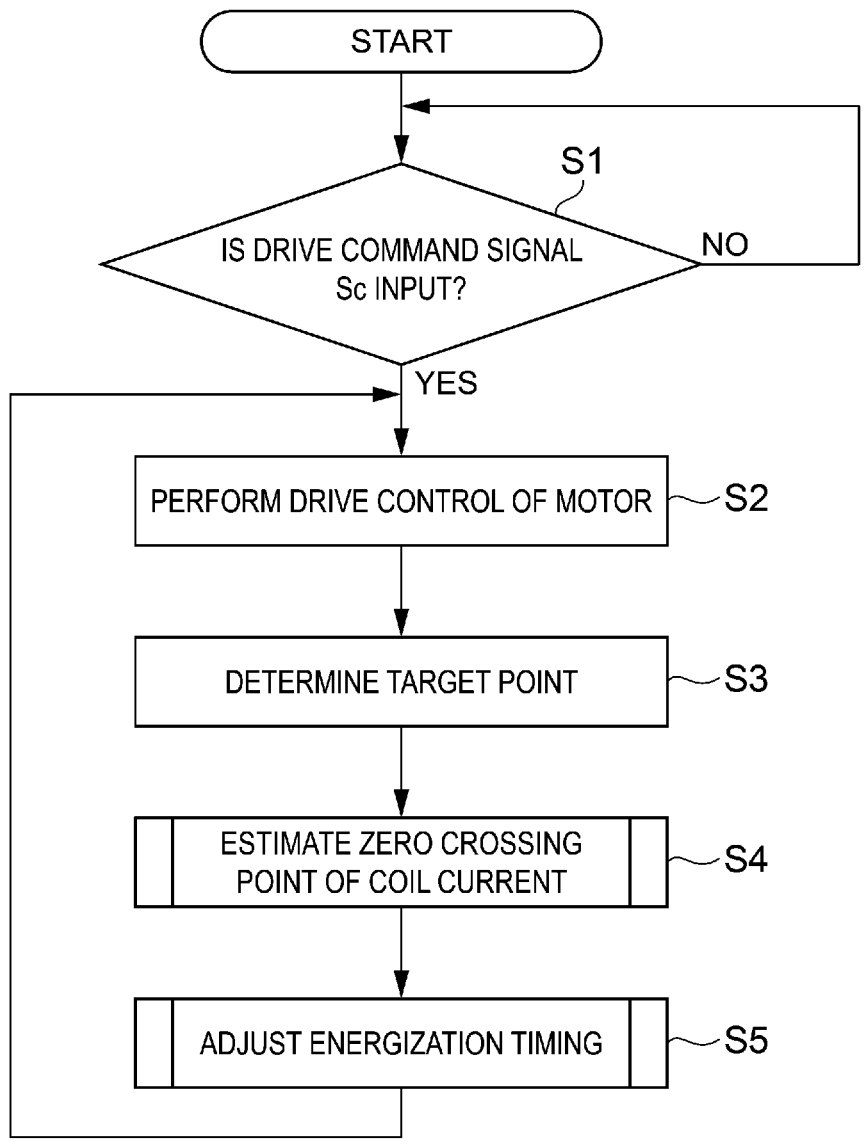
FIG. 5 is a flowchart showing a sequence of motor drive control processing by the motor drive control device according to the first embodiment.

FIG. 5 is a flowchart showing a sequence of motor drive control processing by the motor drive control device 1_1 according to the embodiment.

For example, when the DC voltage Vdd is input to the motor drive control device 1_1 and the motor drive control device 1_1 is activated, the motor drive control device 1_1 first determines whether the drive command signal Sc is input (step S1). When the drive command signal Sc is not input (step S1: NO), the motor drive control device 1_1 waits until the drive command signal Sc is input.

When the drive command signal Sc is input (step S1: YES), the motor drive control device 1_1 starts drive control of the motor 5_1 (step S2). Specifically, the drive control signal generation unit 16_1 determines the PWM cycle and the ON period based on the target rotational speed S1 of the motor 5_1 analyzed by the drive command analysis unit 11_1, generates six types of PWM signals Suu and the like having the determined PWM cycle and ON period, and inputs the signals as the drive control signal Sd to the drive circuit 3_1. Thus, the drive circuit 3_1 switches the energizing directions of the coils Lu, Lv, and Lw of the motor 5_1 to rotate the motor 5_1.

Next, the motor drive control device 1_1 determines the target point P of zero crossing of the coil current Iu of the U phase (step S3). For example, the target point determination unit 12_1 determines that the timing advanced by an electrical angle of 30 degrees from the rising edge of the position detection signal Shu is the target point P as described above (see FIG. 2).

Next, the motor drive control device 1_1 estimates the zero crossing point of the coil current Iu of the U phase (step S4).

Figure 6:
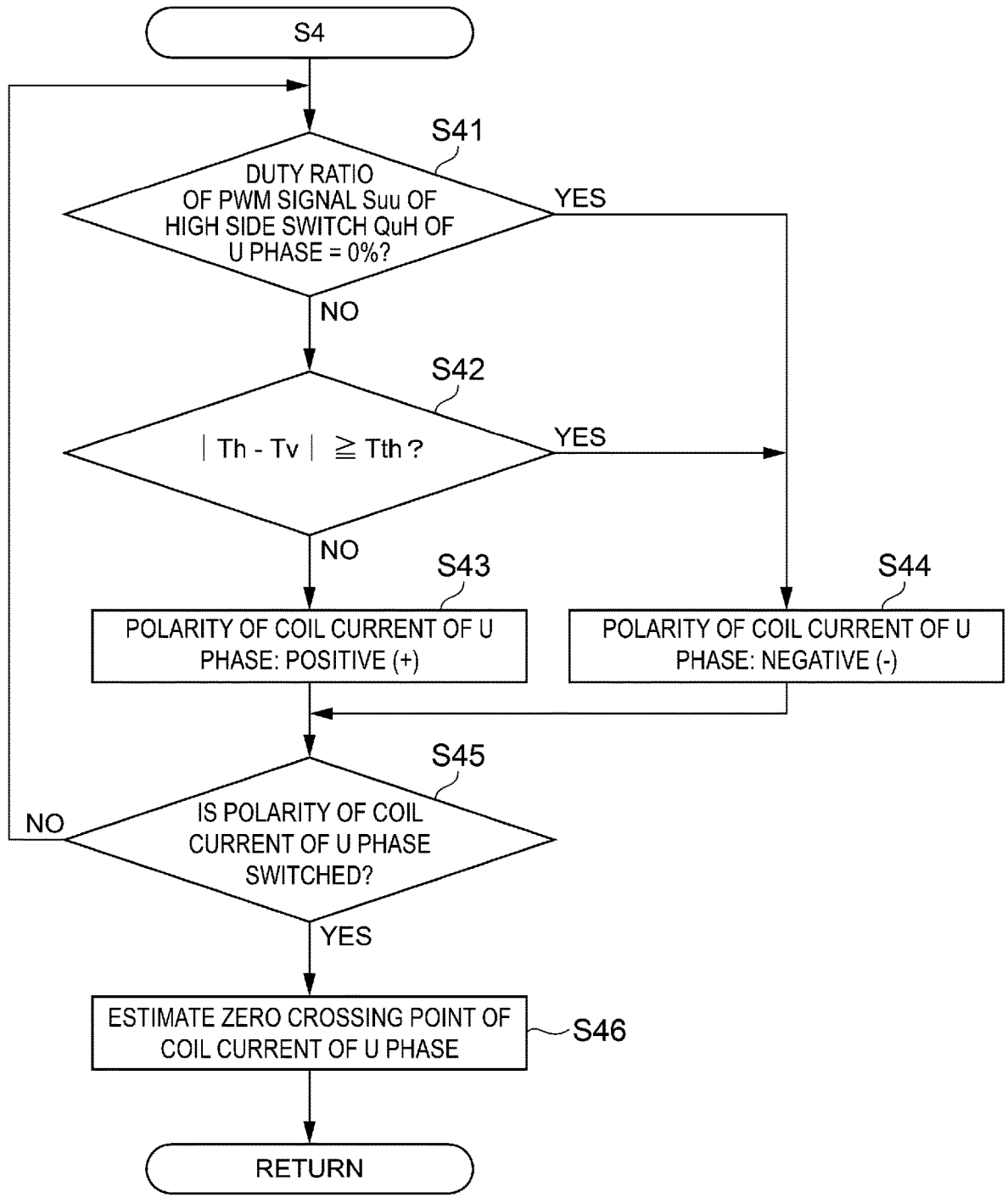
FIG. 6 is a flowchart showing a sequence of processing (step S4) of estimating a zero crossing point of the motor current of FIG. 5.

FIG. 6 is a flowchart showing a sequence of the processing (step S4) of estimating the zero crossing point of the coil current Iu of the U phase of FIG. 5.

In step S4, first, the current zero crossing point estimation unit 14_1 determines whether the duty ratio of the PWM signal Suu for driving the high side switch QuH of the U phase is 0% (step S41).

When the duty ratio of the PWM signal Suu is 0% (step S41: YES), the current zero crossing point estimation unit 14_1 determines that the coil current Iu of the U phase has a negative polarity (step S44). When the duty ratio of the PWM signal Suu is not 0% (step S41: NO), the current zero crossing point estimation unit 14_1 calculates the difference |Th−Tv| between the ON period Tv of the drive voltage Vu of the coil Lu of the U phase being at a high level and the ON period Th of the PWM signal Suu of the high side switch QuH of the U phase being at a high level, and determines whether the difference |Th−Tv| is equal to or greater than the threshold Tth (step S42).

When the difference |Th−Tv| between the ON period Tv and the ON period Th is equal to or greater than the threshold Tth (step S42: YES), the current zero crossing point estimation unit 14_1 determines that the ON period Tv does not match the ON period Th and determines that the coil current Iu of the U phase has a negative polarity (step S44).

On the other hand, when the difference |Th−Tv| between the ON period Tv and the ON period Th is less than the threshold Tth (step S42: NO), the current zero crossing point estimation unit 14_1 determines that the ON period Tv matches the ON period Th and determines that the coil current Iu of the U phase has a positive polarity (step S43).

After step S43 or step S44, the current zero crossing point estimation unit 14_1 determines whether the polarity of the coil current Iu of the motor 5_1 is switched (step S45). For example, the current zero crossing point estimation unit 14_1 determines whether the polarity of the coil current Iu determined in step S43 or step S44 differs from the polarity of the coil current Iu determined in step S43 or step S44 of the previous round.

When the polarity of the coil current Iu is not switched (step S45: NO), i.e., when the polarity of the coil current Iu determined in step S43 or step S44 matches the polarity of the coil current Iu determined in step S43 or step S44 of the previous round, the current zero crossing point estimation unit 14_1 returns to step S41 and performs the processing from step S41 to step S45 again.

On the other hand, when the polarity of the coil current Iu is switched (step S45: YES), i.e., when the polarity of the coil current Iu determined in step S43 or step S44 does not match the polarity of the coil current Iu determined in step S43 or step S44 of the previous round, the current zero crossing point estimation unit 14_1 estimates the zero crossing point Q of the coil current Iu of the U phase (step S46).

For example, the current zero crossing point estimation unit 14_1 sets one point in the period Tz1 (or Tz2) between the time for performing step S43 or step S44 and the time for performing step S43 or step S44 of the previous round (a zero crossing point presence range) as the zero crossing point Q of the coil current Iu of the U phase (see FIG. 3A or FIG. 3B). This is the end of the processing of step S4.

After the end of step S4, the motor drive control device 1_1 adjusts the energization timing of the motor 5_1 (step S5) as illustrated in FIG. 5.

Figure 7:
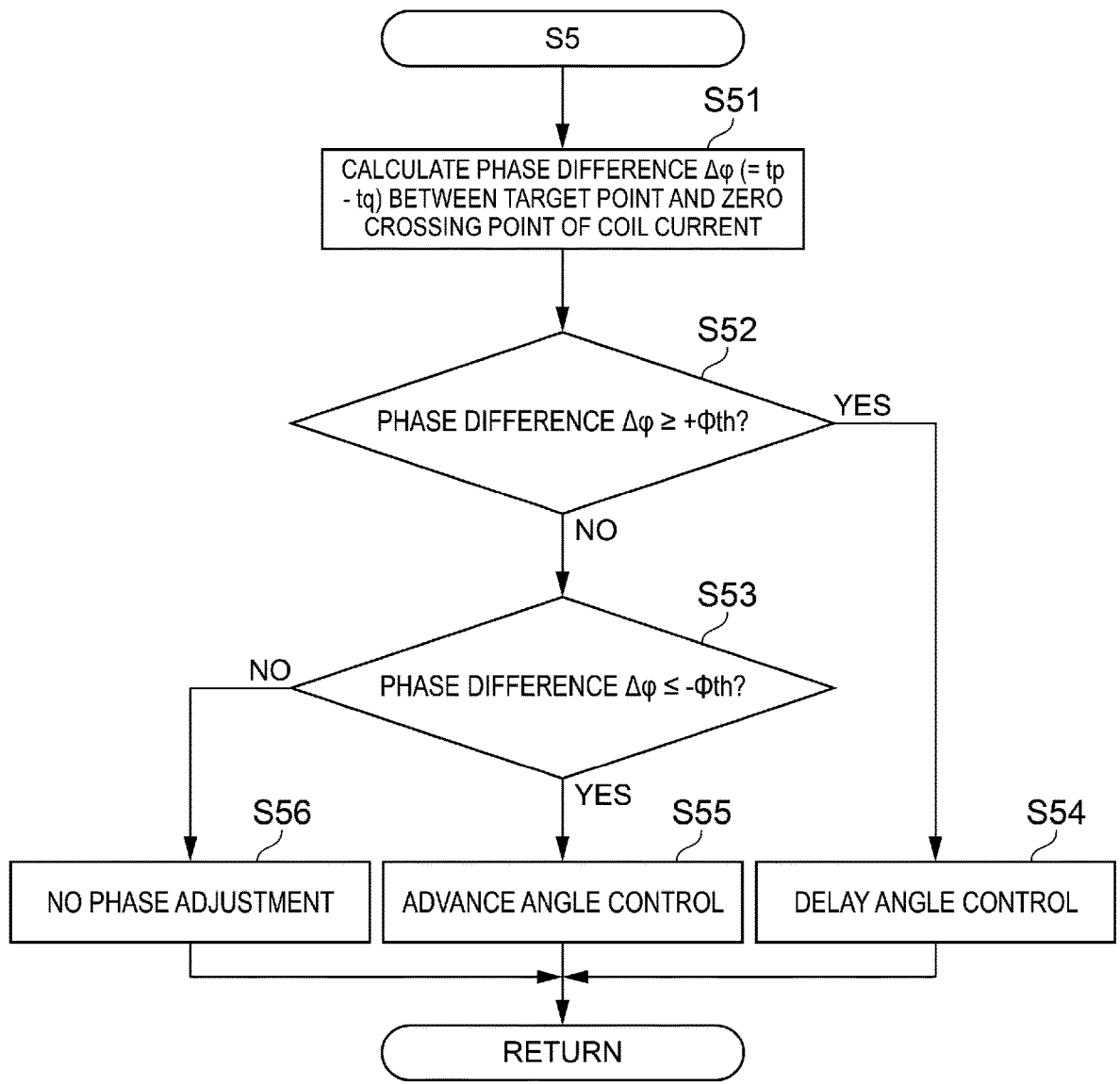
FIG. 7 is a flowchart showing a sequence of processing of adjusting an energization timing of the motor (step S5) of FIG. 5.

FIG. 7 is a flowchart showing a sequence of adjustment processing of the energization timing of the motor 5_1 (step S5) of FIG. 5.

In step S5, first, the phase adjustment determination unit 15_1 calculates a phase difference $\Delta\varphi$ ($=$tp−tq) between the target point P determined in step S3 and the zero crossing point Q of the coil current Iu of the U phase estimated in step S4 (step S51).

Next, the phase adjustment determination unit 15_1 determines whether the phase difference $\Delta\varphi$ calculated in step S51 is equal to or greater than +$\varphi$th (step S52). When the phase difference $\Delta\varphi$ is equal to or greater than +$\varphi$th (step S52: YES), the phase adjustment determination unit 15_1 determines that the phase of the coil current Iu is ahead of the phase of the induced voltage of the coil Lu of the U phase, and instructs the drive control signal generation unit 16_1 to perform the delay angle control of delaying the phase of the coil current Iu (step S54). Thus, the drive control signal generation unit 16_1 outputs the drive control signal Sd at a timing later than the reference time by a time $\Delta\varphi$ corresponding to the phase difference $\Delta\varphi$ as described above.

On the other hand, when the phase difference $\Delta\varphi$ is less than +$\varphi$th in step S52 (step S52: NO), the phase adjustment determination unit 15_1 determines whether the phase difference $\Delta\varphi$ is equal to or less than −$\varphi$th (step S53). When the phase difference $\Delta\varphi$ is equal to or less than −$\varphi$th (step S53: YES), the phase adjustment determination unit 15_1 determines that the phase of the coil current Iu is behind the phase of the induced voltage of the coil Lu of the U phase, and instructs the drive control signal generation unit 16_1 to perform the advance angle control of advancing the phase of the coil current Iu (step S55). Thus, the drive control signal generation unit 16_1 outputs the drive control signal Sd at a timing earlier than the reference time by the time $\Delta\varphi$ corresponding to the phase difference $\Delta\varphi$ as described above.

On the other hand, when the phase difference $\Delta\varphi$ is greater than −$\varphi$th in step S53 (step S53: NO), the phase adjustment determination unit 15_1 determines that the zero crossing point Q of the coil current Iu is within the target range of the target point P, and does not instruct the drive control signal generation unit 16_1 to adjust the phase of the coil current Iu (step S56). Thus, the drive control signal generation unit 16_1 outputs the drive control signal Sd at the reference time without shifting the output timing as described above.

As described above, the processing of step S5 ends.

After the end of step S5, the motor drive control device 1_1 returns to step S2 and repeatedly performs the processing of steps S2 to S5 as illustrated in FIG. 5. Due to this operation, the motor 5_1 continuously rotates without reducing the drive efficiency.

Figure 8:
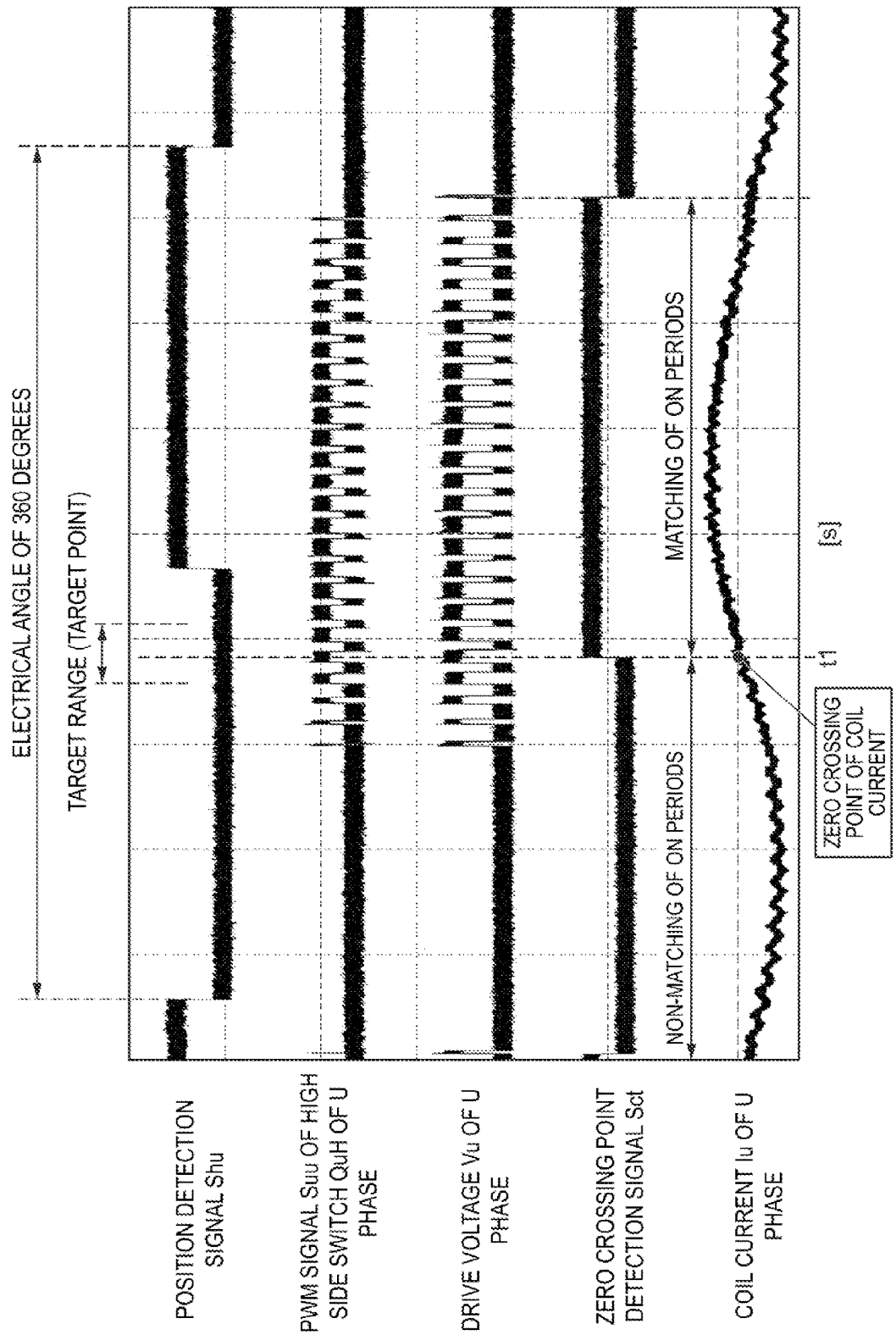
FIG. 8 is a timing chart showing changes in voltages of respective signals and the coil current Iu of the motor when the motor drive control device according to the first embodiment adjusts the phase of the coil current Iu of the motor.

FIG. 8 is a timing chart showing changes in voltages of respective signals and a coil current of the motor 5_1 when the motor drive control device 1_1 according to the embodiment adjusts the phase of the coil current of the motor.

FIG. 8 shows states of the respective voltages and the current of the motor unit 100_1 when the motor drive control device 1_1 adjusts the phase of the coil current Iu of the U phase of the motor 5_1.

In FIG. 8, waveforms of the position detection signal (Hall signal) Shu, the PWM signal Suu of the high side switch QuH of the U phase, the drive voltage Vu of the U phase, the zero crossing point detection signal Sct, and the coil current Iu of the U phase are shown in this order from the upper part to the lower part. In addition, in FIG. 8, the horizontal axis represents time, and the vertical axis represents voltage or current.

It is understood that the zero crossing point Q of the coil current Iu of the U phase switching from negative to positive is detected at a time t1, and that the phase of the coil current Iu is adjusted such that the zero crossing point Q falls within a target range at a position ahead of the rising edge of the position detection signal (Hall signal) Shu by an electrical angle of 30 degrees (the target point P of zero crossing of the coil current Iu of the U phase) as illustrated in FIG. 8. As a result, the phase of the induced voltage of the motor 5_1 substantially matches the phase of the coil current Iu, and thus the drive efficiency of the motor 5_1 can be improved.

As described above, the motor drive control device 1_1 according to the present embodiment determines the target point P of zero crossing of the coil current of the predetermined phase based on the position detection signal Shu synchronized with the induced voltage of the coil of the predetermined phase of the motor 5_1, compares the ON period (first period) Tv of the drive voltage of the coil of the predetermined phase to the ON period (second period) Th of the signal for turning on or off the high side switch for driving the coil of the predetermined phase, and estimates the zero crossing point Q of the coil current of the predetermined phase based on the comparison result. The motor drive control device 1_1 determines whether phase adjustment of the coil current is necessary based on the phase difference $\Delta\varphi$ (=tp−tq) between the estimated zero crossing point Q of the coil current of the predetermined phase and the target point P of the zero crossing, and generates the drive control signal Sd (PWM signal) for driving the motor 5_1 based on the determination result.

By disposing the position detector 6_1 (Hall element) at a position corresponding to the coil of a predetermined phase of the motor 5_1 as described above, the position detection signal Shu synchronized with the induced voltage of the coil of the predetermined phase can be obtained. In addition, when the phase difference between the position detection signal Shu and the induced voltage is known, it is possible to determine the zero crossing point of the induced voltage, that is, the target point P of zero crossing of the coil current of the predetermined phase of the motor 5_1, based on the rising edge or falling edge of the position detection signal Shu.

Furthermore, because the ON period Tv matches the ON period Th in the period of the coil current of the predetermined phase (e.g., the U phase) of the motor 5_1 having a positive (+) polarity and the ON period Tv does not match the ON period Th in the period of the coil current having a negative (−) polarity, the zero crossing point of the coil current switching from the positive polarity to the negative polarity or the zero crossing point of the coil current switching from the negative polarity to the positive polarity can be detected by comparing the ON period Tv to the ON period Th.

Specifically, the motor drive control device 1_1 determines whether the ON period Tv matches the ON period Th, detects at least one of a timing for switching from the state of the ON period Tv matching the ON period Th to the state of the ON period Tv not matching the ON period Th and a timing for switching from the state of the ON period Tv not matching the ON period Th to the state of the ON period Tv matching the ON period Th, and estimates the detected timing as a zero crossing point of the coil current of the predetermined phase.

This makes it possible to easily estimate the zero crossing point of the coil current without directly monitoring the coil current of the motor 5_1.

Then, the motor drive control device 1_1 performs phase adjustment according to the phase difference $\Delta\varphi$ between the target point P of the zero crossing of the coil current of the predetermined phase and the zero crossing point Q of the coil current of the predetermined phase and thus can reduce the phase difference between the phase of the induced voltage of the coil of the predetermined phase and the phase of the coil current of the motor.

As described above, the motor drive control device 1_1 according to the present embodiment can improve the drive efficiency of the motor.

Additionally, the motor drive control device 1_1 determines that the ON period Tv matches the ON period Th when the difference |Th−Tv| between the ON period Tv and the ON period Th is less than the threshold Tth, and determines that the ON period Tv does not match the ON period Th when the difference |Th−Tv| between the ON period Tv and the ON period Th is equal to or greater than the threshold Tth.

In this way, it is possible to determine whether or not the ON period Tv matches the ON period Th with higher accuracy even when the ON period Tv does not completely match the ON period Th, for example, due to various factors such as the parasitic diode of the transistor serving as the high side switch, despite the condition that the ON period Tv theoretically matches the ON period Th.

In other words, the motor drive control device 1_1 generates the drive control signal Sd so that the dead time period Td for simultaneously turning off the high side switch and the low side switch when the high side switch and the low side switch are switched between ON and OFF states is provided. The threshold Tth for determining whether or not the ON period Tv matches the ON period Th is a value based on the dead time period Td.

When the ON period Tv does not match the ON period Th, the ON period Tv is longer than the ON period Th by twice the time of the dead time period Td, theoretically, as illustrated in FIGS. 3A and 3B. That is, because the difference between the ON period Tv and the ON period Th is based on the dead time period Td, for example, it is possible to further improve accuracy in determining whether or not the ON period Tv matches the ON period Th by setting Tth to be equal to Td.

Additionally, the motor drive control device 1_1 determines that the timing for switching the state of the ON period Tv matching the ON period Th to the state of the ON period Tv not matching the ON period Th is the zero crossing point of the polarity of the coil current switching from positive to negative, and determines that the timing for switching the state of the ON period Tv not matching the ON period Th to the state of the ON period Tv matching the ON period Th is the zero crossing point of the polarity of the coil current switching from negative to positive.

This makes it possible to easily distinguish and detect the zero crossing point of the polarity of the coil current switching from positive to negative and the zero crossing point of the polarity of the coil current switching from negative to positive.

Additionally, the motor drive control device 1_1 calculates a phase difference $\Delta\varphi$ (=tp−tq) between the target point P of the zero crossing of the coil current of the predetermined phase and the zero crossing point Q of the coil current and shifts the output timing of the drive control signal Sd by the time $\Delta t\varphi$ (=tp−tq) corresponding to the phase difference $\Delta\varphi$.

Thus, because the phase of the coil current (drive voltage of the coil) is adjusted by the amount according to the phase difference $\Delta\varphi$ between the target point P of the zero crossing of the coil current of the predetermined phase and the zero crossing point Q of the coil current, that is, the shift width between the phase of the induced voltage and the phase of the coil current, the phase of the coil current can be reliably brought closer to the phase of the induced voltage. That is, compared to the related art for performing advance angle control or delay angle control without accurately detecting the zero crossing point of the coil current as in Patent Document 1 described above, phase adjustment can be performed with higher accuracy, and the drive efficiency of the motor can be further improved.

Expansion of First Embodiment

Although the invention made by the present inventors has been specifically described above based on the first embodiment, the present invention is not limited to the first embodiment, and it is needless to say that various modifications can be made without departing from the gist of the present invention.

For example, the case of disposing the position detector 6_1 for the coil of the U phase among the three phases (the U phase, the V phase, and the W phase) of the motor 5_1 and detecting the drive voltage Vu and the zero crossing point of the coil current Iu of the U phase has been described as an example in the first embodiment described above, but the embodiment is not limited to this example. It may be possible to dispose the position detector 6_1 for the coil Lv of the V phase, detect the drive voltage Vv and the zero crossing point of the coil current Iv of the V phase, and perform phase adjustment of the coil current Iv, or it may be possible to dispose the position detector 6_1 for the coil Lw of the W phase, detect the drive voltage Vw and the zero crossing point of the coil current Iw of the W phase, and perform phase adjustment of the coil current Iw. Additionally, it may be possible to dispose the position detectors 6_1 for two or all of the U phase, the V phase, and the W phase, detect the drive voltage and the zero crossing point of the coil current of any phase, and perform phase adjustment of the coil current of the detected phase.

Additionally, although the case of the current zero crossing point estimation unit 14_1 detecting both the timing for switching from the state of the ON period (the first period Tv) of the drive voltage Vu of the coil Lu matching the ON period (the second period Th) of the PWM signal of the high side switch of the U phase to the state of the ON periods not matching each other (the zero crossing point Q of the coil current Iu switching from positive to negative) and the timing for switching from the state of the ON period Tv not matching the ON period Th to the state of the ON periods matching each other (the zero crossing point Q of the coil current Iu switching from negative to positive) has been described as an example in the first embodiment described above, the zero crossing point Q of any one timing may be detected. For example, the current zero crossing point estimation unit 14_1 may detect only the zero crossing point Q the coil current Iu switching from negative to positive.

In the first embodiment, the type of the motor 5_1 is not limited to brushless DC motor. In addition, the motor 5_1 is not limited to a three-phase motor, and may be, for example, a single-phase brushless DC motor.

Although the case of using a Hall element as the position detector 6_1 has been described as an example in the first embodiment, the embodiment is not limited to this example. For example, a Hall IC, an encoder, a resolver, or the like may be provided as the position detector 6_1, and a detection signal of the Hall IC, the encoder, the resolver, or the like may be input as the position detection signal Shu to the motor drive control device 1_1.

Furthermore, the flowcharts described above are examples, and the embodiment is not limited to these examples. For example, other processing operations may be inserted between the steps, or the processing operations may be performed in parallel.

As a technique for solving the problem regarding motor drive efficiency, Patent Document 2 discloses a motor drive device for adjusting a phase of a drive voltage of a coil with respect to a phase of a coil current of the motor, in addition to Patent Document 1. The motor drive device disclosed in Patent Document 2 performs control such that a positive-side transistor and a negative-side transistor connected in series between a DC power source and the ground are complementarily turned on/off according to an energization signal for controlling energization of the brushless motor and supplies a pseudo-sine wave drive voltage to the coil of the brushless motor from an energization terminal between the positive-side transistor and the negative-side transistor to drive the motor.

The motor drive device disclosed in Patent Document 2 adjusts a phase of the drive voltage of the coil with respect to a phase of the coil current of the motor by outputting a phase adjustment signal for adjusting the phase of the drive voltage based on a position detection signal and a determination signal obtained by determining the polarity of the motor current flowing to the negative-side transistor based on the comparison result signal obtained by a comparator comparing a first voltage based on the voltage of one end of the negative-side transistor to a second voltage based on the voltage of the other end of the negative-side transistor.

However, according to the technology disclosed in Patent Document 2, when the motor current is out of synchronization with the PWM signal being a driving voltage, a temporal distance occurs between the zero crossing point and the sampling timing of the motor current, and thus an accurate comparison result signal cannot be created. As a result, phase adjustment may be performed frequently, and the rotational speed may be unstable.

Therefore, the inventors of the present application believe that a new motor drive control technique for increasing accuracy of phase adjustment and improving the drive efficiency of the motor without making the rotational speed of the motor unstable is needed, and thus have proposed a second embodiment.

The phase adjustment determination unit 15_1 according to the first embodiment is a form of an adjustment instruction signal generation unit generating at least one of a phase adjustment instruction signal for instructing phase adjustment of a coil current and a frequency adjustment instruction signal for instructing frequency adjustment of a PWM signal according to a phase difference between the target point P determined by the target point determination unit 12_1 and the zero crossing point Q estimated by the current zero crossing point estimation unit 14_1 so that the phase difference is within a predetermined range.

Since the phase adjustment determination unit 15_1 determines the necessity of phase adjustment of the coil current in the first embodiment, the drive control signal generation unit 16_1 for generating the drive control signal based on the determination result performs phase adjustment, but does not perform frequency adjustment.

The adjustment instruction signal generation unit is configured of the phase adjustment determination unit 15_1 in the first embodiment. In the second embodiment, instead of the phase adjustment determination unit 15_1, the adjustment instruction signal generation unit is configured of an adjustment instruction signal generation unit 19_2 capable of outputting a phase adjustment instruction signal and a frequency adjustment instruction signal.

A motor drive control device according to the second embodiment can increase accuracy of phase adjustment and improving drive efficiency of a motor without making the rotational speed of the motor unstable. The motor drive control device according to the second embodiment will be described below.

Second Embodiment

Figure 9:
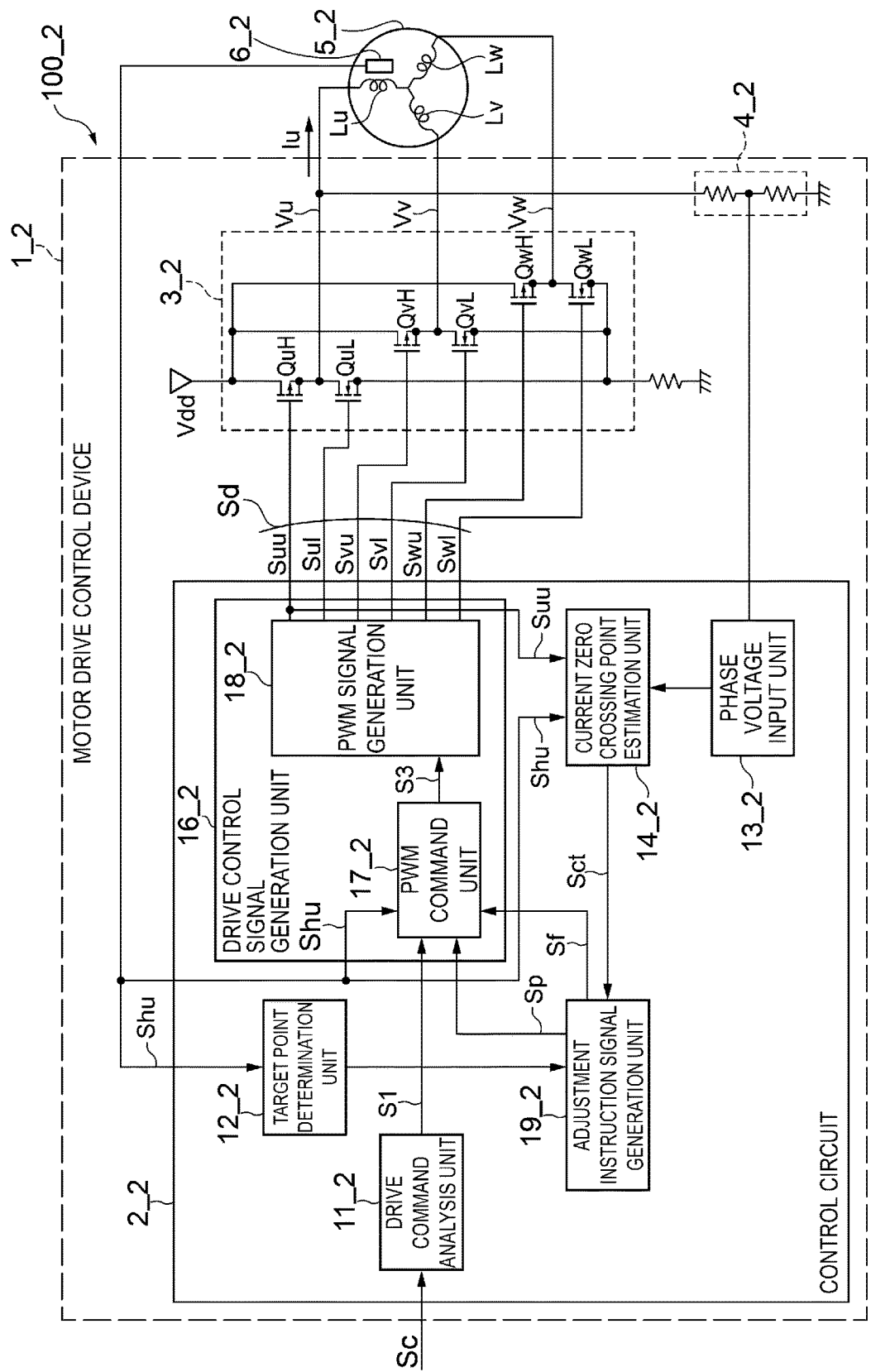
FIG. 9 is a diagram illustrating a configuration of a motor unit including the motor drive control device according to a second embodiment of the present invention.

FIG. 9 is a diagram illustrating a configuration of a motor unit including the motor drive control device according to the second embodiment of the present invention.

A motor unit 100_2 illustrated in FIG. 9 includes a motor 5_2, a position detector 6_2, and a motor drive control device 1_2.

The motor 5_2 is a motor including at least one coil. The motor 5_2 is, for example, a brushless DC motor including coils (windings) Lu, Lv, and Lw of three phases (a U phase, a V phase, and a W phase).

The position detector 6_2 is a detector detecting a position according to the rotation of a rotor of the motor 5_2 and generating a position detection signal Shu. The position detector 6_2 is, for example, a Hall element. The Hall element detects the magnetic pole of the rotor, and outputs a Hall signal having a voltage changing according to the rotation of the rotor. The Hall signal is, for example, a pulse signal and is input to the motor drive control device 1_2 as the position detection signal Shu.

In the motor unit 100_2, one Hall element as the position detector 6_2 is disposed at a position corresponding to any one of the coils Lu, Lv, and Lw of the U phase, the V phase, and the W phase of the motor 5_2. Thus, the Hall signal output from the position detector 6_2 is a signal synchronized with an induced voltage of any one of the coils Lu, Lv, and Lw of the U phase, the V phase, and the W phase of the motor 5_2.

In the present embodiment, one Hall element as the position detector 6_2 is disposed at a position corresponding to the coil of the U phase, for example. As a result, the position detection signal (Hall signal) Shu is a signal synchronized with the induced voltage of the coil Lu of the U phase of the motor 5_2 and corresponding to the rotational position of the rotor of the motor 5_2.

Note that, in the present embodiment, the position detector 6_2 is disposed at a position where the rising edge of the output position detection signal (Hall signal) Shu can be detected at a timing delayed by an electrical angle of 30 degrees from the zero crossing point of the induced voltage of the coil Lu of the U phase as a specific example. Details will be described below.

The motor drive control device 1_2 is a device controlling driving of the motor 5_2. The motor drive control device 1_2 performs sine wave driving of the motor 5_2 by, for example, one sensor drive scheme based on the position detection signal Shu from the one position detector 6_2 (Hall element) provided at the position corresponding to the coil Lu of the U phase.

Specifically, the motor drive control device 1_2 includes a control circuit 2_2, a drive circuit 3_2, and a phase voltage detection circuit 4_2. The motor drive control device 1_2 is supplied with a DC voltage Vdd from an external DC power source (not illustrated). For example, the DC voltage Vdd is supplied to a power line (not illustrated) inside the motor drive control device 1_2 via a protection circuit or the like and input as a power supply voltage to the control circuit 2_2 and the drive circuit 3_2 via the power line.

Note that the DC voltage Vdd may not be directly supplied to the control circuit 2_2, and for example, the voltage obtained by stepping down the DC voltage Vdd by a regulator circuit may be supplied as the power supply voltage to the control circuit 2_2.

The drive circuit 3_2 is a circuit driving the motor 5_2 based on a drive control signal Sd output from the control circuit 2_2 to be described below. The drive control signal Sd is a signal for controlling driving of the motor 5_2. For example, the drive control signal Sd is a PWM signal for performing sine wave driving of the motor 5_2.

The drive circuit 3_2 switches the direction of the motor current to rotate the motor 5_2 by switching the connection destination of the coil of the motor 5_2 between the DC voltage Vdd and a ground potential GND based on the drive control signal Sd. Specifically, the drive circuit 3_2 includes high side switches QuH, QvH, and QwH, and low side switches QuL, QvL, and QwL provided to correspond to the coils Lu, Lv, and Lw of respective phases of the motor 5_2 and connected to each other in series. The drive circuit 3_2 turns on and off the high side switches QuH, QvH, and QwH, and the low side switches QuL, QvL, and QwL according to the PWM signals Suu, Svu, Swu, Sul, Svl, and Swl as the drive control signal Sd to switch the energizing directions of the coils Lu, Lv, and Lw.

For example, the high side switches QuH, QvH, and QwH are P channel-type metal oxide semiconductor field effect transistors (MOSFETs), and the low side switches QuL, QvL, and QwL are N channel-type MOSFETs.

Note that the high side switches QuH, QvH, and QwH and the low side switches QuL, QvL, and QwL may be other types of power transistors, for example, insulated gate bipolar transistors (IGBTs).

The high side switch QuH and the low side switch QuL of the U phase are connected in series between the DC voltage Vdd and the ground potential GND and constitute one switching leg (or arm) as illustrated in FIG. 9. The connection point of the high side switch QuH and the low side switch QuL is connected to one end of the coil Lu. The high side switch QuH is switched between ON and OFF states according to the PWM signal Suu. The low side switch QuL is switched between ON and OFF states according to the PWM signal Sul.

The high side switch QvH and the low side switch QvL of the V phase are connected in series between the DC voltage Vdd and the ground potential GND and constitute one switching leg. The connection point of the high side switch QvH and the low side switch QvL is connected to one end of the coil Lv. The high side switch QvH is switched between ON and OFF states according to the PWM signal Svu. The low side switch QvL is switched between ON and OFF states according to the PWM signal Svl.

The high side switch QwH and the low side switch QwL of the W phase are connected in series between the DC voltage Vdd and the ground potential GND and constitute one switching leg. The connection point of the high side switch QwH and the low side switch QwL is connected to one end of the coil Lw. The high side switch QwH is switched between ON and OFF states according to the PWM signal Swu. The low side switch QwL is switched between ON and OFF states according to the PWM signal Swl.

Note that a parasitic diode is formed in each transistor of the high side switches QuH, QvH, and QwH and the low side switches QuL, QvL, and QwL, and these diodes function as reflux diodes for returning a coil current to the DC voltage Vdd or the ground potential GND.

Note that the drive circuit 3_2 may include a pre-drive circuit for driving the high side switch and the low side switch of each phase based on the drive control signal Sd. Additionally, a sense resistor for detecting a current of the motor 5_2 may be connected to the ground potential GND side of the drive circuit 3_2 as illustrated in FIG. 9.

The phase voltage detection circuit 4_2 is a circuit for detecting a drive voltage of a coil of a predetermined phase of the motor 5_2. In the present embodiment, the phase voltage detection circuit 4_2 detects a drive voltage Vu of the coil Lu of the U phase, for example, and inputs the drive voltage to the control circuit 2_2. The phase voltage detection circuit 4_2 is, for example, a resistive voltage divider circuit connected between one end of the coil Lu connected to the high side switch QuH and the low side switch QuL of the U phase and the ground potential GND.

Note that, although FIG. 9 illustrates, as an example, a configuration of the resistive voltage divider circuit as the phase voltage detection circuit 4_2 dividing the drive voltage Vu of the coil Lu and inputting the drive voltage to the control circuit 2_2, the drive voltage Vu of the coil Lu may be directly input to the control circuit 2_2 without providing the phase voltage detection circuit 4_2.

The control circuit 2_2 is a circuit for centrally controlling operations of the motor drive control device 1_2. In the present embodiment, the control circuit 2_2 is, for example, a program processing device configured such that a processor such as a CPU, various storage devices such as a RAM, a ROM, and a flash memory, and peripheral circuits such as a counter (timer), an A/D conversion circuit, a D/A conversion circuit, a clock generation circuit, and an input/output interface circuit are connected to each other via a bus or a dedicated line. For example, the control circuit 2_2 is a micro controller unit (MCU).

Note that, the control circuit 2_2 and the drive circuit 3_2 may be configured to be packaged as one semiconductor integrated circuit (IC), or may be configured to be packaged as individual integrated circuits, mounted at a circuit board, and electrically connected to each other at the circuit board.

The control circuit 2_2 has a basic function of controlling energization of the motor 5_2 by generating the drive control signal Sd and providing the drive control signal Sd to the drive circuit 3_2. Specifically, based on a drive command signal Sc for instructing a target value regarding driving of the motor 5_2 input from the outside (e.g., a host device) and the position detection signal Shu input from the position detector 6_2, the control circuit 2_2 generates the drive control signal Sd and provides the drive control signal Sd to the drive circuit 3_2 to bring the motor 5_2 into the drive state specified by a drive command signal Sc.

Additionally, in addition to the basic function described above, the control circuit 2_2 has a function of adjusting a phase and a cycle of the coil current of the motor 5_2 (referred to as a "coil current adjustment function" below) so that the phase of the induced voltage of the coil of a predetermined phase of the motor 5_2 matches the phase of the coil current in order to improve the drive efficiency of the motor 5_2. Note that, in the present embodiment, "match" includes a case where an error is within a predetermined allowable range, and is not limited to completely matching of the phase of the induced voltage of the coil of the predetermined phase of the motor 5_2 and the phase of the coil current due to the coil current adjustment function.

The control circuit 2_2 includes, for example, a drive command analysis unit 11_2, a target point determination unit 12_2, a phase voltage input unit 13_2, a current zero crossing point estimation unit 14_2, an adjustment instruction signal generation unit 19_2, and a drive control signal generation unit 16_2 as functional units for implementing the respective functions described above as illustrated in FIG. 9.

Each of the above-described functional units of the control circuit 2_2 is implemented, for example, by program processing by the MCU serving as the control circuit 2_2. Specifically, the processor constituting the MCU serving as the control circuit 2_2 performs various calculations according to the program stored in the memory to control the various peripheral circuits constituting the MCU, so that the aforementioned functional units are implemented.

The drive command analysis unit 11_2 receives, for example, a drive command signal Sc output from a host device (not illustrated). The drive command signal Sc is a signal for instructing a target value regarding driving of the motor 5_2, and is, for example, a speed command signal for instructing a target rotational speed of the motor 5_2.

The drive command analysis unit 11_2 analyzes the target rotational speed specified by the drive command signal Sc. For example, when the drive command signal Sc is a PWM signal having a duty ratio corresponding to the target rotational speed, the drive command analysis unit 11_2 analyzes the duty ratio of the drive command signal Sc and outputs information of the rotational speed corresponding to the duty ratio as a target rotational speed S11.

The drive control signal generation unit 16_2 calculates an operation amount S13 of the motor 5_2 so that the rotational speed of the motor 5_2 matches the target rotational speed S11, and generates the drive control signal Sd based on the calculated operation amount S13. Note that functions related to coil current adjustment among the functions of the drive control signal generation unit 16_2 will be described below.

The drive control signal generation unit 16_2 includes, for example, a PWM command unit 17_2 and a PWM signal generation unit 18_2. The PWM command unit 17_2 calculates the operation amount S13 of the motor 5_2 based on the position detection signal Shu input from the position detector 6_2, the target rotational speed S11 input from the drive command analysis unit 11_2, a phase adjustment instruction signal Sp and a frequency adjustment instruction signal Sf input from the adjustment instruction signal generation unit 19_2 to be described below.

The operation amount S13 includes information specifying a drive amount of the motor 5_2 necessary for rotating the motor 5_2 at the target rotational speed S11. For example, when the motor 5_2 is PWM-driven as in the present embodiment, the operation amount S13 includes a value specifying a cycle of a PWM signal (PWM cycle) as the drive control signal Sd, a value specifying an ON period of the PWM signal, and a value specifying the output timing of the PWM signal.

Figure 10:
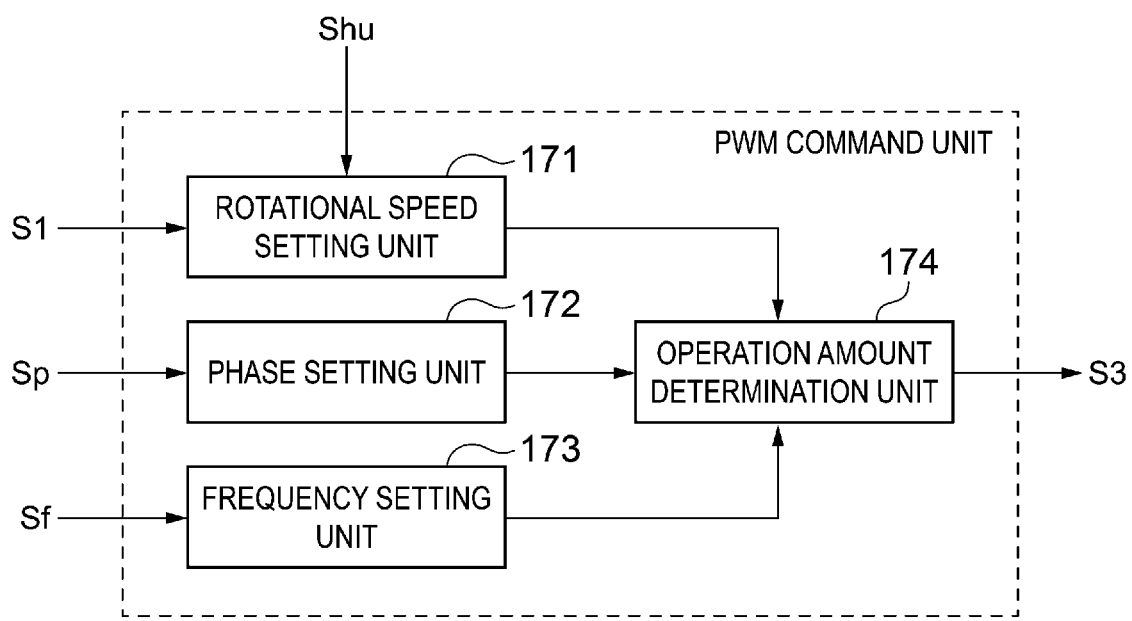
FIG. 10 is a diagram illustrating an internal configuration of a PWM command unit 17_2.

FIG. 10 is a diagram illustrating an internal configuration of the PWM command unit 17_2.

The PWM command unit 17_2 includes a rotational speed setting unit 171, a phase setting unit 172, a frequency setting unit 173, and an operation amount determination unit 174 as illustrated in FIG. 10. In the PWM command unit 17_2, the phase setting unit 172, the frequency setting unit 173, and the operation amount determination unit 174 are functional units for implementing the coil current adjustment function of the motor 5_2 described above.

The rotational speed setting unit 171 determines a set value of the rotational speed using the position detection signal Shu input from the position detector 6_2 and the target rotational speed S11 output from the drive command analysis unit 11_2. For example, the rotational speed setting unit 171 calculates an actual rotational speed of the motor 5_2 based on the position detection signal Shu, and performs a proportional-integral-differential (PID) control arithmetic operation such that the calculated actual rotational speed matches the target rotational speed S11 output from the drive command analysis unit 11_2 to determine the set value of the rotational speed.

The phase setting unit 172 determines a set value of the phase based on the phase adjustment instruction signal Sp output from the adjustment instruction signal generation unit 19_2 to be described below.

The frequency setting unit 173 determines a set value of a frequency based on the frequency adjustment instruction signal Sf output from the adjustment instruction signal generation unit 19_2 to be described below.

The operation amount determination unit 174 calculates a value specifying a PWM cycle of the drive control signal Sd and a value specifying the ON period of the PWM signal based on the set value of the rotational speed determined by the rotational speed setting unit 171, the set value of the phase determined by the phase setting unit 172, and the set value of the frequency determined by the frequency setting unit 173, then determines (generates) the operation amount S13 (including the PWM cycle, the ON period, and the output timing) and outputs the operation amount S13 to the PWM signal generation unit 18_2.

Note that the motor drive control device 1_2 of FIG. 9 has a feedback control function, but, in a case of not having the feedback control function, the rotational speed setting unit 171 may determine the set value of the rotational speed from the target rotational speed S11 output from the drive command analysis unit 11_2.

The PWM signal generation unit 18_2 generates the drive control signal Sd based on the operation amount S13 input from the PWM command unit 17_2. Specifically, the PWM signal generation unit 18_2 generates each of the six types of PWM signals Suu, Sul, Svu, Svl, Swu, and Swl having the PWM cycle and the ON period specified by the operation amount S13, and outputs the PWM signals as the drive control signal Sd.

In the present embodiment, a dead time period Td is provided in order not to turn on the high side switch and the low side switch constituting each of the switching legs of the U phase, the V phase, and the W phase at the same time. In other words, the PWM signal generation unit 18_2 generates the drive control signal Sd (the above six types of PWM signals) such that, when the high side switch and the low side switch constituting each of the switching legs of the U phase, the V phase, and the W phase are switched between ON and OFF states, the dead time period Td for turning off the high side switch and the low side switch at the same time is provided. Note that details of the dead time period Td will be described below.

The target point determination unit 12_2, the phase voltage input unit 13_2, the current zero crossing point estimation unit 14_2, and the adjustment instruction signal generation unit 19_2 are functional units for implementing the coil current adjustment function of the motor 5_2 described above. Prior to describing each of the functional units in detail, an overview of the coil current adjustment function according to the present embodiment will be described.

FIG. 2 is a diagram for describing phase adjustment of the coil current adjustment function by the motor drive control device 1_2 according to the second embodiment.

A waveform 200 of the position detection signal (Hall signal) Shu output from the position detector 6_2 is shown in the upper part of FIG. 2, a waveform 201 of the drive voltage Vu of the coil Lu of the U phase and a waveform 202 of an induced voltage of the coil Lu of the U phase are shown in the middle part of FIG. 2, and a waveform 203 of the coil current Iu of the coil Lu of the U phase is shown in the lower part of FIG. 2.

As described above, a shift may occur between the phase of the induced voltage and the phase of the coil current of the motor in general due to the rotational speed of the motor, the load of the motor, and a change in motor characteristics caused by temperature. For example, FIG. 2 shows a case of the phase of the coil current Iu of the U phase being delayed with respect to the phase of the induced voltage of the coil Lu of the U phase.

When a phase shift occurs between the coil current Iu and the induced voltage as illustrated in FIG. 2, the drive efficiency of the motor 5_2 is reduced. Thus, the motor drive control device 1_2 according to the present embodiment detects the shift (phase difference) between the coil current Iu and the induced voltage, and adjusts the energization timing of the motor (an output timing of the PWM signal) to reduce the phase difference.

Specifically, first, the motor drive control device 1_2 detects the zero crossing point of the induced voltage by using the fact that the position detection signal (Hall signal) Shu output from the position detector 6_2 (Hall element) provided to correspond to a predetermined phase is synchronized with the induced voltage of the coil of the predetermined phase, and sets the zero crossing point as a target point P of zero crossing of the coil current Iu.

In the present embodiment, for example, the position detector 6_2 is disposed in advance at a position where the rising edge of the position detection signal Shu of the position detector 6_2 can be detected at a timing delayed by an electrical angle of 30 degrees from the zero crossing point of the induced voltage of the coil Lu of the U phase as illustrated in FIG. 2. Thus, the motor drive control device 1_2 can detect (estimate) the zero crossing point of the induced voltage of the coil Lu by detecting the rising edge of the position detection signal Shu.

Further, the installation position of the position detector 6_2 is only required to be a position where the phase difference between the timing for detecting the rising edge of the position detection signal Shu and the zero crossing point of the induced voltage of the coil of the predetermined phase is known, and is not limited to the above example.

The motor drive control device 1_2 detects the rising edge or the falling edge of the position detection signal Shu, and estimates the zero crossing point of the induced voltage from at least one of the detected edges. The motor drive control device 1_2 determines that the estimated zero crossing point of the induced voltage is the target point P of zero crossing of the coil current Iu.

Next, the motor drive control device 1_2 estimates the zero crossing point of the coil current of the predetermined phase by detecting a change in the current direction of the coil current of the predetermined phase (the U phase in the present embodiment) at a predetermined timing in every cycle of the PWM signal. Specifically, the motor drive control device 1_2 compares the drive voltage (phase voltage) of the coil of the predetermined phase (the U phase in the present embodiment) to at least one of an ON period and an OFF period of a signal for turning on or off the high side switch corresponding to the predetermined phase and estimates the zero crossing point Q of the coil current of the predetermined phase of the motor based on the comparison result. Note that details of the method for estimating the zero crossing point Q of the coil current will be described below. The PWM signal may be preferably synchronized with the position detection signal at a timing before the zero crossing point of the coil current of the predetermined phase is estimated.

In addition, the motor drive control device 1_2 adjusts the phase of the coil current Iu so that the estimated zero crossing point Q of the coil current Iu matches the target point P of zero crossing of the coil current Iu (the zero crossing point of the induced voltage). For example, the phase of the coil current Iu is adjusted by adjusting the timing for applying the drive voltage Vu to the coil Lu of the U phase (performing advance angle adjustment or delay angle adjustment) so that the zero crossing point Q of the coil current Iu of the U phase matches the target point P as illustrated in FIG. 2. This allows the motor drive control device 1_2 to improve the drive efficiency of the motor 5_2.

At this time, the zero crossing point Q of the coil current of the predetermined phase of the motor is estimated at a predetermined timing in every cycle of the motor drive signal, and thus there is a possibility that the estimated zero crossing point Q shifts from the actual zero crossing point in the time range corresponding to one cycle of the motor drive signal. The frequency adjustment of the coil current adjustment function by the motor drive control device 1_2 according to the embodiment can reduce the possibility that there is a shift between the estimated zero crossing point Q and the actual zero crossing point of the coil current of the predetermined phase of the motor.

Due to the frequency adjustment of the coil current adjustment function, the cycle of the motor drive signal is appropriately adjusted by adjusting the frequency of the PWM signal. By appropriately adjusting the cycle of the motor drive signal, the time range having the shift is appropriately set, and accuracy in estimation can be increased. The frequency adjustment may be performed according to the phase difference between the estimated zero crossing point Q of the coil current Iu and the target point P of the zero crossing of the coil current Iu.

Each of the functional units for implementing the coil current adjustment function described above will be described in detail below.

The target point determination unit 12_2 determines the target point of zero crossing of the coil current of the predetermined phase based on the position detection signal Shu synchronized with the induced voltage of the coil of the predetermined phase of the motor 5_2 and corresponding to the rotational position of the rotor of the motor 5_2.

In the present embodiment, the target point determination unit 12_2 detects the rising edge or the falling edge of the position detection signal Shu synchronized with the induced voltage of the coil Lu of the U phase, and determines a zero crossing point of the induced voltage of the coil Lu of the U phase, that is, the target point P of zero crossing of the coil current Iu of the U phase based on the detected edge. In FIG. 2, for example, when the target point determination unit 12_2 detects the rising edge of the position detection signal Shu at a time t1, the target point determination unit 12_2 determines that a time (timing) t0 earlier than the time t1 by an electrical angle of 30 degrees is the target point P. Note that the target point P is determined in the same method as well when the falling edge of the position detection signal Shu is detected.

The phase voltage input unit 13_2 acquires a value of the voltage of the predetermined phase of the motor 5_2. For example, the phase voltage input unit 13_2 acquires the drive voltage Vu of the coil Lu of the U phase detected by the phase voltage detection circuit 4_2, converts the drive voltage Vu into a digital value, and gives the digital value to the current zero crossing point estimation unit 14_2.

The current zero crossing point estimation unit 14_2 estimates the zero crossing point of the coil current of the predetermined phase by detecting a change in the current direction of the coil current of the predetermined phase at a predetermined timing in every cycle of the PWM signal. The current zero crossing point estimation unit 14_2 specifically is a functional unit comparing the drive voltage (phase voltage) of the coil of the predetermined phase to at least one of the ON and OFF periods of the signal for turning on or off the high side switch corresponding to the predetermined phase in every cycle of the drive control signal Sd being a PWM signal and estimating the zero crossing point of the coil current of the predetermined phase based on the comparison result. The method for estimating the zero crossing point of the coil current by the current zero crossing point estimation unit 14_2 will be described below in detail using the drawings.

FIG. 3A is a timing chart showing changes in the PWM signals Suu and Sul of the U phase and the drive voltage Vu of the coil Lu when the coil current Iu of the U phase is switched from the positive (+) polarity to the negative (−) polarity.

FIG. 3B is a timing chart showing changes in the PWM signals Suu and Sul of the U phase and the drive voltage Vu of the coil Lu when the coil current Iu of the U phase is switched from the negative (−) polarity to the positive (+) polarity.

In FIGS. 3A and 3B, waveforms of the coil current Iu of the U phase, the PWM signal Suu for driving the high side switch QuH of the U phase, the PWM signal Sul for driving the low side switch QuL of the U phase, and the drive voltage Vu of the coil Lu of the U phase are shown in this order from the upper part to the lower part. Note that, in FIGS. 3A and 3B, the horizontal axis represents time, and the vertical axis represents current or voltage.

FIG. 4A is a diagram for describing a state when the high side switch QuH and the low side switch QuL of the U phase are turned off in a state of the positive (+) polarity coil current flowing in the coil Lu of the U phase.

FIG. 4B is a diagram for describing a state when the high side switch QuH and the low side switch QuL of the U phase are turned off in a state of the negative (−) polarity coil current flowing in the coil Lu of the U phase.

For example, when the PWM signal Suu is at a high level and the PWM signal Sul is at a low level, the high side switch QuH of the U phase is turned on and the low side switch QuL of the U phase is turned off as illustrated in FIG.

3A. At this time, since a current flows from the DC voltage Vdd to the coil Lu of the U phase via the high side switch QuH of the U phase, the coil current Iu of the U phase has a positive (+) polarity.

In this state, that is, in the state of the positive (+) polarity coil current Iu flowing in the coil Lu of the U phase, when the high side switch QuH and the low side switch QuL of the U phase are turned off together, the coil Lu attempts to keep the current flowing. For this reason, the positive polarity coil current Iu flows via the parasitic diode of the low side switch QuL from the ground potential GND as illustrated in FIG. 4A. As a result, the drive voltage Vu of the coil Lu decreases to near the ground potential GND.

Thus, in the dead time period Td for tuning off the high side switch QuH and the low side switch QuL of the U phase together when the coil current Iu of the U phase has a positive (+) polarity, the drive voltage Vu of the U phase is at a low level as illustrated in FIG. 3A.

As a result, in the period of the coil current Iu of the U phase having a positive (+) polarity, a first period Tv of the drive voltage Vu of the coil Lu of the U phase being at a high level matches a second period Th of the PWM signal Suu for switching on and off the high side switch QuH of the U phase being at a high level in one cycle of the PWM signal Suu as illustrated in FIG. 3A.

On the other hand, when the PWM signal Suu is at a low level, and the PWM signal Sul is at a high level, the high side switch QuH of the U phase is turned off, and the low side switch QuL of the U phase is turned on as illustrated in FIG. 3B. At this time, since a current flows from the coil Lu of the U phase to the ground potential GND via the low side switch QuL of the U phase, the coil current Iu of the U phase has a negative (−) polarity.

In this state, that is, in the state of the negative (−) polarity coil current Iu flowing in the coil Lu of the U phase, when the high side switch QuH and the low side switch QuL of the U phase are turned off together, the coil Lu attempts to keep the current flowing. Thus, the negative polarity coil current Iu flows from the coil Lu of the U phase via the parasitic diode of the high side switch QuH to the DC voltage Vdd side as illustrated in FIG. 4B. As a result, the drive voltage Vu of the coil Lu rises to near the DC voltage Vdd.

Thus, in the dead time period Td for tuning off the high side switch QuH and the low side switch QuL of the U phase when the coil current Iu of the U phase has a negative (−) polarity, the drive voltage Vu of the U phase is at a high level as illustrated in FIG. 3B.

As a result, in the period of the coil current Iu of the U phase having a negative (−) polarity, the first period Tv of the drive voltage Vu of the coil Lu of the U phase being at a high level is longer than the second period Th of the PWM signal Suu for switching on and off the high side switch QuH of the U phase being at a high level in one cycle of the PWM signal Suu as illustrated in FIG. 3B, and thus the first period Tv does not match the second period Th.

When the motor is PWM-driven, in one cycle of the PWM signal Suu, the first period Tv matches the second period Th in the period of the coil current of the predetermined phase having a positive polarity, and the first period Tv does not match the second period Th in the period of the coil current having a negative polarity as described above.

Thus, when the timing of the transition from the state of the first period Tv matching the second period Th to the state of the first period Tv not matching the second period Th and the timing of transition from the state of the first period Tv not matching the second period Th to the state of the first period Tv matching the second period Th are detected as illustrated in FIGS. 3A and 3B, the zero crossing point of the coil current of the predetermined phase can be estimated.

Thus, the current zero crossing point estimation unit 14_2 monitors the drive voltage Vu of the coil Lu of the U phase acquired by the phase voltage input unit 13_2 and the PWM signal Suu of the high side switch QuH of the U phase, compares the first period Tv of the drive voltage Vu of the coil Lu of the U phase being at a high level to the second period Th of the PWM signal Suu of the high side switch QuH of the U phase being at a high level in every cycle of the PWM signal Suu, and determines whether the first period Tv matches the second period Th.

As described above, switching of the drive voltage Vu to a high level or a low level and switching of the PWM signal Suu to a high level or a low level correspond to switching of the high side switch QuH of the U phase between ON and OFF states. Thus, in the following description, the first period Tv of the drive voltage Vu being at a high level may be referred to as an "ON period Tv", and the second period Th of the PWM signal Suu being at a high level may be referred to as an "ON period Th".

Whether the ON period (first period) Tv matches the ON period (second period) Th is determined as follows.

For example, the current zero crossing point estimation unit 14_2 calculates the difference |Th−Tv| between the ON period Tv of the drive voltage Vu of the coil Lu of the U phase being at a high level and the ON period Th of the PWM signal Suu of the high side switch QuH of the U phase being at a high level, and determines whether the difference |Th−Tv| is equal to or greater than a threshold Tth.

When the difference |Th−Tv| is equal to or greater than the threshold Tth, the current zero crossing point estimation unit 14_2 determines that the ON period Tv does not match the ON period Th (non-matching) and determines that the coil current Iu of the U phase has a negative polarity. On the other hand, when the difference |Th−Tv| is less than the threshold Tth, the current zero crossing point estimation unit 14_2 determines that the ON period Tv matches the ON period Th and determines that the coil current Iu of the U phase has a positive polarity.

Here, the threshold Tth for determining whether or not the ON period Tv matches the ON period Th may be set based on the dead time period Td of the drive control signal Sd being a PWM signal. For example, Tth may be equal to Td.

The current zero crossing point estimation unit 14_2 detects at least one of a timing for switching from the state of the ON period Tv matching the ON period Th to the state of the ON period Tv not matching the ON period Th and a timing for switching from the state of the ON period Tv not matching the ON period Th to the state of the ON period Tv matching the ON period Th (referred to as "zero crossing detection" below), and estimates the detected timing as a zero crossing point Q of the coil current Iu of the U phase.

That is, the current zero crossing point estimation unit 14_2 determines that the timing for switching the state of the ON period of the drive voltage Vu of the coil Lu of the U phase (the first period Tv) matching the ON period of the PWM signal of the high side switch QuH of the U phase (the second period Th) to the state of the ON periods not matching each other is the zero crossing point Q of the polarity of the coil current Iu switching from positive to negative. Additionally, the current zero crossing point estimation unit 14_2 determines that the timing for switching the state of the ON period Tv not matching the ON period Th to the state of the ON period Tv matching the ON period Th is the zero crossing point Q of the polarity of the coil current Iu switching from negative to positive.

The current zero crossing point estimation unit 14_2 performs zero crossing detection for each zero crossing detection interval being an interval matching one cycle of the PWM signal. That is, the timing of zero crossing detection by the current zero crossing point estimation unit 14_2 is synchronized with the PWM signal. Thus, it is possible to adjust the timing of the zero crossing detection by adjusting the output timing and the cycle of the PWM signal. In the present embodiment, by adjusting the timing of the zero crossing detection by the current zero crossing point estimation unit 14_2, the shift between the estimated zero crossing point Q and the actual zero crossing point of the coil current of the predetermined phase of the motor is curbed. The adjustment of the timing of the zero crossing detection will be described below.

For example, the current zero crossing point estimation unit 14_2 outputs a zero crossing point detection signal Sct to the adjustment instruction signal generation unit 19_2, the zero crossing point detection signal Sct being at a high level in the state of the ON period Tv matching the ON period Th (the coil current Iu has a positive polarity) and being at a low level in the state of the ON period Tv not matching the ON period Th (the coil current Iu has a negative polarity).

Accordingly, the adjustment instruction signal generation unit 19_2 can know the zero crossing point Q of the coil current Iu by detecting the edge (the rising edge or the falling edge) of the zero crossing point detection signal Sct. For example, the first zero crossing detection timing after the falling edge of the zero crossing point detection signal Sct switching from the high level to the low level is a zero crossing point Q of the coil current Iu switching from the positive polarity to the negative polarity, and the first zero crossing detection timing after the rising edge of the zero crossing point detection signal Sct switching from the low level to the high level is a zero crossing point Q of the coil current Iu switching from the negative polarity to the positive polarity.

Note that, as described above, the case of the current zero crossing point estimation unit 14_2 comparing the ON period (first period) Tv of the drive voltage Vu of the coil Lu of the U phase being at a high level to the ON period (second period) Th of the PWM signal Suu of the high side switch QuH of the U phase being at a high level to determine the zero crossing point Q of the coil current Iu has been described as an example in the present embodiment, but the embodiment is not limited to this example. For example, the current zero crossing point estimation unit 14_2 may compare an OFF period of the drive voltage Vu of the coil Lu of the U phase being at a low level to an OFF period of the PWM signal Suu of the high side switch QuH of the U phase being at a low level in every cycle of the PWM signal Suu and determine whether the two OFF periods match each other to determine the zero crossing point Q of the coil current Iu.

The adjustment instruction signal generation unit 19_2 generates at least one of a phase adjustment instruction signal for instructing phase adjustment of the coil current and a frequency adjustment instruction signal for instructing frequency adjustment of the PWM signal according to a phase difference $\Delta\varphi$ between the target point P determined by the target point determination unit 12_2 and the zero crossing point Q estimated by the current zero crossing point estimation unit 14_2 so that the phase difference $\Delta\varphi$ within a predetermined range.

The adjustment instruction signal generation unit 19_2 determines whether coil current adjustment is necessary based on the phase difference $\Delta\varphi$ between the target point P of the zero crossing of the coil current Iu determined by the target point determination unit 12_2 and the zero crossing point Q of the coil current Iu estimated by the current zero crossing point estimation unit 14_2.

For example, the adjustment instruction signal generation unit 19_2 calculates the phase difference $\Delta\varphi$ obtained by subtracting the phase (a time tq) of the zero crossing point Q of the coil current Iu estimated by the current zero crossing point estimation unit 14_2 from the phase (a time tp) of the target point P (the zero crossing point of the induced voltage of the coil Lu of the U phase) determined by the target point determination unit 12_2 (=the phase at the time tp−the phase at the time tq) as illustrated in FIG. 2.

The adjustment instruction signal generation unit 19_2 determines whether the calculated phase difference $\Delta\varphi$ within a predetermined range, and determines whether the coil current adjustment is necessary according to the determination result. When the coil current adjustment is determined to be necessary, it is determined whether to adjust the coil current by any method of performing only phase adjustment, performing only frequency adjustment, or performing both phase adjustment and frequency adjustment. Note that a value of the phase adjustment may be "0 (zero)" (substantially no phase adjustment is performed). Switching the method of the coil current adjustment based on the value of the calculated phase difference $\Delta\varphi$ allows the zero crossing point Q of the coil current to match the target point P while appropriately adjusting the timing of the zero crossing detection by the current zero crossing point estimation unit 14_2.

Figure 11:
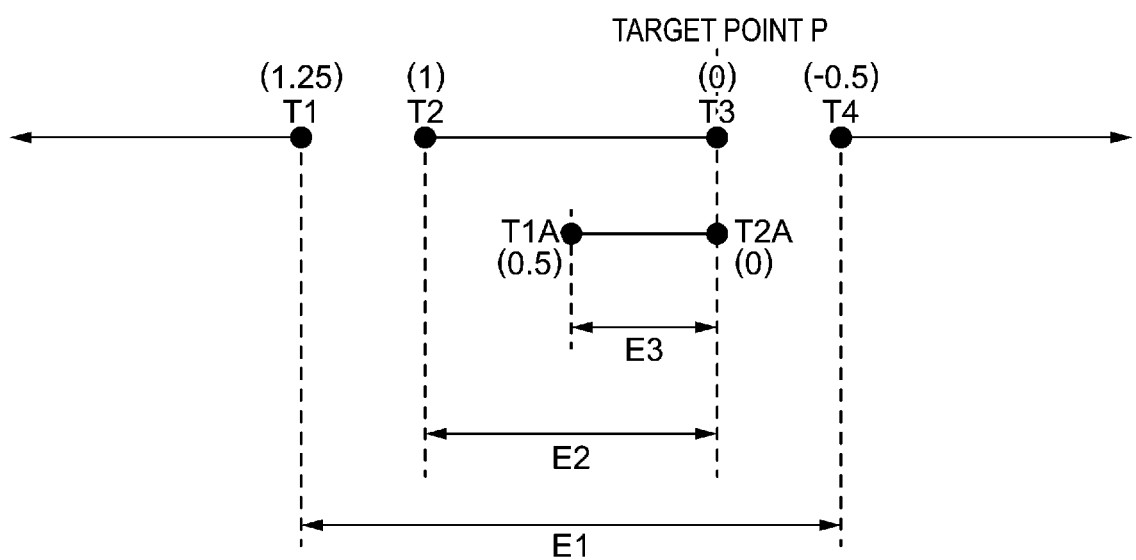
FIG. 11 is a diagram for describing determination of necessity of coil current adjustment.

FIG. 11 is a diagram for describing determination of whether coil current adjustment is necessary.

In FIG. 11, T1, T2, T3, T4, T1A, and T2A indicate phase positions defining predetermined ranges. T3 and T2A are phase positions matching the target point P determined by the target point determination unit 12_2, T1A is the phase position shifted from the above phase position to the advance angle side by 0.5 cycles of the PWM signal, T2 is the phase position shifted from the target point P to the advance angle side by one cycle of the PWM signal, and T1 is the phase position shifted from the target point P to the advance angle side by 1.25 cycles of the PWM signal.

Similarly, T4 is the phase position shifted from the target point P to the delay angle side by 0.5 cycles of the PWM signal.

Note that the range between the phase positions T1 and T4 is defined as a first range E1, and the range between the phase positions T2 and T3 (T2A) is defined as a second range E2, and the range between the phase positions T1A and T2A is defined as a third range E3. That is, the three ranges can be defined, and, in the three ranges, the second range E2 is within the first range E1 and the third range E3 is within the second range E2.

Figure 12:
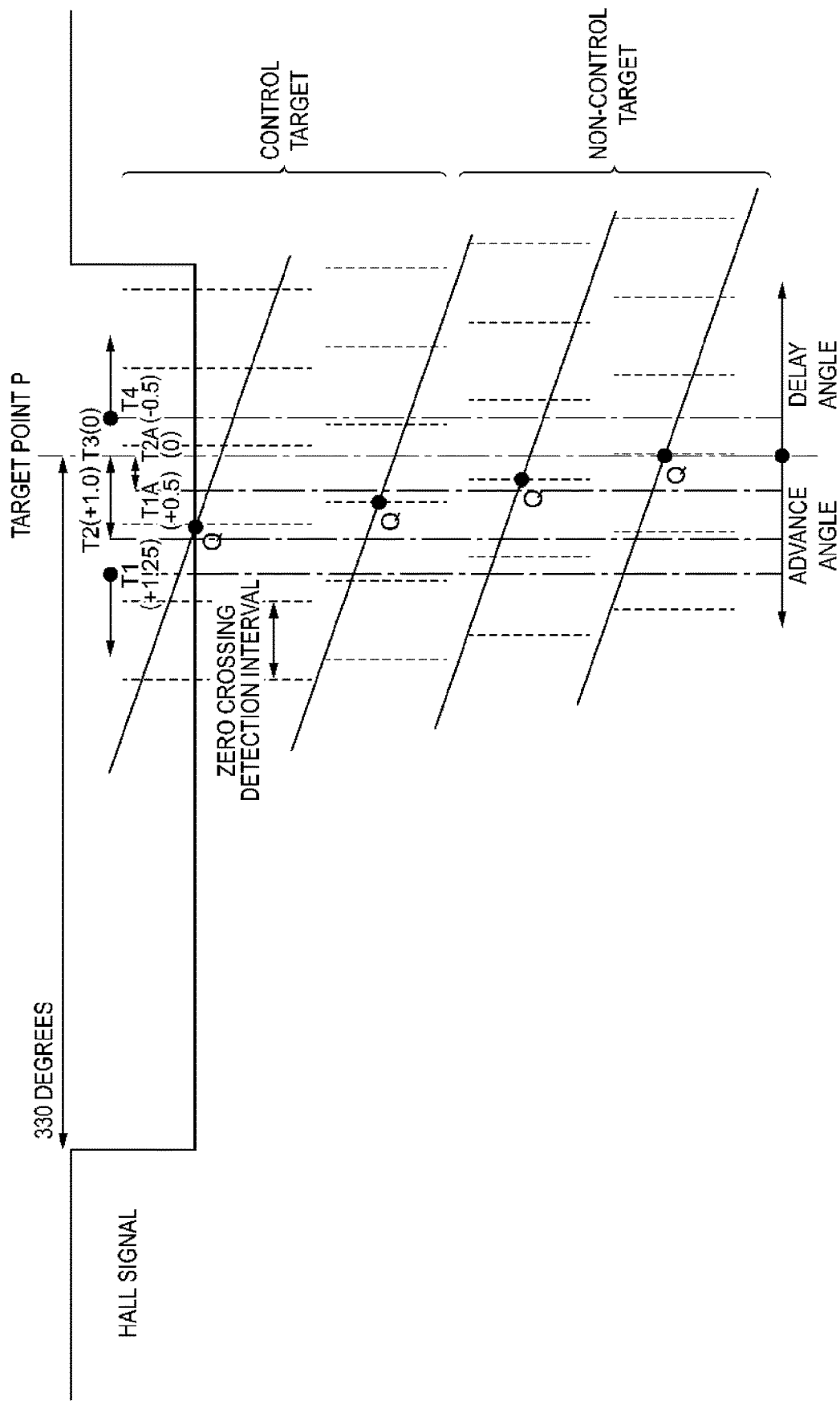
FIG. 12 is a diagram showing a relationship between a phase difference Δφ between a target point P and a zero crossing point Q of a coil current and a zero crossing detection timing.

FIG. 12 is a diagram showing a relationship between the phase difference $\Delta\varphi$ between the target point P and the zero crossing point Q of the coil current and a zero crossing detection timing.

FIG. 12 shows that, when there is an actual zero crossing point between the target point P and the position ahead of the target point P by one cycle of the PWM signal (corresponding to a zero crossing detection interval), the zero crossing point Q of the coil current is detected at the position corresponding to the timing of the zero crossing detection.

When an actual zero crossing point of the coil current is between the target point P and the position ahead of the target point P by one cycle of the PWM signal, the phase difference $\Delta\varphi$ is equal to or less than one cycle of the PWM signal in the advance angle direction, and the detected zero crossing point Q of the coil current is shifted to a position corresponding to the timing of the zero crossing detection as illustrated in FIG. 12. Thus, when the phase difference Δφ is equal to or less than one cycle of the PWM signal in the advance angle direction, phase adjustment is not performed and frequency adjustment is performed as coil current adjustment, so that the zero crossing detection interval is adjusted, and the position of the actual zero crossing point is brought closer to the target point P. In the present embodiment, when a zero crossing point Q is between the target point P and the position ahead of the target point P by 0.5 cycles of the PWM signal, it is determined that the target point P matches the zero crossing point Q of the coil current and coil current adjustment is not performed.

In addition, when the zero crossing point Q is outside the position ahead of the target point P by one cycle of the PWM signal or a position behind the target point P (when the phase difference Δφ is greater than the one cycle of the PWM signal in the advance angle direction or behind), both phase adjustment and frequency adjustment are performed as coil current adjustment. However, only phase adjustment is performed as coil current adjustment when the zero crossing point Q is outside the position ahead of the target point P by 1.25 cycles of the PWM signal or a position behind the target point P by 0.5 cycles of the PWM signal (when the phase difference Δφ is greater than 1.25 cycles of the PWM signal in the advance angle direction or behind by 0.5 cycles of the PWM signal in the delay angle direction).

Specifically, the adjustment instruction signal generation unit 19_2 determines an adjustment method according to what position the calculated phase difference Δφ is in the predetermined range (E1 or E2; however, E1 is greater than E2). In other words, the adjustment instruction signal generation unit 19_2 determines that only frequency adjustment is to be performed when the calculated phase difference Δφ is within the second range E2 (the position of the zero crossing point Q is between the phase positions T2 and T3). Further, the adjustment instruction signal generation unit 19_2 determines that only phase adjustment is to be performed when the calculated phase difference Δφ is outside the first range E1 (the position of the zero crossing point Q is outside the phase position T1 or T4). Additionally, the adjustment instruction signal generation unit 19_2 determines that at least one of phase adjustment and frequency adjustment is to be performed when it is determined that the calculated phase difference Δφ is not in the second range E2 (the position of the zero crossing point Q is between the phase positions T2 and T3) and is in the first range E1 (the position of the zero crossing point Q is between the phase positions T1 or T4)(between T1 and T2 or between T3 and T4). Note that the adjustment instruction signal generation unit 19_2 determines that neither phase adjustment nor frequency adjustment is to be performed when the calculated phase difference Δφ is within the third range E3 (E2>E3) (the position of the zero crossing point Q is between the phase positions T1A and T2A (T3)).

In frequency adjustment, the adjustment instruction signal generation unit 19_2 outputs a frequency adjustment instruction signal Sf to the drive control signal generation unit 16_2, the frequency adjustment instruction signal Sf for instructing raising (increasing) of the frequency of the drive control signal Sd being a PWM signal in a predetermined minimum unit within a set range, and then, if necessary, lowering (decreasing) of the frequency in a predetermined minimum unit within the set range.

To raise or lower the frequency in each predetermined minimum unit, the adjustment instruction signal generation unit 19_2 does not continuously raise or lower the frequency, and raise or lower the frequency in the minimum unit each time a predetermined time interval elapses. The frequency is not suddenly raised or lowered, and thus the motor current does not become unstable due to an abrupt change in the rotational speed.

The adjustment instruction signal generation unit 19_2 instructs the drive control signal generation unit 16_2 to shift the output timing of the drive control signal Sd by only a time corresponding to the phase difference Δφ (=the phase at the time tp−the phase at the time tq) in the phase adjustment.

Specifically, when the phase difference Δφ a positive (+) value, for example, when the phase difference Δφ equal to or greater than the threshold +φth, the adjustment instruction signal generation unit 19_2 determines that the phase of the coil current Iu is ahead of the phase of the induced voltage of the coil Lu of the U phase, and instructs the drive control signal generation unit 16_2 to perform delay angle adjustment of delaying the phase of the coil current Iu. For example, the adjustment instruction signal generation unit 19_2 outputs a phase adjustment instruction signal Sp for giving an instruction to perform the delay angle adjustment of delaying the coil current Iu only by the phase difference Δφ.

When the phase difference Δφ a negative (−) value, for example, when the phase difference Δφ equal to or less than the threshold −φth, the adjustment instruction signal generation unit 19_2 determines that the phase of the coil current Iu is behind the phase of the induced voltage of the coil Lu of the U phase, and instructs the drive control signal generation unit 16_2 to perform advance angle adjustment of advancing the phase of the coil current Iu. For example, the adjustment instruction signal generation unit 19_2 outputs the phase adjustment instruction signal Sp for giving an instruction to perform the advance angle adjustment of advancing the coil current Iu only by the phase difference Δφ to the drive control signal generation unit 16_2.

In addition, when the phase difference Δφ greater than the threshold −φth and smaller than the threshold +φth (−φth<Δφ<+φth), the adjustment instruction signal generation unit 19_2 determines that the phase of the coil current Iu substantially matches the phase of the induced voltage of the coil Lu of the U phase, and outputs the phase adjustment instruction signal Sp for giving an instruction to perform neither the advance angle adjustment nor the delay angle adjustment to the drive control signal generation unit 16_2.

The drive control signal generation unit 16_2 generates the drive control signal Sd so as to reduce the difference between the zero crossing point Q of the coil current Iu and the target point P of the zero crossing based on at least one of the phase adjustment instruction signal Sp and the frequency adjustment instruction signal Sf input from the adjustment instruction signal generation unit 19_2. Specifically, the PWM command unit 17_2 determines set values of the phase and the frequency of the PWM signal based on at least one of the phase adjustment instruction signal Sp and the frequency adjustment instruction signal Sf generated by the adjustment instruction signal generation unit 19_2, determines (generates) the operation amount S13 including the values of the PWM cycle and the ON period of the PWM signal, and outputs the operation amount S13 to the PWM signal generation unit 18_2.

Here, the set value of the phase of the PWM signal is a value specifying a temporal shift width (offset time) with respect to the reference time for outputting the PWM signal as the drive control signal Sd.

For example, when the phase adjustment instruction signal Sp for giving an instruction to perform the advance angle adjustment of advancing the phase only by the phase difference Δφ output from the adjustment instruction signal generation unit 19_2, the PWM command unit 17_2 calculates the value "−Δtφ" for instructing output of the PWM signal earlier than the reference time only by the time Δtφ corresponding to the phase difference Δφ and sets the value as a set value of the phase of the PWM signal.

In addition, for example, when the phase adjustment instruction signal Sp for giving an instruction to perform the delay angle adjustment of delaying the phase only by the phase difference Δφ output from the adjustment instruction signal generation unit 19_2, the PWM command unit 17_2 calculates the value "+Δtφ" for instructing output of the PWM signal later than the reference time only by the time Δtφ corresponding to the phase difference Δφ and sets the value as a set value of the phase of the PWM signal.

In addition, for example, when the phase adjustment instruction signal Sp for giving an instruction to perform neither the advance angle adjustment nor the delay angle adjustment is output from the adjustment instruction signal generation unit 19_2, the PWM command unit 17_2 sets the set value of the phase of the PWM signal to "0 (zero)".

When outputting the drive control signal Sd, the PWM signal generation unit 18_2 changes the timing for outputting the drive control signal Sd based on the set value of the phase of the PWM signal included in the operation amount S13. For example, a reference time for outputting the drive control signal Sd is set in advance, and the PWM signal generation unit 18_2 outputs the drive control signal Sd at the timing shifted from the reference time only by a time specified by the set value of the phase of the PWM signal.

For example, when the set value of the phase of the PWM signal is "+Δtφ", the PWM signal generation unit 18_2 outputs the drive control signal Sd generated based on the information of the PWM cycle and the ON period included in the operation amount S13 later than the reference time only by Δtφ.

For example, when the set value of the phase of the PWM signal is "−Δtφ", the PWM signal generation unit 18_2 outputs the drive control signal Sd generated based on the information of the PWM cycle and the ON period included in the operation amount S13 earlier than the reference time only by Δtφ.

In addition, for example, when the set value of the phase of the PWM signal is "0 (zero)", the PWM signal generation unit 18_2 outputs the drive control signal Sd generated based on the information of the PWM cycle and the ON period included in the operation amount S13 at the reference time without shifting the output timing. Note that, not shifting the output timing means maintaining the phase adjustment when the phase adjustment (advance angle or delay angle adjustment) has been performed at that point of time.

Next, a sequence of drive control of the motor 5_2 by the motor drive control device 1_2 according to the present embodiment will be described.

Figure 13:
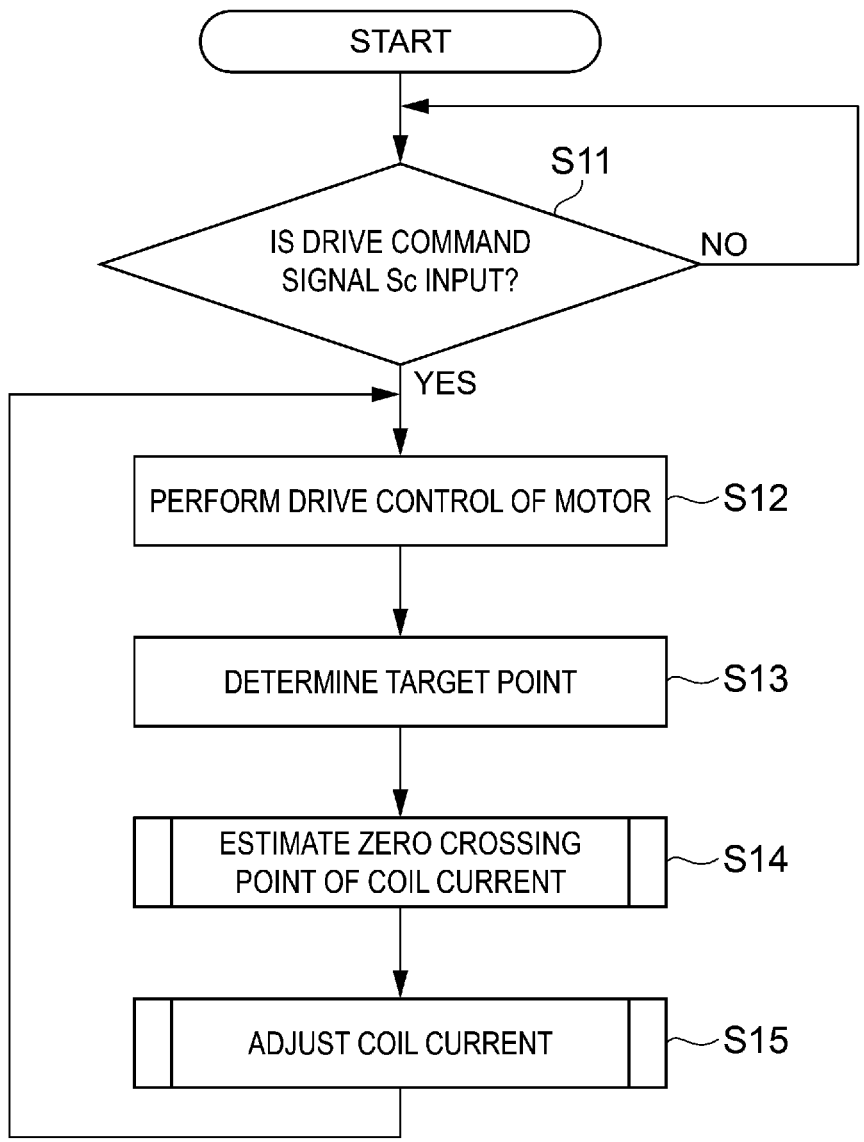
FIG. 13 is a flowchart showing a sequence of motor drive control processing by the motor drive control device according to the second embodiment.

FIG. 13 is a flowchart showing a sequence of motor drive control processing by the motor drive control device 1_2 according to the embodiment.

For example, when the DC voltage Vdd is input to the motor drive control device 1_2 and the motor drive control device 1_2 is activated, the motor drive control device 1_2 first determines whether a drive command signal Sc is input (step S11). When the drive command signal Sc is not input (step S11: NO), the motor drive control device 1_2 waits until the drive command signal Sc is input.

When the drive command signal Sc is determined to be input (step S11: YES), the motor drive control device 1_2 starts drive control of the motor 5_2 (step S12). Specifically, the drive control signal generation unit 16_2 determines the PWM cycle and the ON period based on a target rotational speed S11 of the motor 5_2 analyzed by the drive command analysis unit 11_2, generates the six types of PWM signals Suu and the like having the determined PWM cycle and ON period, and inputs the signals as the drive control signal Sd to the drive circuit 3_2. Thus, the drive circuit 3_2 switches the energizing directions of the coils Lu, Lv, and Lw of the motor 5_2 to rotate the motor 5_2.

Next, the motor drive control device 1_2 determines the target point P of zero crossing of the coil current Iu of the U phase (step S13). For example, the target point determination unit 12_2 determines that the timing advanced by an electrical angle of 30 degrees from the rising edge of the position detection signal Shu is the target point P as described above (see FIG. 2).

Next, the motor drive control device 1_2 estimates the zero crossing point Q of the coil current Iu of the U phase (step S14).

Figure 14:
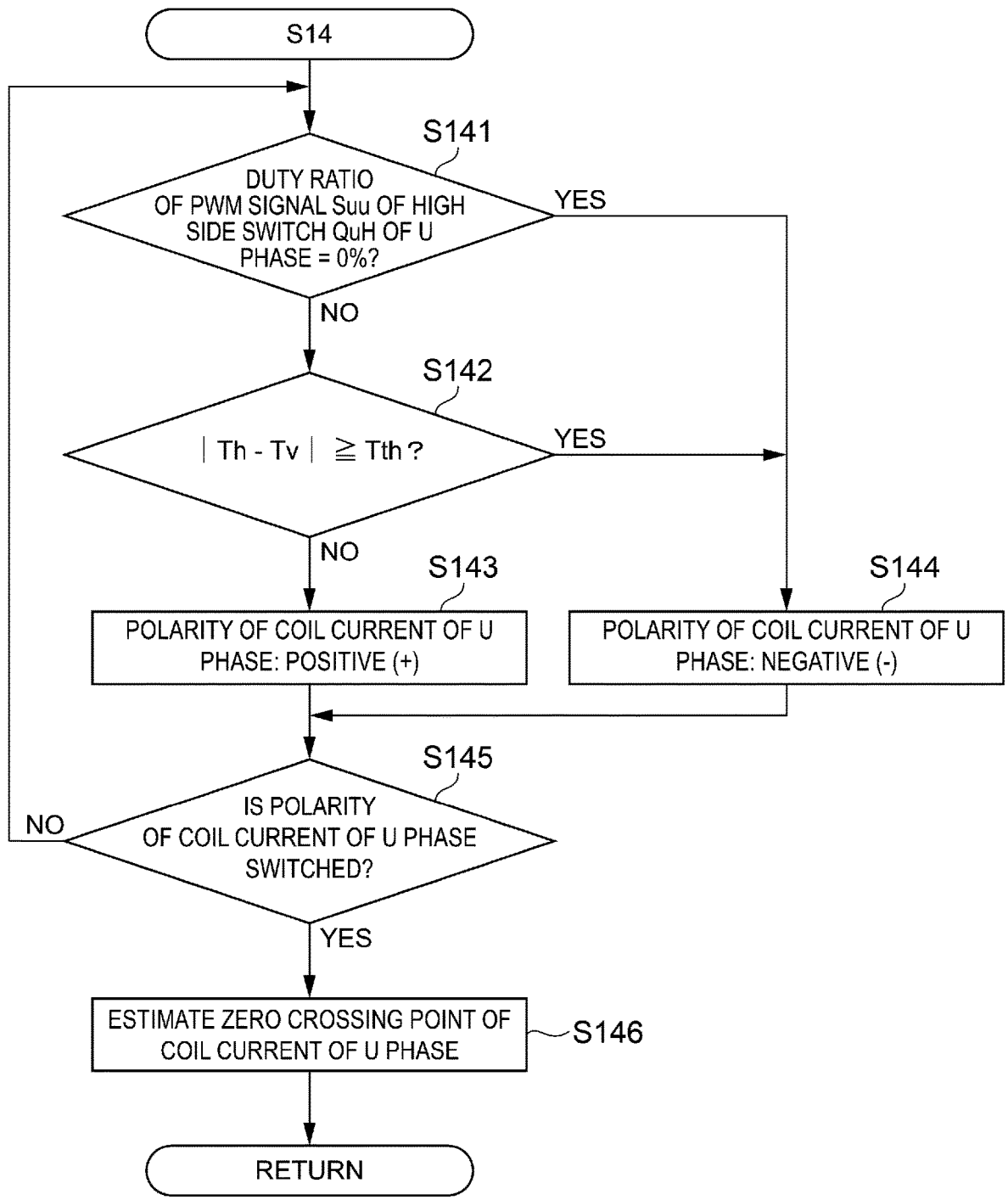
FIG. 14 is a flowchart showing a sequence of processing (step S14) of estimating a zero crossing point of a coil current of FIG. 13.

FIG. 14 is a flowchart showing a sequence of processing (step S14) of estimating the zero crossing point Q of the coil current Iu of the U phase of FIG. 13.

First, in processing of estimating the zero crossing point Q of the coil current Iu (step S14), first, the current zero crossing point estimation unit 14_2 determines whether the duty ratio of the PWM signal Suu for driving the high side switch QuH of the U phase is 0% (step S141).

When the duty ratio of the PWM signal Suu is 0% (step S14: YES), the current zero crossing point estimation unit 14_2 determines that the coil current Iu of the U phase has a negative polarity (step S144). When the duty ratio of the PWM signal Suu is determined not to be 0% (step S141: NO), the current zero crossing point estimation unit 14_2 calculates the difference |Th−Tv| between the ON period Tv of the drive voltage Vu of the coil Lu of the U phase being at a high level and the ON period Th of the PWM signal Suu of the high side switch QuH of the U phase being at a high level, and determines whether the difference |Th−Tv| is equal to or greater than the threshold Tth (step S142).

When the difference |Th−Tv| between the ON period Tv and the ON period Th is determined to be equal to or greater than the threshold Tth (step S142: YES), the current zero crossing point estimation unit 14_2 determines that the ON period Tv does not match the ON period Th (non-matching) and determines that the coil current Iu of the U phase has a negative polarity (step S144).

On the other hand, when the difference |Th−Tv| between the ON period Tv and the ON period Th is less than the threshold Tth (step S142: NO), the current zero crossing point estimation unit 14_2 determines that the ON period Tv matches the ON period Th and determines that the coil current Iu of the U phase has a positive polarity (step S143).

After step S143 or step S144, the current zero crossing point estimation unit 14_2 determines whether the polarity of the coil current Iu of the motor 5_2 is switched (step S145). For example, the current zero crossing point estimation unit 14_2 determines whether the polarity of the coil current Iu determined in step S143 or step S144 differs from the polarity of the coil current Iu determined in step S143 or step S144 in the previous round.

When the polarity of the coil current Iu is determined to be not switched (step S145: NO), i.e., when the polarity of the coil current Iu determined in step S143 or step S144 matches the polarity of the coil current Iu determined in step S143 or step S144 in the previous round, the current zero crossing point estimation unit 14_2 returns to step S141 and performs the processing from step S141 to step S145 again.

On the other hand, when the polarity of the coil current Iu is determined to be switched (step S145: YES), i.e., when the polarity of the coil current Iu determined in step S143 or step S144 does not match the polarity of the coil current Iu determined in step S143 or step S144 of the previous round, the current zero crossing point estimation unit 14_2 estimates the zero crossing point Q of the coil current Iu of the U phase (step S146). For example, the current zero crossing point estimation unit 14_2 sets one point in the period (a zero crossing point presence range) Tz1 (or Tz2) between the time for performing step S143 or step S144 and the time for performing step S143 or step S144 of the previous round as the zero crossing point Q of the coil current Iu of the U phase (see FIG. 3A or FIG. 3B). This is the end of the processing of step S14.

After the end of step S14, the motor drive control device 1_2 adjusts the coil current of the motor 5_2 (step S15) as illustrated in FIG. 13.

Figure 15:
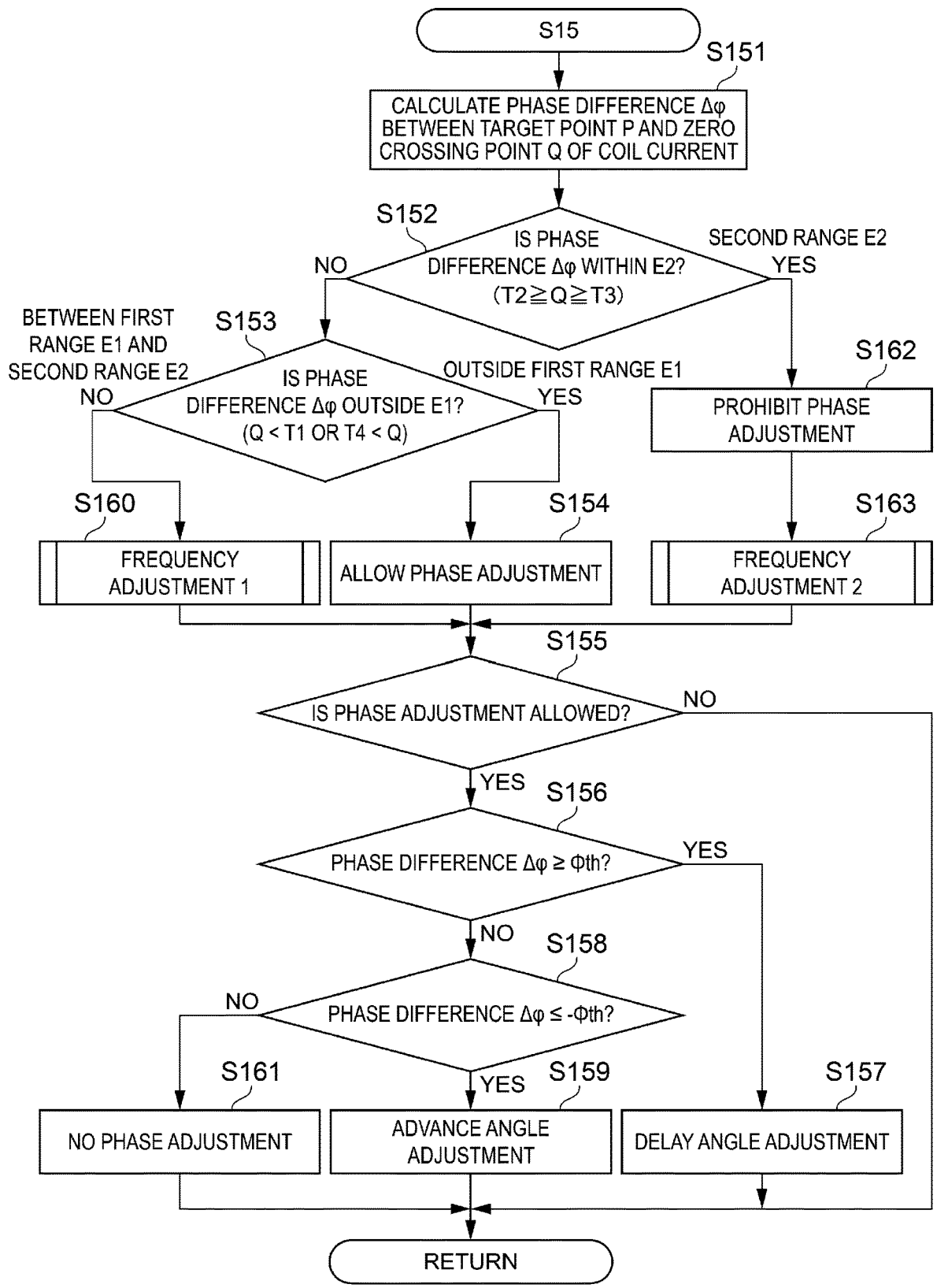
FIG. 15 is a flowchart showing a sequence of coil current adjustment processing (step S15) for the motor of FIG. 13.

FIG. 15 is a flowchart showing a sequence of coil current adjustment processing (step S15) for the motor 5_2 of FIG. 13.

In the coil current adjustment processing (step S15), first, the adjustment instruction signal generation unit 19_2 calculates the phase difference $\Delta\varphi$ between the target point P determined in step S13 and the zero crossing point Q of the coil current Iu of the U phase estimated in step S14 (=the phase at the time tp−the phase at the time tq) (step S151).

Next, the adjustment instruction signal generation unit 19_2 determines whether the phase difference $\Delta\varphi$ calculated in step S151 is within the second range E2 (whether the zero crossing point Q of the coil current Iu of the U phase is between the phase positions T2 and T3) (step S152). When it is determined that the calculated phase difference $\Delta\varphi$ not within the second range E2 (step S152: NO), the adjustment instruction signal generation unit 19_2 determines whether the calculated phase difference $\Delta\varphi$ outside the first range E1 (whether the zero crossing point Q of the coil current Iu of the U phase is outside the phase position T1, or outside the phase position T4) (step S153).

When it is determined that the calculated phase difference $\Delta\varphi$ outside the first range E1 (step S153: YES), the adjustment instruction signal generation unit 19_2 determines to perform phase adjustment and allows the phase adjustment (step S154). The adjustment instruction signal generation unit 19_2 further checks whether the phase adjustment is allowed (step S155), and when it is determined that the phase adjustment is allowed (step S155: NO), the adjustment instruction signal generation unit returns to step S151 again.

On the other hand, when it is determined that the phase adjustment is allowed (step S155: YES), the adjustment instruction signal generation unit 19_2 determines whether the phase difference $\Delta\varphi$ calculated in step S151 is equal to or greater than the threshold +$\varphi$th (step S156). When it is determined that the phase difference $\Delta\varphi$ equal to or greater than the threshold +$\varphi$th (step S156: YES), the adjustment instruction signal generation unit 19_2 determines that the phase of the coil current Iu is ahead of the phase of the induced voltage of the coil Lu of the U phase, and generates a phase adjustment instruction signal Sp for instructing the drive control signal generation unit 16_2 to perform delay angle adjustment of delaying the phase of the coil current Iu (step S157). Thus, the drive control signal generation unit 16_2 outputs the drive control signal Sd at a timing later than the reference time only by a time $\Delta t\varphi$ corresponding to the phase difference $\Delta\varphi$ as described above.

On the other hand, when it is determined that the phase difference $\Delta\varphi$ less than the threshold +$\varphi$th in step S156 (step S156: NO), the adjustment instruction signal generation unit 19_2 determines whether the phase difference $\Delta\varphi$ is equal to or smaller than the threshold −$\varphi$th (step S158). When the phase difference $\Delta\varphi$ is equal to or smaller than the threshold −$\varphi$th (step S158: YES), the adjustment instruction signal generation unit 19_2 determines that the phase of the coil current Iu is behind the phase of the induced voltage of the coil Lu in the U phase, and generates a phase adjustment instruction signal Sp for instructing the drive control signal generation unit 16_2 to perform advance angle adjustment of advancing the phase of the coil current Iu (step S159). Thus, the drive control signal generation unit 16_2 outputs the drive control signal Sd at a timing earlier than the reference time only by the time $\Delta t\varphi$ corresponding to the phase difference $\Delta\varphi$ as described above.

On the other hand, when it is determined that the phase difference $\Delta\varphi$ is greater than the threshold −$\varphi$th in step S158 (step S158: NO), the adjustment instruction signal generation unit 19_2 determines that the zero crossing point Q of the coil current Iu is within the target range of the target point P, and does not generate the phase adjustment instruction signal Sp for instructing the drive control signal generation unit 16_2 to adjust the phase of the coil current Iu (step S161). Thus, the drive control signal generation unit 16_2 outputs the drive control signal Sd at the reference time without shifting the output timing as described above.

As described above, the processing of step S15 ends.

When it is determined that the calculated phase difference $\Delta\varphi$ is not outside the first range E1 (step S153: NO), the adjustment instruction signal generation unit 19_2 determines to perform frequency adjustment and performs the processing of frequency adjustment 1 illustrated in FIG. 15 (step S160).

Figure 16:
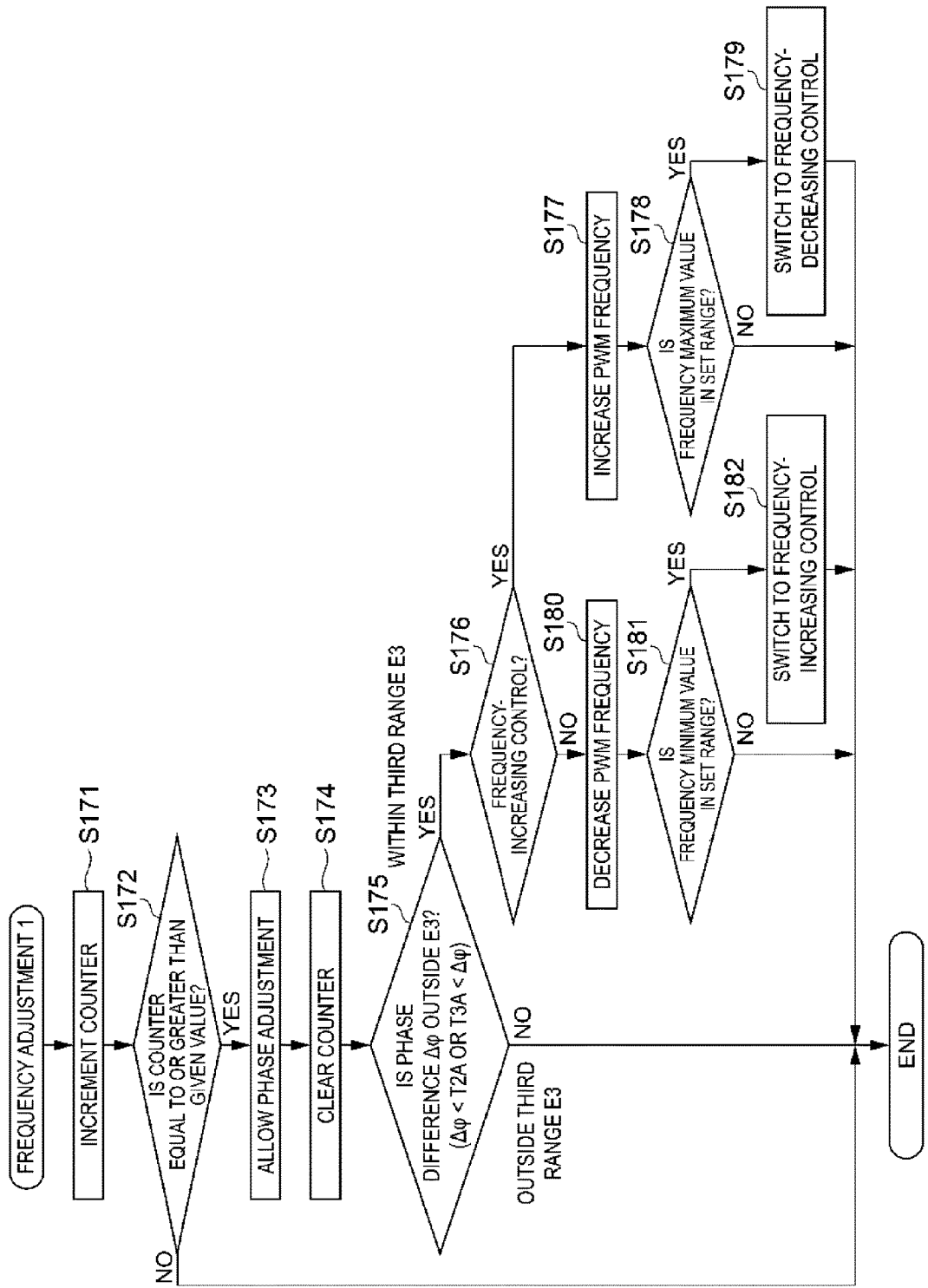
FIG. 16 is a flowchart showing a sequence of processing of frequency adjustment 1 (step S160) of FIG. 15.

FIG. 16 is a diagram illustrating the processing of frequency adjustment 1 (step S160) of FIG. 15.

The frequency adjustment 1 of FIG. 16 is processing of frequency adjustment performed by the adjustment instruction signal generation unit 19_2 when the phase difference $\Delta\varphi$ is within the first range E1 and outside the second range E2.

The adjustment instruction signal generation unit 19_2 increments the counter at predetermined time intervals (step S171), and determines whether the counter is equal to or greater than a given value (step S172). When it is determined that the counter is equal to or greater than the given value (step S172: YES), the adjustment instruction signal generation unit 19_2 allows phase adjustment (step S173) and clears the counter (step S174).

When it is determined that the counter is not equal to or greater than the given value (step S172: NO), the adjustment instruction signal generation unit 19_2 ends the processing of the frequency adjustment 1 (step S160). However, because phase adjustment has not been allowed, the processing from step S171 being the first step of the processing of the frequency adjustment 1 is performed again.

After clearing the counter in step S174, the adjustment instruction signal generation unit 19_2 determines whether the phase difference $\Delta\varphi$ is outside the third range E3 (step S175). The processing of the frequency adjustment 1 may be omitted because it has already been determined that the phase difference Δφ is not within the second range E2 in step S152. When it is determined that the phase difference Δφ is not outside the third range E3 (step S175: NO), the adjustment instruction signal generation unit 19_2 proceeds to step S155 of FIG. 15.

When it is determined that the phase difference Δφ is outside the third range E3 (step S175: YES), the adjustment instruction signal generation unit 19_2 determines whether the currently set control is frequency-increasing control (step S176). The frequency control is performed within a range of a frequency set to prevent rotation of the motor from being unstable. The frequency control includes frequency-increasing control of performing processing of increasing a frequency only in a minimum unit and frequency-decreasing control of performing processing of decreasing a frequency only in a minimum unit. In the initial state, the frequency-increasing control is set.

When it is determined that the frequency-increasing control is to be performed (step S176: YES), the adjustment instruction signal generation unit 19_2 generates a frequency adjustment instruction signal Sf for increasing the frequency of the PWM signal only in the minimum unit (step S177). The adjustment instruction signal generation unit 19_2 determines whether the frequency has reached the maximum value of the set range (step S178), and when it is determined that the frequency has not reached the maximum value (step S178: NO), the adjustment instruction signal generation unit proceeds to step S155 of FIG. 15.

When it is determined that the frequency has reached the maximum value of the set range (step S178: YES), the adjustment instruction signal generation unit 19_2 switches from the frequency-increasing control to the frequency-decreasing control (step S179), and proceeds to step S155 of FIG. 15.

When it is determined that the frequency-increasing control is not to be performed (step S176: NO), the adjustment instruction signal generation unit 19_2 generates a frequency adjustment instruction signal Sf for decreasing the frequency of the PWM signal only in the minimum unit (step S180). The adjustment instruction signal generation unit 19_2 determines whether the frequency has reached the minimum value of the set range (step S181), and when it is determined that the frequency has not reached the minimum value (step S181: NO), the adjustment instruction signal generation unit proceeds to step S155 of FIG. 15. When it is determined that the frequency has reached the minimum value of the set range (step S181: YES), the adjustment instruction signal generation unit 19_2 switches from the frequency-decreasing control to the frequency-increasing control (step S182), and proceeds to step S155 of FIG. 15.

When it is determined that the calculated phase difference Δφ within the second range E2 (step S152: YES) in FIG. 15, the adjustment instruction signal generation unit 19_2 prohibits phase adjustment (step S162), determines to perform frequency adjustment, and performs the processing of frequency adjustment 2 illustrated in FIG. 17 (step S163).

Figure 17:
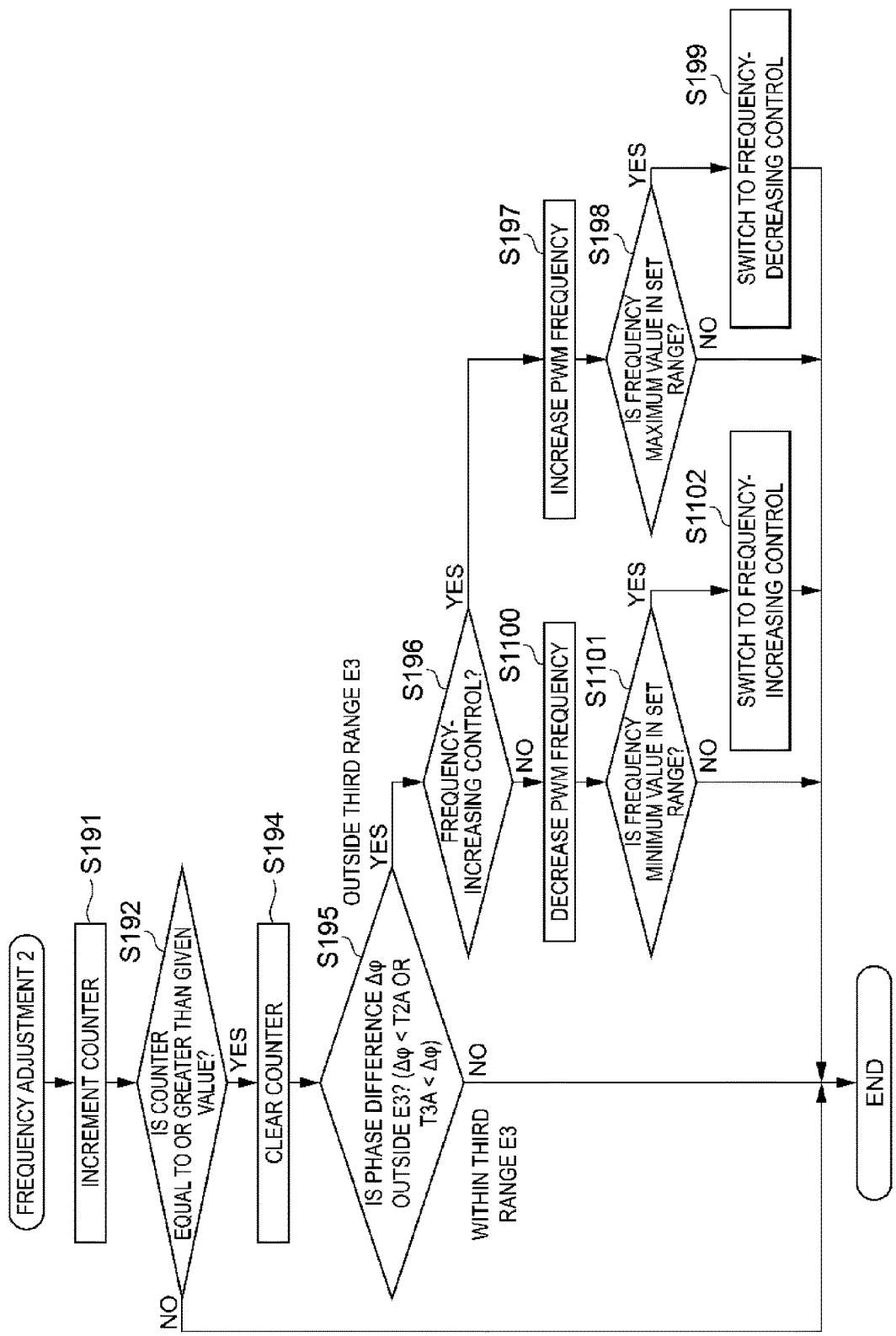
FIG. 17 is a flowchart showing a sequence of processing of frequency adjustment 2 (step S163) of FIG. 15.

FIG. 17 is a diagram illustrating the processing of the frequency adjustment 2 (step S163) of FIG. 15.

The frequency adjustment 2 in FIG. 17 is processing of frequency adjustment performed by the adjustment instruction signal generation unit 19_2 when the phase difference Δφ within the second range E2. Substantially the same processing is performed in the processing of frequency adjustment 2 illustrated in FIG. 17 except that the processing of step S173 (the processing of allowing phase adjustment) in the processing of the frequency adjustment 1 of FIG. 16 is not performed.

The adjustment instruction signal generation unit 19_2 increments the counter at predetermined time intervals (step S191), and determines whether the counter is equal to or greater than a given value or higher (step S192). When it is determined that the counter is equal to or greater than the given value or higher (step S192: YES), the adjustment instruction signal generation unit 19_2 clears the counter (step S194).

On the other hand, when it is determined that the counter is not equal to or greater than the given value or higher (step S192: NO), the adjustment instruction signal generation unit 19_2 ends the processing of the frequency adjustment 2. However, because phase adjustment has not been allowed, the processing from step S191 being the first step of the processing of the frequency adjustment 2 is performed again.

After clearing the counter in step S194, the adjustment instruction signal generation unit 19_2 determines whether the phase difference Δφ is outside the third range E3 (step S195).

When it is determined that the phase difference Δφ is outside the third range E3 (step S195: YES), the adjustment instruction signal generation unit 19_2 determines whether the currently set control is frequency-increasing control (step S196).

When it is determined that the frequency-increasing control is to be performed (step S196: YES), the adjustment instruction signal generation unit 19_2 generates the frequency adjustment instruction signal Sf for increasing the frequency of the PWM signal only in the minimum unit (step S197). The adjustment instruction signal generation unit 19_2 determines whether the frequency has reached the maximum value of the set range (step S198), and when it is determined that the frequency has not reached the maximum value (step S198: NO), the adjustment instruction signal generation unit proceeds to step S155 of FIG. 15. When it is determined that the frequency has reached the maximum value of the set range (step S198: YES), the adjustment instruction signal generation unit 19_2 switches from the frequency-increasing control to the frequency-decreasing control (step S199), and proceeds to step S155 of FIG. 15.

When it is determined that the frequency-increasing control is not to be performed (step S196: NO), the adjustment instruction signal generation unit 19_2 generates the frequency adjustment instruction signal Sf for decreasing the frequency of the PWM signal only in the minimum unit (step S1100). The adjustment instruction signal generation unit 19_2 determines whether the frequency has reached the minimum value of the set range (step S1101), and when it is determined that the frequency has not reached the minimum value (step S1101: NO), the adjustment instruction signal generation unit proceeds to step S155 of FIG. 15. When it is determined that the frequency has reached the minimum value of the set range (step S1101: YES), the adjustment instruction signal generation unit 19_2 switches from the frequency-decreasing control to the frequency-increasing control (step S1102), and proceeds to step S155 of FIG. 15.

When it is determined that the phase difference Δφ is not outside the third range E3 (step S195: NO), the adjustment instruction signal generation unit 19_2 proceeds to step S155 of FIG. 15. When it is determined that the phase difference Δφ is not outside the third range E3, the frequency adjustment can be terminated because it can be said that the phase difference Δφ is within the third range requiring no adjustment.

After the end of step S15, the motor drive control device 1_2 returns to step S12 and repeatedly performs the processing of steps S12 to S15 as illustrated in FIG. 13. Due to this operation, the motor 5_2 continuously rotates without reducing the drive efficiency.

Figure 18:
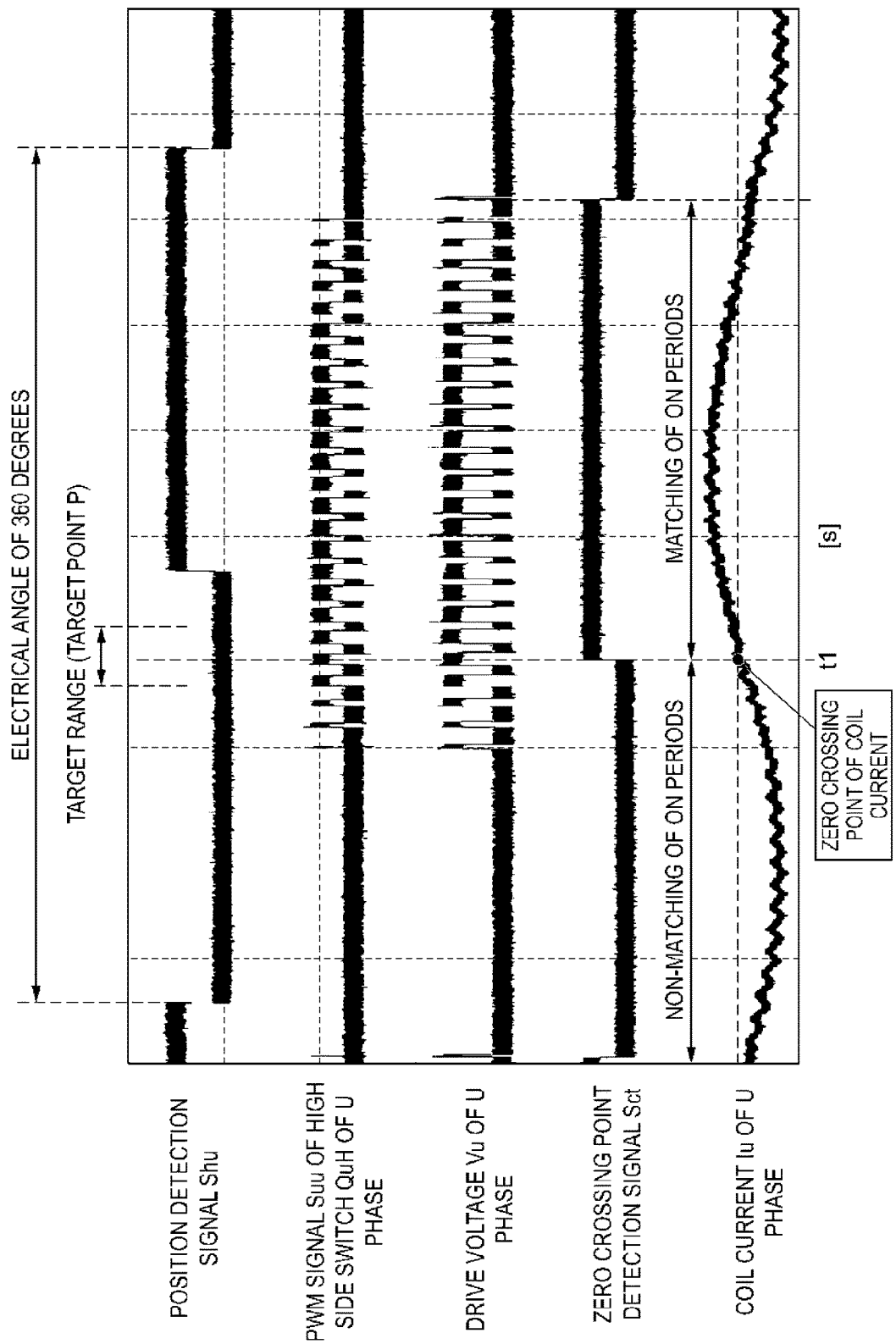
FIG. 18 is a timing chart showing changes in voltages of respective signals and the coil current Iu of the motor when the motor drive control device according to the second embodiment adjusts the phase of the coil current Iu of the motor.

FIG. 18 is a timing chart showing changes in voltages of signals and a coil current of the motor 5_2 when the motor drive control device 1_2 according to the embodiment performs frequency adjustment and phase adjustment of the coil current of the motor.

FIG. 18 shows states of respective voltages and a current of the motor unit 100_2 when the motor drive control device 1_2 adjusts the phase of the coil current Iu of the U phase of the motor 5_2.

In FIG. 18, waveforms of the position detection signal (Hall signal) Shu, the PWM signal Suu of the high side switch QuH of the U phase, the drive voltage Vu of the U phase, the zero crossing point detection signal Sct, and the coil current Iu of the U phase are shown in this order from the upper part to the lower part. In addition, in FIG. 18, the horizontal axis represents time, and the vertical axis represents voltage or current.

It is understood that the zero crossing point Q of the coil current Iu of the U phase switching from negative to positive is detected at a time t1, and that the frequency and the phase of the coil current Iu are adjusted such that the zero crossing point Q falls within a target range at a position ahead of the rising edge of the position detection signal (Hall signal) Shu by an electrical angle of 30 degrees (the target point P of zero crossing of the coil current Iu of the U phase) as illustrated in FIG. 18. As a result, the phase of the induced voltage of the motor 5_2 substantially matches the phase of the coil current Iu, and thus the drive efficiency of the motor 5_2 can be improved.

As described above, the motor drive control device 1_2 according to the present embodiment determines the target point P (the point of the time tp) of zero crossing of the coil current of the predetermined phase based on the position detection signal Shu synchronized with the induced voltage of the coil of the predetermined phase of the motor 5_2, and estimates the zero crossing point Q (the point of the time tq) of the coil current of the predetermined phase by detecting a change in the current direction of the coil current of the predetermined phase at a predetermined timing in every cycle of the PWM signal. The motor drive control device 1_2 generates at least one of the phase adjustment instruction signal (Sp) for instructing phase adjustment of the coil current and the frequency adjustment instruction signal (Sf) for instructing frequency adjustment of the PWM signal according to the phase difference Δφ between the estimated zero crossing point Q of the coil current of the predetermined phase and the target point P of zero crossing (=the phase at the time tp−the phase at the time tq) such that the phase difference Δφ within a predetermined range, and generates the drive control signal Sd (PWM signal) for driving the motor 5_2 based on at least one of the generated phase adjustment instruction signal (Sp) and frequency adjustment instruction signal (Sf).

The ON period (the first period) Tv of the drive voltage of the coil of the predetermined phase is compared to the ON period (the second period) Th of the signal for turning on and off the high side switch for driving the coil of the predetermined phase to estimate the zero crossing point Q (tq) of the coil current of the predetermined phase as described above.

In addition, by disposing the position detector 6_2 (Hall element) at a position corresponding to the coil of the predetermined phase of the motor 5_2, the position detection signal Shu synchronized with the induced voltage of the coil of the predetermined phase can be obtained. In addition, when the phase difference between the position detection signal Shu and the induced voltage is known, it is possible to determine the zero crossing point of the induced voltage, that is, the target point P of zero crossing of the coil current of the predetermined phase of the motor 5_2, based on the rising edge or falling edge of the position detection signal Shu.

Furthermore, because the ON period Tv matches the ON period Th in the period of the coil current of the predetermined phase (e.g., the U phase) of the motor 5_2 having a positive (+) polarity and the ON period Tv does not match the ON period Th in the period of the coil current having a negative (−) polarity, the zero crossing point of the coil current switching from the positive polarity to the negative polarity or the zero crossing point of the coil current switching from the negative polarity to the positive polarity can be detected by comparing the ON period Tv to the ON period Th.

Specifically, the motor drive control device 1_2 determines whether or not the ON period Tv matches the ON period Th, detects at least one of a timing for switching from the state of the ON period Tv matching the ON period Th to the state of the ON period Tv not matching the ON period Th and a timing for switching from the state of the ON period Tv not matching the ON period Th to the state of the ON period Tv matching the ON period Th, and estimates the detected timing as a zero crossing point of the coil current of the predetermined phase.

This makes it possible to easily estimate the zero crossing point of the coil current without directly monitoring the coil current of the motor 5_2.

In addition, the motor drive control device 1_2 can adjust the coil current according to the phase difference Δφ between the target point P of the zero crossing of the coil current of the predetermined phase and the zero crossing point Q of the coil current of the predetermined phase and thus can reduce the phase difference between the phase of the induced voltage of the coil of the predetermined phase and the phase of the coil current of the motor.

As described above, the motor drive control device 1_2 according to the present embodiment can increase the accuracy in phase adjustment without making the rotational speed of the motor 5_2 unstable, and thus improve the drive efficiency of the motor.

In addition, the motor drive control device 1_2 causes the control circuit to synchronize the PWM signal with the position detection signal at a timing before estimating the zero crossing point of the coil current of the predetermined phase.

With this operation, the position of the PWM signal with respect to the target point P of the zero crossing of the coil current determined by the position detection signal in each adjustment cycle becomes stable, and thus adjustment becomes easier.

In addition, the motor drive control device 1_2 causes the adjustment instruction signal generation unit 19_2 to generate only the phase adjustment instruction signal until the phase difference is within the first range when the phase difference is outside the first range, and to generate at least one of the frequency adjustment instruction signal and the phase adjustment instruction signal when the phase difference is within the first range.

This makes it possible to efficiently reduce the phase difference by performing only phase adjustment when the phase difference is large.

In addition, when the phase difference is within the second range inside the first range, the motor drive control device 1_2 causes the adjustment instruction signal generation unit 19_2 to prohibit generation of the phase adjustment instruction signal and to generate only the frequency adjustment instruction signal.

According to this operation, fine adjustment of the phase difference can be performed stably by prohibiting phase adjustment and adjusting only the frequency when the phase difference is small to some extent.

Further, the motor drive control device 1_2 causes the adjustment instruction signal generation unit 19_2 to give an instruction to adjust the frequency of the PWM signal in a minimum unit of the frequency by using the frequency adjustment instruction signal and generate the frequency adjustment instruction signal at predetermined time intervals.

With this operation, even when it takes time to stabilize the rotation after the frequency is changed, the rotation does not become unstable and the phase is not shifted significantly. Thus, the frequency can be adjusted with the rotation stabilized.

Additionally, the motor drive control device 1_2 causes the adjustment instruction signal generation unit 19_2 to give an instruction to increase the frequency of the PWM signal until the frequency reaches the maximum frequency within a predetermined frequency range or give an instruction to decrease the frequency of the PWM signal until the frequency reaches the minimum frequency within the predetermined frequency range by using the frequency adjustment instruction signal.

According to this operation, by setting the predetermined frequency range to an appropriate range where control of phase adjustment is considered to be stable, the phase can be quickly adjusted and the frequency can be gradually increased and decreased, so that a duty ratio is moderately changed. Thus, a sudden change in current and rotational speed can be avoided.

In addition, when the phase difference is within the third range inside the second range, the motor drive control device 1_2 causes the adjustment instruction signal generation unit 19_2 to end the generation of the frequency adjustment instruction signal.

With this operation, adjustment can be made until a desired phase difference is gained.

Furthermore, in the motor drive control device 1_2, the drive control signal generation unit includes the PWM command unit generating an operation amount of a drive control signal and the PWM signal generation unit generating the drive control signal based on the operation amount, the PWM command unit including the rotational speed setting unit determining a set value of a rotational speed based on a command value of a rotational speed and a current rotational speed, the phase setting unit determining a set value of a phase based on a phase adjustment instruction signal, a frequency setting unit determining a set value of a frequency based on a frequency adjustment instruction signal, and an operation amount determination unit determining an operation amount based on the determined set value of the rotational speed, set value of the phase, and set value of the frequency.

According to this configuration, a drive control signal satisfying all of a rotational speed command, a phase command, and a frequency command can be generated.

Expansion of Second Embodiment

Although the invention made by the present inventors has been specifically described above based on the second embodiment, the present invention is not limited to the embodiment, and it is needless to say that various modifications can be made without departing from the gist of the present invention.

For example, the case of disposing the position detector 6_2 for the coil of the U phase among the three phases (the U phase, the V phase, and the W phase) of the motor 5_2 and detecting the drive voltage Vu and the zero crossing point of the coil current Iu of the U phase has been described as an example in the second embodiment described above, but the embodiment is not limited to this example. It may be possible to dispose the position detector 6_2 for the coil Lv of the V phase, detect the drive voltage Vv and the zero crossing point of the coil current Iv of the V phase, and perform phase adjustment of the coil current Iv, or it may be possible to dispose the position detector 6_2 for the coil Lw of the W phase, detect the drive voltage Vw and the zero crossing point of the coil current Iw of the W phase, and perform phase adjustment of the coil current Iw. Additionally, it may be possible to dispose the position detectors 6_2 for two or all of the U phase, the V phase, and the W phase, detect the drive voltage and the zero crossing point of the coil current of any phase, and perform phase adjustment of the coil current of the detected phase.

Additionally, although the case of the current zero crossing point estimation unit 14_2 detecting both the timing for switching from the state of the ON period (the first period Tv) of the drive voltage Vu of the coil Lu matching the ON period (the second period Th) of the PWM signal of the high side switch of the U phase to the state of the ON periods not matching each other (the zero crossing point Q of the coil current Iu switching from positive to negative) and the timing for switching from the state of the ON period Tv not matching the ON period Th to the state of the ON periods matching each other (the zero crossing point Q of the coil current Iu switching from negative to positive) has been described as an example in the second embodiment described above, the zero crossing point Q of any one timing may be detected. For example, the current zero crossing point estimation unit 14_2 may detect only the zero crossing point Q of the coil current Iu switching from negative to positive.

In the second embodiment, the type of the motor 5_2 is not limited to brushless DC motor. In addition, the motor 5_2 is not limited to a three-phase motor, and may be, for example, a single-phase brushless DC motor.

Although the case of using a Hall element as the position detector 6_2 has been described as an example in the second embodiment, the embodiment is not limited to this example. For example, a Hall IC, an encoder, a resolver, or the like may be provided as the position detector 6_2, and a detection signal of the Hall IC, the encoder, the resolver, or the like may be input as the position detection signal Shu to the motor drive control device 1_2.

Furthermore, the flowcharts described above are examples, and the embodiment is not limited to these examples. For example, other processing operations may be inserted between the steps, or the processing operations may be performed in parallel.

REFERENCE SIGNS LIST

1_1, 1_2 Motor drive control device
2_1, 2_2 Control circuit
3_1, 3_2 Drive circuit
4_1, 4_2 Phase voltage detection circuit
5_1, 5_2 Motor
6_1, 6_2 Position detector
11_1, 11_2 Drive command analysis unit
12_1, 12_2 Target point determination unit
13_1, 13_2 Phase voltage input unit
14_1, 14_2 Current zero crossing point estimation unit
15_1 Phase adjustment determination unit
16_1, 16_2 Drive control signal generation unit
17_1, 17_2 PWM command unit
18_1, 18_2 PWM signal generation unit
19_2 Adjustment instruction signal generation unit
100_1, 100_2 Motor unit
200 Waveform of position detection signal Shu
201 Waveform of drive voltage Vu of coil Lu of U phase
202 Waveform of induced voltage of coil Lu of U phase
203 Waveform of coil current Iu of coil Lu of U phase
Lu, Lv, Lw Coil
Iu Coil current of U phase
S1 Target rotational speed
S2 Determination result
S3 Operation amount
Sc Drive command signal
Sct Zero crossing point detection signal
Shu Position detection signal
Sp Phase adjustment instruction signal
Sf Frequency adjustment instruction signal
Sd Drive control signal
Suu, Sul, Svu, Svl, Swu, Swl PWM signal
Tv ON period of drive voltage Vu of coil Lu (first period)
Th ON period of PWM signal Suu (second period)
Td Dead time period
Tz1, Tz2 Zero crossing point presence range
T1, T1A, T2, T2A, T3, T4 Phase position
E1 First range (of phase difference)
E2 Second range (of phase difference)
E3 Third range (of phase difference)
QuH, QvH, QwH High side switch
QuL, QvL, QwL Low side switch
$\Delta\varphi$ Phase difference
+$\varphi$th, −$\varphi$th Threshold
Tth Threshold
Vu Drive voltage of coil Lu
Vv Drive voltage of coil Lv
Vw Drive voltage of coil Lw
Vdd DC voltage
P Target point of zero crossing of coil current Iu
Q Zero crossing point of coil current Iu

The invention claimed is:

1. A motor drive control device comprising:
a control circuit configured to generate a drive control signal being a PWM signal for driving a motor including a coil of at least one phase; and
a drive circuit including a high side switch and a low side switch, the high side switch and the low side switch being connected in series to each other and provided to correspond to the coil of each phase of the motor, the drive circuit being configured to alternately turn on and off the high side switch and the low side switch according to the drive control signal to switch an energizing direction of the coil of the corresponding phase, wherein
the control circuit includes
a target point determination unit configured to determine a target point of zero crossing of a coil current of a predetermined phase based on a position detection signal synchronized with an induced voltage of the coil of the predetermined phase of the motor and corresponding to a rotational position of a rotor of the motor,
a current zero crossing point estimation unit configured to estimate a zero crossing point of the coil current of the predetermined phase by detecting a change in a current direction of the coil current of the predetermined phase at a predetermined timing in every cycle of the PWM signal,
an adjustment instruction signal generation unit configured to generate at least one of a phase adjustment instruction signal for instructing phase adjustment of the coil current and a frequency adjustment instruction signal for instructing frequency adjustment of the PWM signal according to a phase difference between the target point determined by the target point determination unit and the zero crossing point estimated by the current zero crossing point estimation unit such that the phase difference is within a predetermined range, and
a drive control signal generation unit configured to generate the drive control signal based on at least one of the phase adjustment instruction signal and the frequency adjustment instruction signal generated by the adjustment instruction signal generation unit.

2. The motor drive control device according to claim 1, wherein
the current zero crossing point estimation unit compares a drive voltage of the coil of the predetermined phase to at least one of an ON period and an OFF period of a signal for turning on or off the high side switch corresponding to the predetermined phase in every cycle of the PWM signal and estimates the zero crossing point of the coil current of the predetermined phase based on the comparison result, and
the adjustment instruction signal generation unit is configured of a phase adjustment determination unit configured to determine whether the phase adjustment of the coil current is necessary based on the phase difference between the target point determined by the target point determination unit and the zero crossing point estimated by the current zero crossing point estimation unit.

3. The motor drive control device according to claim 2, wherein
the current zero crossing point estimation unit determines whether an ON period of the drive voltage matches the ON period of the signal for turning on or off the high side switch, detects at least one of a timing for switching from a state of the ON period of the drive voltage matching the ON period of the signal for turning on or off the high side switch to a state of the ON period of the drive voltage not matching the ON period of the signal for turning on or off the high side switch and a timing for switching from the state of the ON period of the drive voltage not matching the ON period of the signal for turning on or off the high side switch to the state of the ON period of the drive voltage matching the ON period of the signal for turning on or off the high side switch, and estimates the detected timing as a zero crossing point of the coil current of the predetermined phase.

4. The motor drive control device according to claim 3, wherein
the current zero crossing point estimation unit determines that the ON period of the drive voltage matches the ON period of the signal for turning on or off the high side switch when a difference between the ON period of the drive voltage and the ON period of the signal for turning on or off the high side switch is less than a threshold, and determines that the ON period of the drive voltage does not match the ON period of the signal for turning on or off the high side switch when the difference between the ON period of the drive voltage and the ON period of the signal for turning on or off the high side switch is equal to or greater than the threshold.

5. The motor drive control device according to claim 4, wherein
the drive control signal generation unit generates the drive control signal such that a dead time period for simultaneously turning off the high side switch and the low side switch when the high side switch and the low side switch are switched between ON and OFF states is provided, and
the threshold is a value based on the dead time period.

6. The motor drive control device according to claim 3, wherein
the current zero crossing point estimation unit determines that the timing for switching the state of the ON period of the drive voltage matching the ON period of the signal for turning on or off the high side switch to the state of the ON period of the drive voltage not matching the ON period of the signal for turning on or off the high side switch is a zero crossing point of a polarity of the coil current switching from positive to negative, and determines that the timing for switching the state of the ON period of the drive voltage not matching the ON period of the signal for turning on or off the high side switch to the state of the ON period of the drive voltage matching the ON period of the signal for turning on or off the high side switch is a zero crossing point of the polarity of the coil current switching from negative to positive.

7. The motor drive control device according to claim 2, wherein
the phase adjustment determination unit calculates the phase difference between the target point and the zero crossing point of the coil current, and instructs the drive control signal generation unit to shift an output timing of the drive control signal by a time corresponding to the phase difference.

8. The motor drive control device according to claim 1, wherein
the current zero crossing point estimation unit compares a drive voltage of the coil of the predetermined phase to at least one of an ON period and an OFF period of a signal for turning on or off the high side switch corresponding to the predetermined phase, and detects a change in the current direction of the coil current of the predetermined phase based on the comparison result.

9. The motor drive control device according to claim 1, wherein
the control circuit synchronizes the PWM signal with the position detection signal at a timing before estimating the zero crossing point of the coil current of the predetermined phase.

10. The motor drive control device according to claim 1, wherein
the adjustment instruction signal generation unit generates only the phase adjustment instruction signal until the phase difference is within a first range when the phase difference is outside the first range, and generates at least one of the frequency adjustment instruction signal and the phase adjustment instruction signal when the phase difference is within the first range.

11. The motor drive control device according to claim 10, wherein
the adjustment instruction signal generation unit prohibits generation of the phase adjustment instruction signal and generates only the frequency adjustment instruction signal when the phase difference is within a second range inside the first range.

12. The motor drive control device according to claim 10, wherein
the adjustment instruction signal generation unit gives an instruction to adjust a frequency of the PWM signal in a minimum unit of the frequency using the frequency adjustment instruction signal, and generates the frequency adjustment instruction signal at predetermined time intervals.

13. The motor drive control device according to claim 12, wherein
the adjustment instruction signal generation unit, using the frequency adjustment instruction signal, gives an instruction to increase the frequency of the PWM signal until the frequency reaches a maximum frequency in a predetermined frequency range or gives an instruction to decrease the frequency of the PWM signal until the frequency reaches a minimum frequency in the predetermined frequency range.

14. The motor drive control device according to claim 11, wherein
the adjustment instruction signal generation unit ends the generation of the frequency adjustment instruction signal when the phase difference is within a third range inside the second range.

15. The motor drive control device according to claim 1, wherein
the drive control signal generation unit includes a PWM command unit configured to generate an operation amount of the drive control signal and a PWM signal generation unit configured to generate the drive control signal based on the operation amount,
the PWM command unit including a rotational speed setting unit configured to determine a set value of a rotational speed based on a command value of the rotational speed and a current rotational speed, a phase setting unit configured to determine a set value of a phase based on the phase adjustment instruction signal, a frequency setting unit configured to determine a set value of a frequency based on the frequency adjustment instruction signal, and an operation amount determination unit configured to determine the operation amount based on the determined set value of the rotational speed, set value of the phase, and set value of the frequency.

16. A motor unit comprising:
the motor drive control device according to claim 1; and the motor.

17. A motor drive control method performed by a motor drive control device including a control circuit configured to generate a drive control signal being a PWM signal for driving a motor including a coil of at least one phase, and a drive circuit including a high side switch and a low side switch, the high side switch and the low side switch being connected in series to each other and provided to correspond to the coil of each phase of the motor, the drive circuit being configured to alternately turn on and off the high side switch and the low side switch according to the drive control signal to switch an energizing direction of the coil of the corresponding phase, the motor drive control method comprising:

- a first step of determining, by the control circuit, a target point of zero crossing of a coil current of a predetermined phase based on a position detection signal synchronized with an induced voltage of the coil of the predetermined phase of the motor and corresponding to a rotational position of a rotor of the motor;
- a second step of estimating, by the control circuit, a zero crossing point of the coil current of the predetermined phase by detecting a change in a current direction of the coil current of the predetermined phase at a predetermined timing in every cycle of the PWM signal;
- a third step of generating, by the control circuit, at least one of a phase adjustment instruction signal for instructing phase adjustment of the coil current and a frequency adjustment instruction signal for instructing frequency adjustment of the PWM signal according to a phase difference between the target point determined in the first step and the zero crossing point estimated in the second step such that the phase difference is within a predetermined range; and
- a fourth step of generating, by the control circuit, the drive control signal based on the determination result of the third step.

18. The motor drive control method according to claim 17, wherein the second step includes comparing a drive voltage of the coil of the predetermined phase to at least one of an ON period and an OFF period of a signal for turning on or off the high side switch corresponding to the predetermined phase and estimating a zero crossing point of the coil current of the predetermined phase based on the comparison result, and the third step includes determining whether the phase adjustment of the coil current is necessary based on the phase difference between the target point determined in the first step and the zero crossing point estimated in the second step.

* * * * *